(12) United States Patent
LaRosa et al.

(10) Patent No.: US 6,628,965 B1
(45) Date of Patent: Sep. 30, 2003

(54) COMPUTER METHOD AND SYSTEM FOR MANAGEMENT AND CONTROL OF WIRELESS DEVICES

(75) Inventors: Mark I. LaRosa, Ramsey, NJ (US); Patrick Gervasio, Frenchtown, NJ (US); Andrew A. Petrov, Princeton, NJ (US)

(73) Assignee: Dynamic Mobile Data Systems, Inc., Somerset, NJ (US)

( * ) Notice: Subject to any disclaimer, the term of this patent is extended or adjusted under 35 U.S.C. 154(b) by 0 days.

(21) Appl. No.: 09/173,801

(22) Filed: Oct. 16, 1998

Related U.S. Application Data

(60) Provisional application No. 60/063,604, filed on Oct. 22, 1997, and provisional application No. 60/068,838, filed on Dec. 24, 1997.

(51) Int. Cl.[7] .............................. H04B 1/38; H04M 1/00
(52) U.S. Cl. ........................ 455/557; 455/418; 709/201; 709/217; 709/316
(58) Field of Search .................. 455/418, 419, 455/420, 422, 460, 556, 557; 379/265.01–265.09; 709/201–203, 217–219, 230, 313, 315, 337

(56) References Cited

U.S. PATENT DOCUMENTS

| | | | | |
|---|---|---|---|---|
| 5,285,494 A | | 2/1994 | Sprecher et al. ............ | 455/423 |
| 5,508,713 A | * | 4/1996 | Okouchi ..................... | 345/2.2 |
| 5,774,720 A | | 6/1998 | Borgendale et al. ........ | 709/329 |
| 5,812,951 A | | 9/1998 | Ganesan et al. ............ | 455/445 |
| 6,014,688 A | * | 1/2000 | Venkatraman et al. ...... | 709/206 |
| 6,055,424 A | * | 4/2000 | Tornqvist et al. ........... | 455/414 |
| 6,219,694 B1 | * | 4/2001 | Lazaridis et al. ........... | 709/206 |
| 6,269,254 B1 | * | 7/2001 | Mathis ........................ | 455/557 |
| 6,285,889 B1 | * | 9/2001 | Nykanen et al. ............ | 455/557 |
| 6,311,058 B1 | * | 10/2001 | Wecker et al. .............. | 455/418 |

OTHER PUBLICATIONS

"DMD Beta Testing Mobility Layer," Wireless Week, Nov. 10, 1997, p. 32.
Nettech RFlink™, Nettech Systems brochure.
Nettech RFgate™, Nettech Systems brochure.
Nettech RFMlib, Nettech Systems brochure.
"The Nettech InstantRF™ family:" Nettech Systems brochure.
Nettech Product News, "InstantRF® for CDPD and Cellular Data," Nettech Systems brochure, May 1995.
Nettech Product News, "RFMlib™ 2.5 Upgrade and OS/2," Nettech Systems brochure, Mar. 1995.
Nettech Product News, "RFMlib/Server X.25 Option for DOS/Windows, RFMlib/Server X.25 Option for DOS/Windows," Nettech Systems brochure, Dec. 1994.
Nettech Product News, "RFgate™ 3.0.1 and Windows NT," Nettech Systems brochure, Mar. 1995.
Nettech Product News, "Nettech's TrueMobility™," Nettech Systems brochure, ©1994–1996.

* cited by examiner

*Primary Examiner*—Lee Nguyen
*Assistant Examiner*—Charles Craver
(74) *Attorney, Agent, or Firm*—Lerner, David, Littenberg, Krumholz & Mentlik, LLP

(57) ABSTRACT

A system and method of operating a computer system manages and controls wireless devices through a wireless control subsystem. The wireless control subsystem includes a programming module to extend a base communications API of a multi-tasking operating system through a set of programming objects callable by at least one wireless-related application. The wireless control subsystem also includes a system module having a plurality of layers of linked programming objects which propagate information from object to object indicative of the occurrence of system level events related to the operation and/or status of the wireless devices. System level events are communicated from a wireless device to the system module and through the layers of objects within the system module. Information indicative of said system level events is further propagated from the system module to the programming module to the wireless-related application.

23 Claims, 29 Drawing Sheets

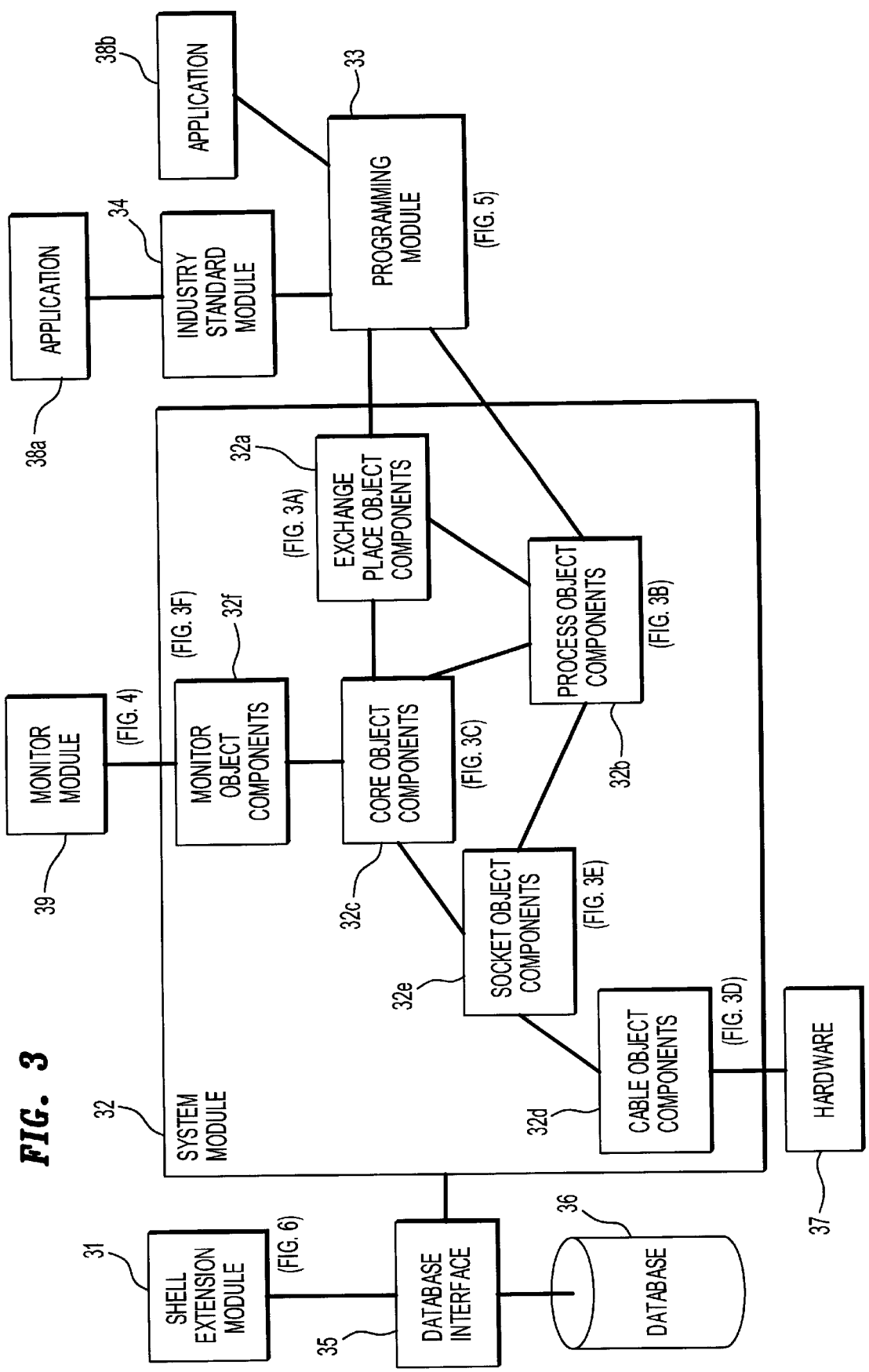

COMPUTER METHOD AND SYSTEM FOR MANAGEMENT AND CONTROL OF WIRELESS DEVICES

CROSS-REFERENCE TO RELATED APPLICATIONS

The present application claims the benefit of U.S. Provisional Patent Application Serial No. 60/063,604 filed Oct. 22, 1997 and U.S. Provisional Patent Serial No. 60/068,838 filed Dec. 24, 1997, the disclosures of which is incorporated herein by reference. A portion of the disclosure of the present invention and U.S. Provisional Patent Application Serial No. 60/063,604 contain material which is subject to copyright protection. The copyright owner has no objection to the facsimile reproduction by anyone of the patent disclosure, as it appears in the Patent and Trademark Office patent file or records, but otherwise reserves all copyright rights whatsoever.

FIELD OF THE INVENTION

The present invention relates to wireless devices such as wireless modems, wireless networks and personal data assistants (PDAs), and more particularly to a method and system for managing and controlling such wireless devices through a wireless control subsytem running on and extending a multi-tasking operating system.

BACKGROUND OF THE INVENTION

Traditionally, computers at remote locations communicated with one another through hard-wired or cable connections. One such common connection is a computer network known as a LAN (local area network) by which computers are connected to one another through other intermediary computers such as servers and routers via physical cabling (i.e., twisted-pair wire, coaxial cables, fiber optic lines) to and from the computers. Other hard-wired connection methods include connections by traditional modems which allow computers to communicate with one another over telephone or data lines.

More recently, with the proliferation of cellular and wireless technology, there has been a dramatic increase in "wireless" computing whereby computers can communicate with one another without cable or wires over wireless or cellular networks. Wireless computing allows for increased mobility of a computer user since it allows computer transmissions and communications from virtually any location where a wireless or cellular system is present. Today, wireless networks are prevalent almost everywhere in the world. With the increased use of laptop, notebook and palm-sized computers and PDAs, more and more individuals and companies now desire to communicate and exchange data by wireless exchange.

Although wireless computing is relatively new and continues to gain popularity, various methods of programming for and configuring wireless devices have been developed. One such "first generation" method for creating software to handle wireless devices was through the use of so-called direct device access. Direct device access gave the programmer the ability to have total control over the device. Unfortunately, a great deal of knowledge was required about the particular device and the network on which it operated as each device has its own unique method by which it is used. To make matters worse, each final software program which was developed was restricted to the particular device to which it was built. In order to switch networks or devices, each application would have to be re-written to accommodate the differences in the network and/or device.

"Middleware" (i.e., software that connects two otherwise separate applications) for wireless applications was then developed as the next step. By providing a common API (application program interface) upon which applications could be built, middleware applications could protect themselves from changes in the selected wireless networks, system upgrades and wireless devices, provided that the middleware actually supported the new networks and upgrades. Middleware, however, was designed around the programming models of the time such as single-threaded, single-application operating systems like DOS (disk operating system), with a single wireless device connected at a time.

Further, middleware made use of a polling approach whereby the software would constantly send out signals or polling sequences to determine whether or not a relevant event occurred in the wireless system (such as an out of coverage situation, whether a modem was on-line, etc.) This polling paradigm used up precious computer cycles and resulted in constant looping of requests for status information.

As operating systems evolved into multi-tasking 32-bit environments, such as Windows 95 and Windows NT, customers began to demand more from their software. At the same time, as mobile computing became more prevalent, the traditional approaches discussed above began to fall short. One solution was to simply port middleware to the new environments. However, this attempt did not take advantage of the new operating systems and all its features. Further, applications developed under a single-threaded, DOS programming model which were then "ported" to a multi-tasking environment were often difficult to successfully deploy.

Attempts were also made to place industry standard interfaces in front of middleware's proprietary API. However, these attempts were only marginally successful and problems surfaced. Middleware today lacks the ability to handle system-level events or handle multiple applications in a fashion appropriate for these environments. In order for middleware to truly fit into the new computing world, a port from a single-tasking environment is not enough.

Accordingly, there exists a need for a new generation of wireless-enabling technology to make wireless communications and programming easier and faster where direct device access and middleware cannot, and provide new features which allow the creation of applications which were nearly impossible to think about before. Such need is addressed by the present invention.

SUMMARY OF THE INVENTION

One aspect of the present invention provides methods of operating a computer system for managing and controlling wireless devices. Preferred methods according to this aspect of the invention include the steps of providing at least one wireless device connected to a computer, providing a multi-tasking operating system having a base communications API to the computer, providing at least one wireless-related application running on the computer for enabling wireless communications among the wireless device and wireless-related application, and providing a wireless control subsystem to the computer. The a wireless control subsystem includes a programming module extending the base communications API through a set of programming objects callable by the wireless-related application, and a system module having a plurality of layers of linked programming objects which propagate information from object to object indicative of an occurrence of system level events related to the operation and/or status of the wireless device. The method further includes the steps of communicating the system level events from the wireless device to the system module; propagating information indicative of the system level events through at least some of the layers of objects within the system module; and further propagating the information indicative of the system level events from the system module to the programming module and from the programming module to the wireless-related application.

In another preferred method of the present invention, there is provided a method of operating a computer system for managing and controlling wireless devices which allows system level event propagation across two or more computers. Such method preferably includes the steps of providing at least one wireless device connected to a first computer and providing a second computer remote from the first computer, with the first and second computers being connected by a communications link. A multi-tasking operating system is provided to each of the first and second computers, and the multi-task operating system of the second computer includes a base communications API. At least one wireless-related application is provided which runs on the second computer for enabling wireless communications between the wireless device and wireless-related application. The method further provides a wireless control subsystem to the first computer comprising a system module which has plurality of linked programming objects operative to propagate information from object to object indicative of an occurrence of system level events related to the operation and/or status of the wireless device. Still further, the method includes the steps of providing the second computer with a programming module extending the base communications API through a set of programming objects callable by a wireless-related application, communicating system level events from the wireless device to the system module, propagating information indicative of the system level events through at least some of the objects within the system module; and further propagating the information indicative of the system level events from the system module to the programming module of the second computer across the communications link and from the programming module to the wireless-related application.

In another preferred aspect of the present invention, there is provided a method of operating a computer system for managing and controlling wireless devices including the steps of: providing at least one wireless device connected to a computer; providing at least one wireless related computer application executable on the computer; and providing a wireless control subsystem to the first computer to actuate the computer to (i) provide a system module comprising a plurality of linked programming objects, and (ii) propagate information indicative of the occurrence of system level events related to the operation and/or status of the wireless device through at least some of the objects and up to the applications running on the computer.

In yet a further preferred aspect of the present invention, a method of operating a computer system for managing and controlling wireless devices includes the steps of: providing at least one wireless device connected to a computer; providing a multi-tasking operating system having a base shell and base communications API to the computer; providing a wireless control subsystem to the computer including a shell extension module extending the base shell of the operating system through providing a first set of COM objects; and actuating the computer by the wireless control subsystem such that the COM objects are used by the wireless control program subsystem to display graphical indicia to the base shell of the operating system indicating activation of the wireless control program subsystem.

Preferably, the base shell of the operating system provides a base graphical-user interface (GUI) displaying GUI elements on a user desktop, the GUI elements including a control panel folder containing icons representing configuration controls of operating system, and the first set of COM objects of the shell extension module are configured to provide a folder icon in the control panel folder containing device icons therein representing the wireless devices and program icon in the control panel folder for accessing controls of the wireless control program subsystem by selection of the program icon. Desirably, the first set of COM objects are configured to place an additional program icon on the user desktop. Further, the first set of COM objects are also configured to display representations of the wireless devices folder and program icon in an exploring window.

More desirably, the user desktop includes a task tray region for displaying icons representing programs that extend the operating system and the first set of COM objects are configured to locate a program icon in the task tray region upon activation of the wireless control subsystem.

Another aspect of the present invention provides a method of operating a computer system for managing and controlling wireless devices including the steps of providing at least one wireless device connected to a computer and at least one wireless-related application running on the computer; providing a multi-tasking operating system having a base shell and base communications API to the computer; and providing a wireless control subsystem to the computer. The wireless control subsystem includes: a shell extension module extending the base shell of the operating system through providing a first set of COM objects used by the wireless control program subsystem to display graphical indicia to the base shell of the operating system indicating activation of the wireless control program subsystem, a programming module extending the base communications API through a set of programming objects callable by wireless-related applications for enabling wireless communications among the wireless device and wireless-related applications, and a system module having a plurality of linked programming objects operative to propagate information indicative of an occurrence of system level events related to the operation and/or status of the wireless device through the linked programming objects of the system module to the programming objects of the programming module and then to at least one application running on the computer.

In a particularly preferred arrangement, the method further includes providing an industry standard module which exposes one or more industry-standard programming interfaces to a programmer to enable development of custom wireless applications which can communicate with the programming module and the system module. Such industry-stardard programming interfaces can include ActiveX, Winsock and/or OBDC.

Desirably, the programming objects of the programming module can include application socket objects which represent single socket connections with each application, and the plurality of the linked programming objects can include a first layer of cable objects representing a communication link with a wireless device, a second layer of socket objects representing a user created socket connection, and a third layer of process objects representing the link between the system module and the programming module. In such as case, the wireless control subsystem can then actuate the computer to: sense at the cable objects the occurrence of a system level event related to the operation and/or status of the wireless device, send first signals from the cable objects indicative of the system level event to the socket objects, send second signals from the socket objects indicative of the system level event to the process objects, and send third signals indicative of the system level event from the process objects to the application socket objects of the programming module, and from the application socket objects to the application.

Preferably, the system module is operative to propagate through the objects a system level event indicative of when at least one wireless device is in an out-of-coverage area. Further, the wireless control subsystem can be configured to hold in abeyance communications with a wireless device determined to be in an out-of-coverage area until the system module determines when at least one wireless device returns to a coverage area by sensing the occurrence of an in-coverage system event.

Also preferably, the system module is operative to propagate through the objects real-time system level events to provide diagnostic information about the status of at least one wireless device, and real-time diagnostic information, such as registration status, signal strength and device address, can be displayed on a display device of the computer in an on-screen diagnostic panel.

The system module can further include at least one wizard program for automatic and simplified configuration and registration of at least one wireless device to the wireless control subsystem.

Desirably, the wireless control subsystem allows at least one the wireless devices to communicate simultaneously with two or more applications.

Another aspect of the invention provides a second remote computer and at least one wireless-related application running on the second remote computer, with the second remote computer being connected to the first computer via a communications link. Here, the wireless control subsystem is operative to allow at least one the wireless devices to communicate simultaneously with at least one application running on the first computer and at least one application running on the second remote computer.

Yet another aspect of the invention provides that the wireless control subsystem allows at least one application running on the first computer to communicate with two or more wireless devices simultaneously. Preferably, a second remote computer is provided with at least one wireless-related application, with the second remote computer being connected to the first computer via a communications link, and the wireless control subsystem is operative to allow at least one application running on the second remote computer to communicate with two or more wireless devices simultaneously.

In a further aspect of the invention, at least one wireless device can be operable with a first wireless network protocol and at least one wireless device can be operable with a second, different wireless network protocol. Further, the system module utilizes sockets for data transport. Still further, the wireless devices can be assigned a unique numeric address, wherein the system and shell extension modules are operative to match the numeric addresses to user-friendly monikers.

Another aspect of the present invention provides a method of transmitting wireless communication information from a recipient computer connected to a recipient wireless device back to a sender computer connected to a sender wireless device to confirm receipt of user data sent from the sender computer by an application running on the recipient computer. This method includes the steps of forming one or more transmission packets in the recipient computer, with each packet including a block of user data provided by the recipient computer and transport confirmation data representing the receipt by the application running on the recipient computer of the entire block of user data; and transmitting the transmission packets from the recipient computer back to the sender computer via the recipient and sender wireless devices.

Desirably, the transmission packets can be provided with performance data representing the rate at which the recipient wireless device can send and receive data, and load data representing the amount of data being presently handled by the recipient wireless device. Further, the step of transmitting occurs at a transmission rate which is varied in response to performance characteristics of the transmission based on the performance data. The step of transmitting includes also preferably includes transmitting a plurality of the transmission packets and varying the number of packets being sent to the recipient wireless device in response to performance characteristics of the recipient wireless device based on the load data.

The transmission packets, in one aspect of the invention, desirably contain: destination address data representing the identity of the recipient computer to receive the transmission packets, source address data representing the sender computer of the transmission packets, a block of user data provided by the recipient computer, transport confirmation data representing the receipt by the recipient computer of the entire block of user data, delivery notification data representing information provided back to the sender computer indicating successful receipt of the user data by the application running on the recipient computer, performance data representing the rate at which the transmission packets are being sent and received, and load data representing the number of transmission packets being concurrently received by the recipient wireless device. These transmission packets are then transmitted from the recipient computer back to the source computer via the recipient and sender wireless devices.

Yet a further aspect of the present invention provides a computer system for managing and controlling wireless devices. The system according to this aspect of the invention includes a computer and at least one wireless device connected to the computer. The computer includes memory means and processor means connected to the memory means. The memory means includes OS memory means for storing a multi-tasking operating system having a base communications API, application memory means for storing at least one wireless-related application for causing the processor means to enable wireless communications between the wireless device and wireless-related application, and subsystem memory means for storing a wireless control subsystem. The wireless control subsystem includes a programming module for causing the processor means to extend the base communications API through a set of programming objects callable by at least one wireless-related application, and a system module comprising a plurality of layers of linked programming objects for causing the processor means to propagate information from object to object indicative of an occurrence of system level events related to the operation and/or status of the wireless device.

The system module is further operative to cause the processor means to communicate system level events from the wireless device to the system module, propagate information indicative of the system level events through at least some of the layers of objects within the system module, and further propagate the information indicative of the system level events from the system module to the programming module and from the programming module to at least one wireless-related application.

Finally, a still further aspect of the present invention provides a computer system for managing and controlling wireless devices including a computer and at least one wireless device connected to the computer. The computer includes memory means and processor means connected to the memory means. The memory means includes (i) application memory means for storing at least one wireless-related application for causing the processor means to enable wireless communications between the wireless device and the wireless-related application; and subsystem memory means for storing a wireless control subsystem having a system module including a plurality of layers of linked programming objects for causing the processor means to propagate information indicative of the occurrence of system level events related to the operation and/or status of the wireless device through at least some of the objects and up to at least one application.

These aspects and other objects, features and advantages of the present invention will be more readily apparent from the detailed description of the preferred embodiments set forth below, taken in conjunction with the accompanying drawings.

BRIEF DESCRIPTION OF THE DRAWINGS

FIG. 3 shows a block diagram showing the relationship among the various modules and components used in accordance with the present invention.

DETAILED DESCRIPTION OF PREFERRED EMBODIMENTS

The present invention not only provides a programming interface for wireless devices, but also itself comprises an "operating system extension" for handling, configuring and communicating with wireless devices. Configured as a wireless control program subsystem, the present invention exists close to and in fact extends the computer's 32-bit Windows-based operating system (e.g., Windows 95, NT, CE, 98, etc.) as explained below. As an operating system ("OS") extension, the present invention allows itself to be readily configured via the Windows Control Panel and Explorer.

Once running, the wireless control program subsystem is be visible in the Windows Task Tray and can be activated for diagnostic reporting and viewing of the running devices and connections. The wireless control program subsystem is advantageously designed to react appropriately to system events such as shutting down Windows and power management functions. Thus, the wireless control program subsystem of the present invention provides an infrastructure, not simply an API like middleware. This infrastructure provided by the present invention preferably has a multi-layered, modular format, with some of the layers or modules being used by the end-user, some by the programmer, and some by the program itself.

Figure 1:
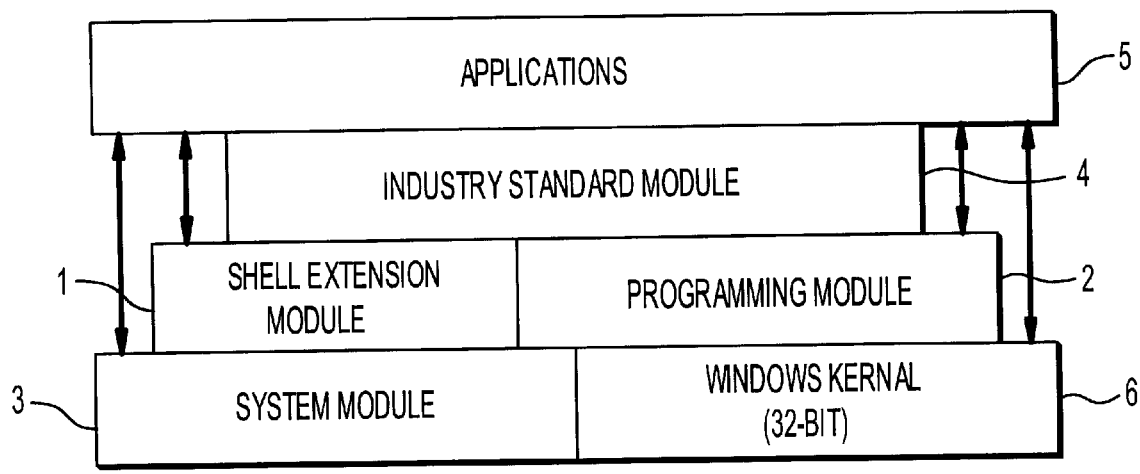
FIG. 1 shows a block diagram depicting the various layers and modules used in connection with the present invention.

Referring now to FIG. 1, the infrastructure of the present invention can be broken down into several discrete layers or modules, including a shell extension module 1, a programming module 2, a system module 3 and an industry standard interface module 4. Applications 5 can be provided to interface with certain modules (e.g., system module, shell extension module) and can be created using the modules (e.g., the industry standard module and the programming module. Each of these modules are described in more detail below. A Windows Kernel 6, provided by the Windows operating system, is also shown as cooperating with the other modules of the present invention. The Windows Kernel is the operating system's central module that loads first and remains in the computer's main memory. It provides essential services, such as memory management, process and task management and disk management, which are required by other parts of the Windows operating system and other applications.

The individual modules of the present invention are written and designed to interact and cooperate with one another. Together, the modules (either a selection of modules or all of the modules) collectively form the comprehensive wireless control program subsystem of the present invention. The wireless control program subsystem is preferably installed through software adapted to run on one or more general purpose, programmable computers running a 32-bit OS such as Windows NT and which communicate with wireless devices. Such computers can include, for example, PCs, Macintoshes, Power-PCs, palm-based PCs, PDAs, workstations or the like.

Figure 2:
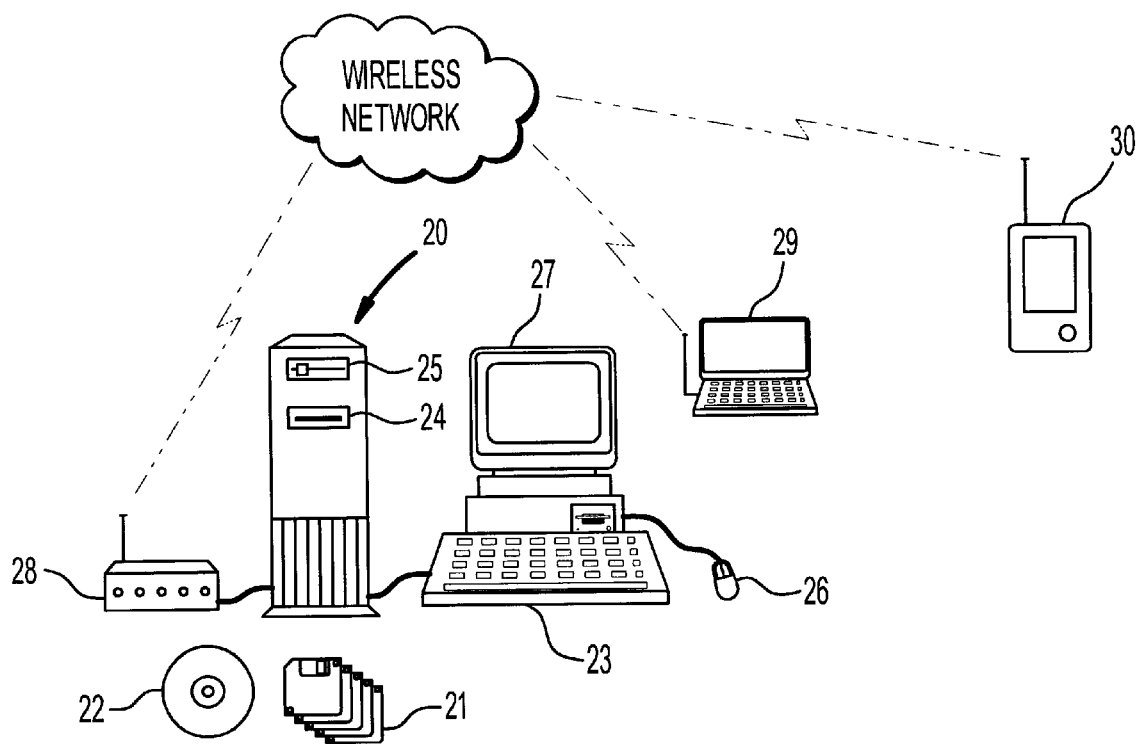
FIG. 2 shows a functional block diagram depicting apparatus which can be used in accordance with the present invention.

As shown in FIG. 2, representative system hardware is illustrated for use with the present invention, including a conventional computer 20 into which computer software implementing the wireless control program subsystem is loaded via the usual manner such as by floppy disks 21 or CD-ROM 22 and typically stored on an internal hard drive or other attached internal or external mass storage device. Computer 20 includes the typical input devices such as keyboard 23, floppy disk drive 24, CD-ROM drive 25, and mouse 26. Computer 20 also includes a display device or monitor 27 and internal ROM and RAM memory (not shown) which stores the various modules of the present invention when activated or loaded. The computer 20 executes the various modules of the wireless control program subsystem of the present invention via control by the computer's internal microprocessor.

Also attached to computer 20 is a wireless modem 28 which communicates to other wireless devices, such as laptop computer 29 with an internal wireless modem or wireless PDA 30 also with an internal wireless modem. Such communication occur via radio-frequency signals typically transmitted over a wireless network.

I. Overview of Modules

The wireless control program subsystem of the present invention preferably includes two modules for extending the Windows OS, including a Windows Shell extension module and a programming module.

The shell extension module 1 extends the Windows OS by extending the Windows Shell already packaged with the Windows operating system. With this shell extension, the user can configure and view all of the current wireless devices attached to the system as well as manipulate the items such as an "address book" (explained in detail further below). Also, via the shell extension module, the Windows Task Tray (the status box typically in the lower right corner of the Windows desktop with the clock) may contain an icon which allows users to readily see running diagnostics and configure dynamic properties of wireless devices.

The programming module 2 also extends the Windows OS by extending Winsock (short for Windows Socket), the default API provided by Windows, and provides wireless-specific calls. With the programming module, objects are provided through the C++ class library to programmers who can readily use this module to build applications which communicate with the system natively instead of using a industry standard interface.

The system module 3 provides software objects and additional GUI elements to the wireless control program subsystem and controls the actual wireless devices attached to the computer. It can treat the wireless devices as system "resources" and take advantage of other system resources and events such as hardware interrupts. The system module provides visual indications of the control of the wireless devices attached to the computers on which wireless control program subsystem is running.

The industry standard interface module 4 exposes to the programmer standard interfaces in which to program, and allows development of industry-standard programs using ActiveX controls. This module preferably includes several proprietary ActiveX controls such as those offered in MobileX™, a wireless Windows development tool offered by Dynamic Mobile Data Systems, Inc. of Somerset, N.J. (hereinafter "DMD"). This layer also can include interfaces such as a true Winsock 2 driver (32 bit Winsock) and preferably MobileSockets™ offered by DMD and a wireless ODBC driver such as MobileQuery™ also offered by DMD.

The specific details of the various modules of the wireless control program subsystem are now described below.

II. Details of the Modules

The interconnection of each of the modules of the present invention are more particularly illustrated in block diagram form in FIG. 3. Thus, FIG. 3 illustrates the cooperation and linking of the major sections of the present invention are shown in block diagram form, including shell extension module 31, system module 32, programming module 33, industry standard module 34, database interface 35, database 36, hardware components 37 and applications 38a and 38b.

A. The System Module

The system module 32, as well as the other modules of the wireless control program subsystem, use an object-oriented approach whereby the components in the wireless control program subsystem are represented as "objects." An object is definable by the programmer in the chosen object-oriented programming language and is generally any item that can be individually selected and manipulated. An object is self-contained and contains both data and procedures to manipulate the data.

Object-oriented programming refers to a type of programming in which programmers define not only the data type of a data structure, but also the types of operations or functions that can be applied to the data structure. In this way, the data structure becomes an object that includes both data and functions. Programmers can then create relationships between one object and another. For example, objects can inherit characteristics from other objects. One of main advantages of object-oriented program is that it allows programmers to create modules that do not need to be changed when a new type of object is added. A programmer can simply create a new object that inherits many of its features from existing objects.

The system module 32 comprises six main component sections, including exchange place object components 32A, process pool object components 32B, core objects 32C, cable pool object components 32D, monitor components 32E and socket pool object components 32F. The details of each of these sections are shown in more detail in FIGS. 3A through 3F which express the details of the system module at the object level such that one of ordinary skill in object-oriented programming with knowledge of wireless system can create the necessary software program which implements the system module. This is also the case with the programming module 33 which is shown at its object level at FIG. 5.

Figure 3A:
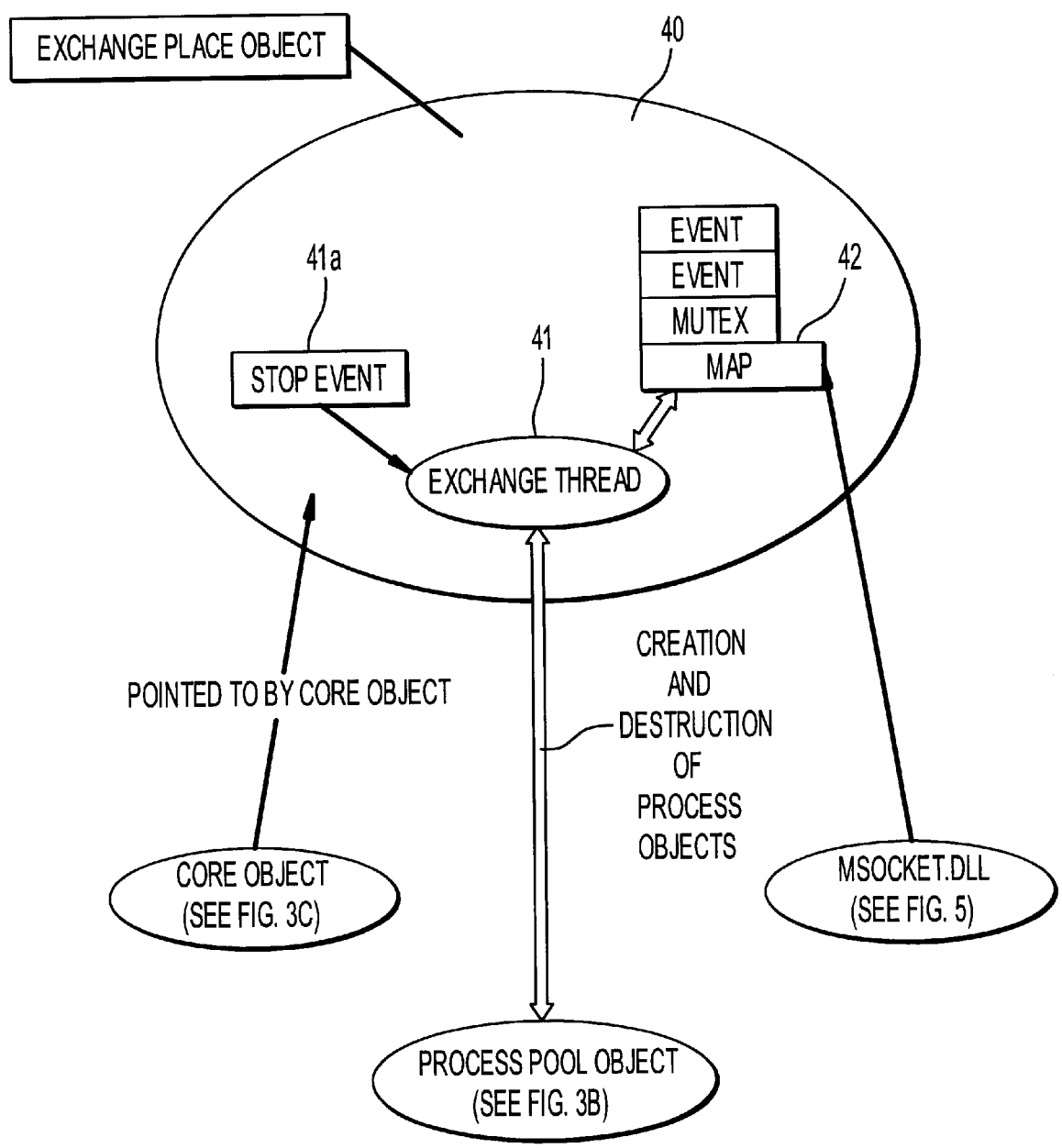
FIG. 3A shows the exchange place object components of the system module.

Turning now to FIG. 3A, exchange place object components are shown, including exchange place object 40, exchange place thread 41, stop event 41a and exchange place IPC 42. The exchange place object components are used for the initial connection of the application (or process) to the system module and are responsible for creating "process objects" which are objects that represent the running of an application or process (i.e., an executing application). Thus, it should be appreciated that the same application could be launched two or more times and thus each instance of the application would be a separate "process."

Exchange place object 40 is the component which is responsible for establishing the connection between the system module and the programming module. Exchange place thread 41 is responsible for inter-process communications within this object. Stop event 41a is provided for stopping execution of the thread. Finally, exchange place IPC (InterProcess Communication) 42 comprises WIN32 system objects (event, mutex and map) which are used within the exchange place object. IPC objects provide the capability of WIN32 operating systems to allow one process to communicate with another process. The processes can be running on the same computer or on different computers connected through a network. IPC enables one application to control another application, and for several applications to share the same data without interfering with one another. IPC is used in multiprocessing systems, but it is not found in single-process operating systems such as DOS.

Together, the exchange place object components are responsible for the initial connection of a launched application to the system module. Once the application is launched and recognized, the application identifies itself to the system module by providing a process ID. If an identical application is re-launched such that the same application is running in two or more instances, each instance will be assigned a process ID.

Figure 3B:
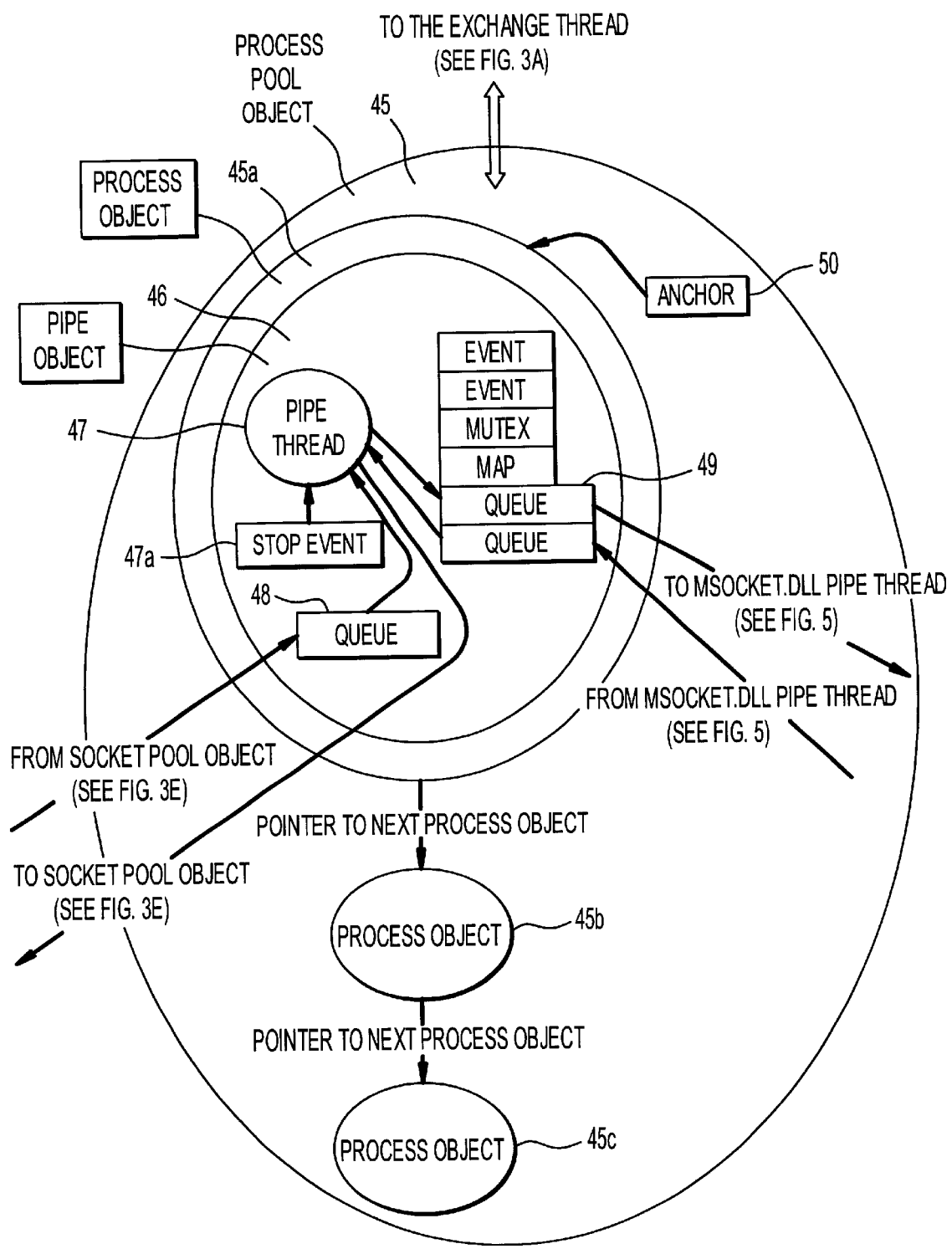
FIG. 3B shows the process object components of the system module.

The creation and destruction of process objects in communicated to process pool object components as shown in detail FIG. 3B. Process object pool 45 represents a collection of process objects 45a, 45b, 45c, etc. Each process object represents an a process or running of an application. For instance, process object 45a might represent Microsoft Excel, process object 45b might represent Lotus Notes and process object 45c might represent another execution of the same Lotus Notes application. Pipe object 46 is provided which is responsible for full-duplex data communications between the system module and the programming module. Pipe object 46 contains pipe thread 47 which is the thread responsible for the inter-process communications and also contains stop event object 47a and queue 48 which is an event-controlled storage for buffering data between the pipe thread and a socket pool object (see FIG. 3F). Stop event object is provided to stop execution of the pipe thread. Pipe object also contains pipe object IPC 49 which also contains WIN32 system objects (event, mutex, map and queue objects) used within the pipe object. Also provided is anchor object 50 for the list of process objects.

Figure 3C:
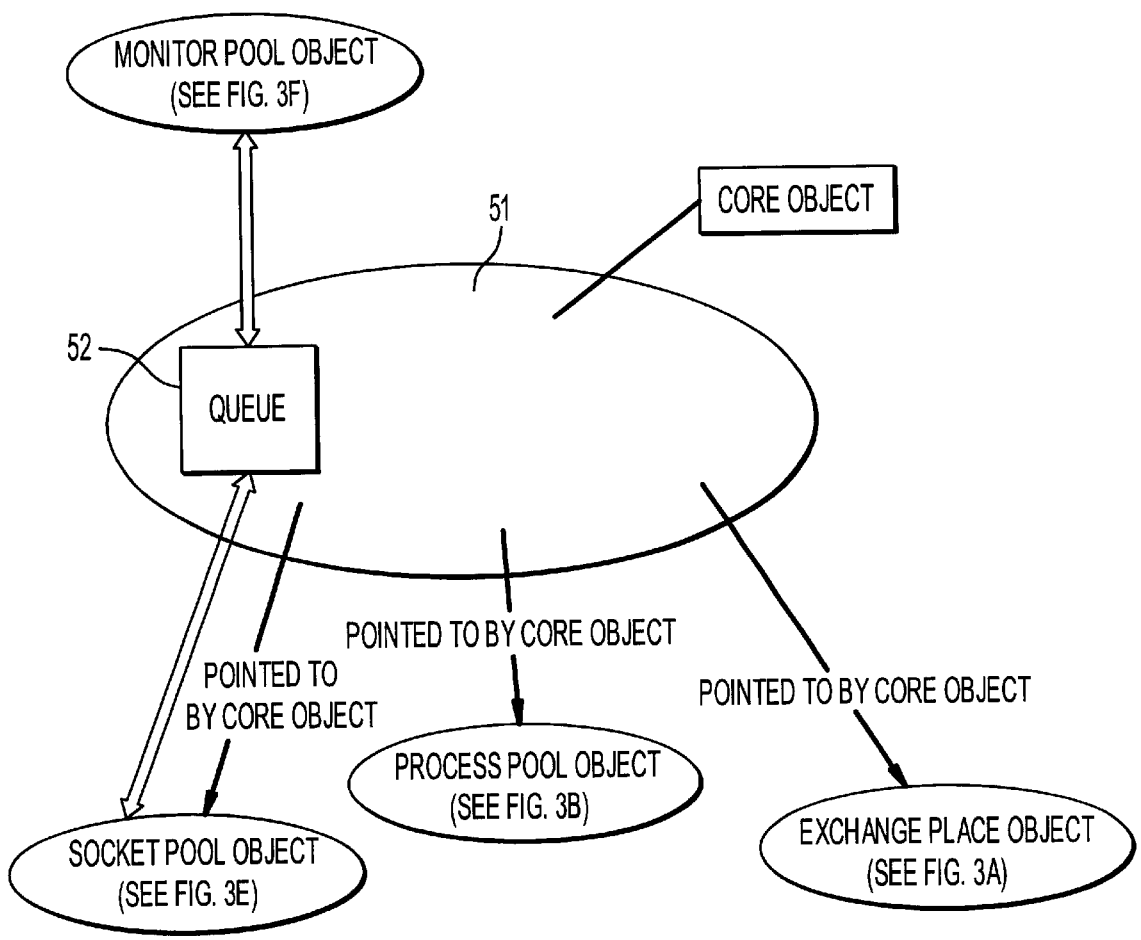
FIG. 3C shows the core place object components of the system module.

Turning to FIG. 3C, the core object components are shown, including core object 51, which is an object that acts as a place holder for all of the objects within the system module, and queue 52 which is a data and event queue used to serve a single monitor. Core object 31 points to other objects in the system module including exchange place object (FIG. 3A), process pool object (FIG. 3B), monitor object (FIG. 3E) and Socket pool object (FIG. 3F).

Figure 3D:
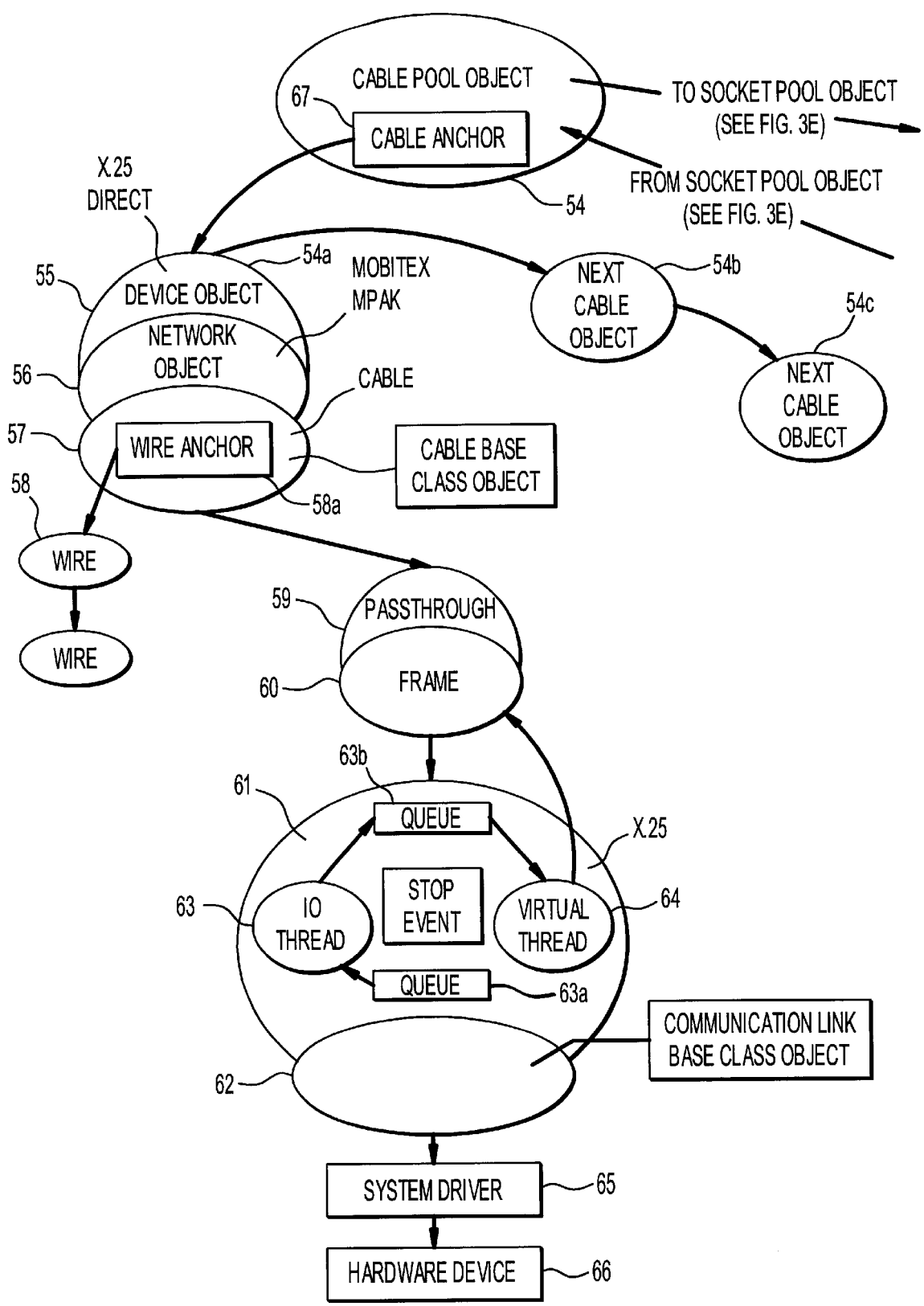
FIG. 3D shows the cable object components of the system module.

As shown in FIG. 3D, cable pool object 54 represents the collection of cable objects 54a, 54b, 54c, etc. A "cable" is a term used to represent a send/receive communication link. Cable object 54a, for example, includes device object 55 which is derived from network object 56. Device object 55 represents vendor and model specific implementation (e.g., X.25 direct wireless modem) of the wireless devices, properties and methods. Network object 56 represents a network specific implementation of the wireless devices, properties and methods (such as the Mobitex network) and is in turn derived from cable object 54a. Cable object 54a further includes cable base class object 57 which represents the implementation of the generic wireless devices, properties and methods. Each cable object includes a wire anchor 58a which connects to wires 58 which represent remote routers relative to a particular cable within the system module. Through the use of multiple wires 58, the present invention can allow a single application or process to communicate with multiple routers and devices.

Cable pool object includes a cable anchor 67 which connects to each cable object. Each cable object in turn connects to datalink level object 59 which connects to frame base class object 60. Datalink level object 59, which is derived from frame object 60 represents the infrastructure specific implementation of the datalink layer, properties and methods. Frame base class object 60 is the implementation of the generic datalink layer, properties and methods. Frame base class object 60 thus serves a holding object for frames of data and datalink level object 59 serves as a passthrough object for passing the frame to the cable object.

Frame base class object 60 is in turn connected to communications link object 61 which is derived from the communications link base class object 62 which is the generic representation of the generic communications layer, properties and methods. Communications link object 61 also includes IO thread 63, virtual thread 64 and queues 63*a* and 63*b*. IO thread 63 is the thread which interfaces with the system interface to the hardware device driver. Virtual thread 64 is the thread which is responsible for event and data propagation up to the application.

System driver 65, which is linked to communications link object 61, is a collection of WIN32 and third party hardware drivers which is the program which controls the modem or hardware device 66. Hardware device is a device such as an Eicon X.25 card, Ethernet card or other modem or network adapter or a UART. A UART (Universal Asynchronous Receiver-Transmitter) is a component that handles asynchronous serial communication to manage the serial ports. All internal modems have their own UART. Cable pool object 54 is linked to socket pool object components as shown in FIG. 3F.

Figure 3E:
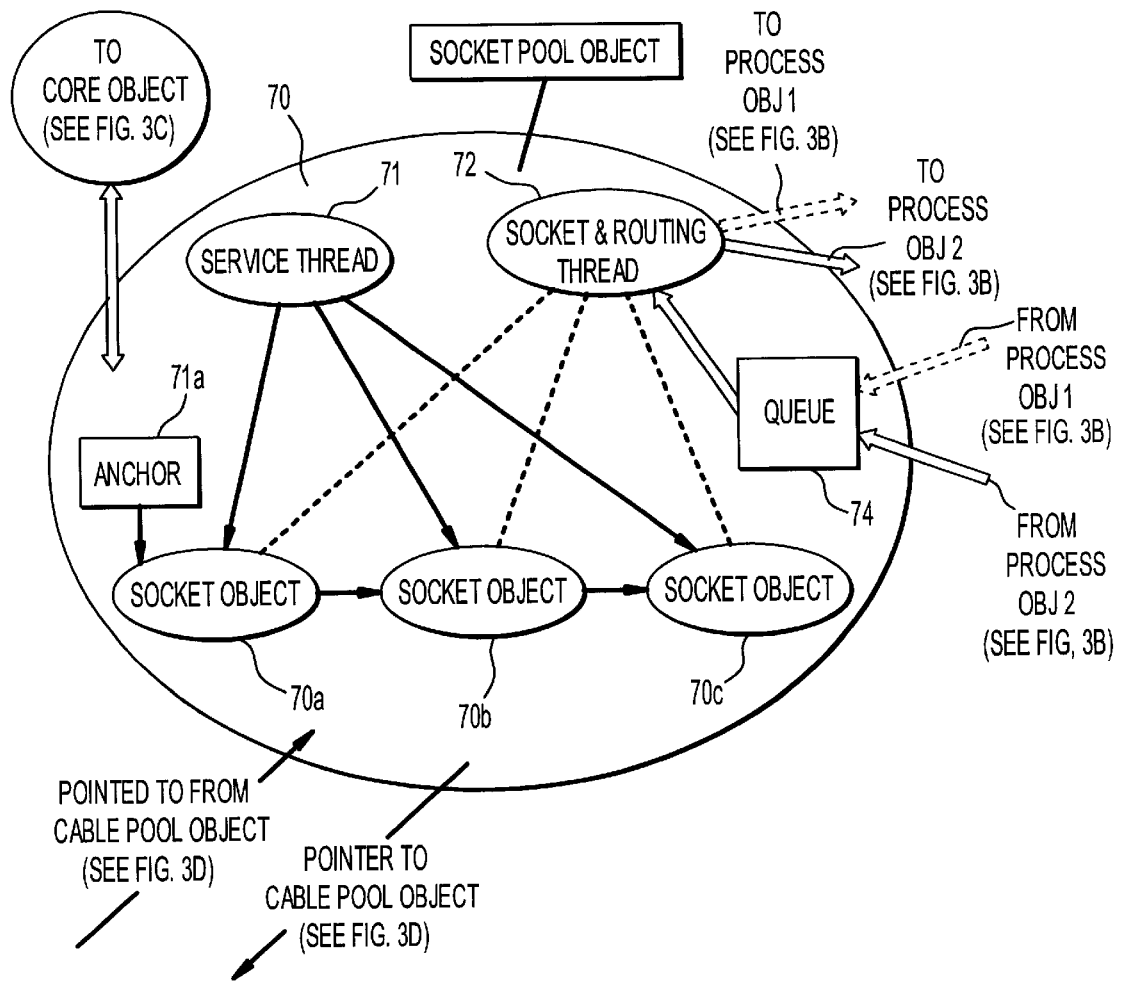
FIG. 3E shows the socket object components of the system module.
Figure 3F:
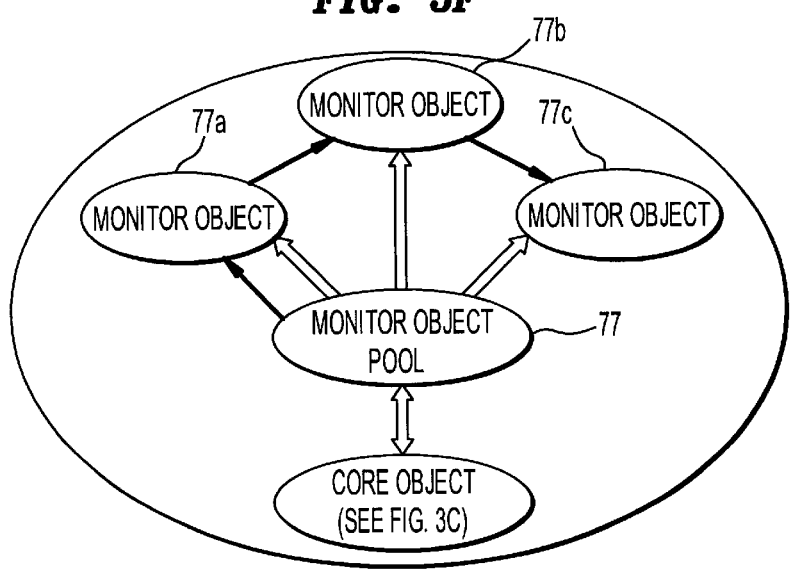
FIG. 3F shows the monitor object components of the system module.

Socket pool object components are used to associate hardware events with the particular socket. FIG. 3E thus shows the socket pool object components, including socket pool object 70, which represents the collection of socket objects 70*a*, 70*b*, 70*c* etc. Socket objects are objects representing a user-created socket within the system module. Socket pool object 70 also acts as a "parent" for the service thread 71 and socket and routing thread 72. Service thread 71 is the thread servicing time interval-based requests originated by the socket pool and cable pool objects. Socket and routing thread 72 is the thread which services time interval-based requests from the sockets. Queue 74 is provided which is the servicing queue for the process pool object. Socket pool object 70 is thus operative to associate an event then route information about the event to the given process or application. Socket pool object components are linked with core objects (see FIG. 3C), process objects (see FIG. 3B) and cable pool objects (see FIG. 3D).

Referring now to FIG. 3F, monitor object components are shown, including monitor object pool which includes the collection of monitor objects 77*a*, 77*b*, 77*c*, etc. Monitor object pools linked with the core objects from FIG. 3C. Monitor objects are components which are responsible for the connection to a single monitor instance. Monitor objects provide information to monitor module 39 which enable that module to monitor the status and behavior of the communications and also provide control based on the monitoring. For instance, conditions that can be actively monitored include how many packets have been sent and delivered. Furthermore, this monitored information is then available to programmers who can build in control to their software based on the monitoring of transmissions and communications.

Figure 4:
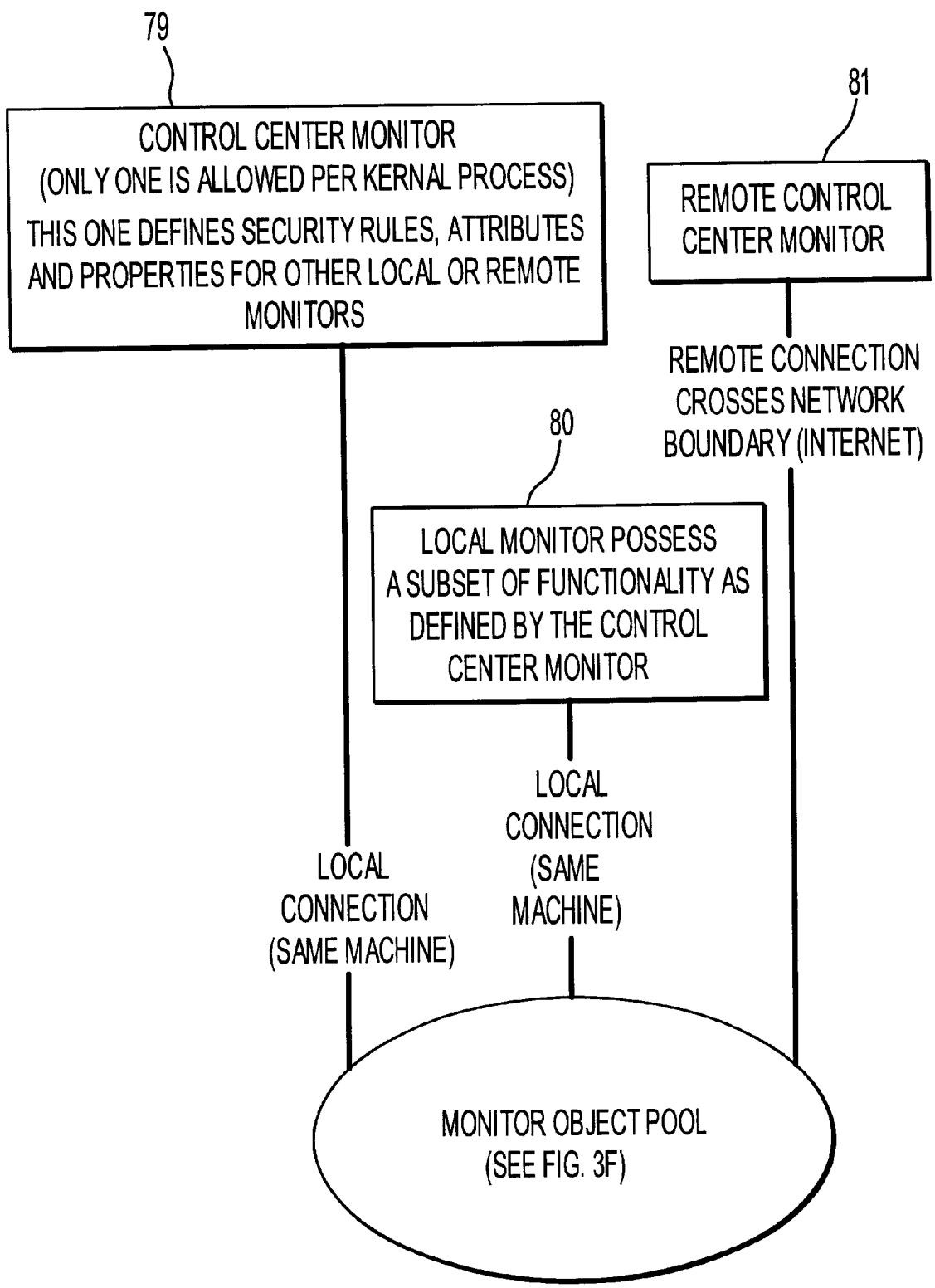
FIG. 4 shows the components of the monitor module.

FIG. 4 illustrates the monitor module 39 in greater detail, and includes control center module 79, local monitor 80 and remote control center module 81. Control center monitor 79 is the monitor which possesses controlling privileges which defines security rules, attributes and properties for other local or remote monitors. Local monitor 80 represents the process which reflects wireless extension activities, status and operations running on the same computer, and possesses a subset of the functionality as defined by the control center monitor. Remote control center monitor represents the process which reflects wireless extension activities, status and operation to a remote computer over a remote connection, such as a LAN, WAN and/or across network boundaries such as via the Internet.

Figure 5:
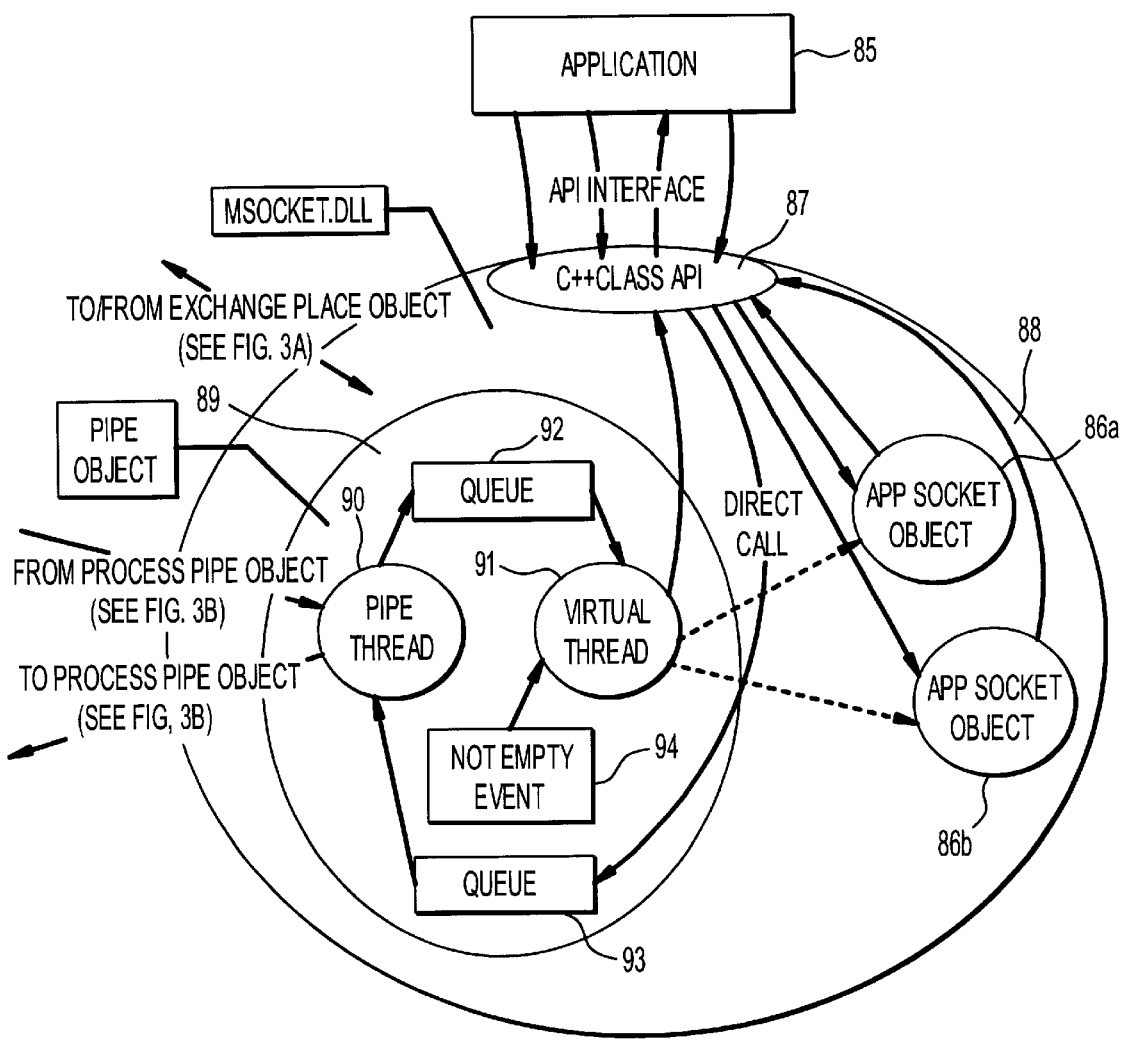
FIG. 5 shows the components of the programming module.

Programming module, shown in FIG. 5, includes an application 85 which is any application which uses the programming module. The programming module also includes application socket objects 86*a* and 86*b* each which represents a single socket connection or communication line. Application socket objects are links to the C++ class API 87 which is the interface of msocket.DLL, the dynamic link library system object which contains the implementation of the C++ class API.

The C++ class API provides the programming interface which allows applications to operate via sockets. Pipe object 89 is provided which is the programming module counterpart for the pipe connection used by the system module. The pipe object 89 includes pipe thread 90 and virtual thread 91 along with queue 92, queue 93 and not empty event indicator 94. Pipe thread 90 is the thread responsible for data exchange between the external process queue and virtual thread queue. Pipe thread 90 is linked with process pipe object (see FIG. 3B) and thus communicates with the system module. Virtual thread 91 is the thread which is responsible for event propagation up to the application via application socket objects 86A, 86B, etc. The header files for the C++ class API is listed herein at Appendix A, which include header files MAddress.h, MEvent.h, MName.h, MProviderEvent.h, MSocket.h, MSocketCodes.h and MSocketErrors.h.

With the programming module, the system module generates an event and associates an event with the proper socket. Information is then passed to the pipe thread 90. The data and events associated with the event is then stored in queue 92. The virtual thread 91 then picks up the data and events upon ascertaining that not empty event 94 is satisfied (i.e., data and events are present in queue 92). Then, the event is fired to the application associated with the socket. The application then, in turn, gives data back to queue 93 which then goes back out to the process pipe object via pipe thread 90.

When an application is launched for the first time, the application uses msocket.DLL to find out whether an exchange place object has been created. If not, msocket.DLL will start the system module which will then create the exchange place object. The exchange place object then looks for the process ID among the processes running and if it finds none, a new process must be created and a connection to it established.

Referring back to FIG. 3, database interface 35 is shown which provides access to database 36 and serves as the link between the system module 32 and shell module 31. Database 36 is the storage used by the database interface and stores all of the configuration and setting information handled by the present invention, such as modem parameters, names of hosts, socket numbers, etc. Database interface 35 is a COM object component which provides programmatic access to the wireless extensions database. Database interface 35 also allows mutually exclusive access by the shell and system modules and is operative to lock a record, allow for a change to the record, and unlock the record, all without allowing access to the record.

Figure 6:
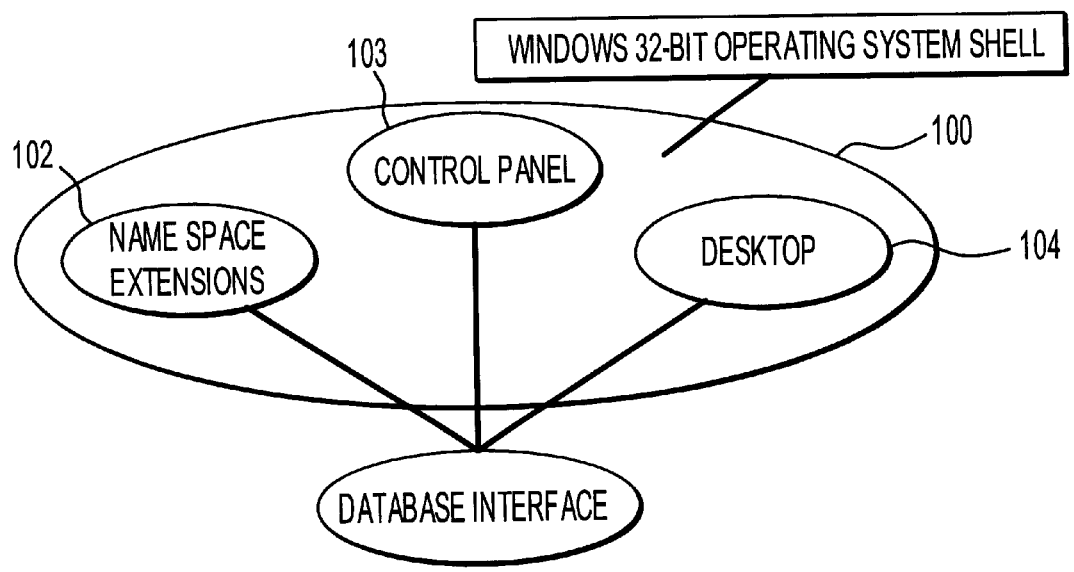
FIG. 6 shows the components of the shell extension module.

Shell module 31 contains the components which are responsible for wireless extension configuration. Referring to FIG. 6, the shell module includes the Windows 32-bit operating system shell 100, namespace extensions 102, control panel interface 103 and desktop interface 104.

Finally, hardware 37 represents wireless and wired communication infrastructure including wireless modems connected via the serial or PCMCIA port, X.25 (a data transfer standard for packet-switching networks), TCP/IP or other direct connection.

While applications can communicate directly with the programming module 33 as shown in FIG. 5, applications, such as application 38*a* (FIG. 3) can also gain access to the programming module via industry-standard module 34. Thus, using the programming module, the industry-standard module provides programmatic access through industry standard interfaces such as Winsock 1.1, Winsock 2.0, ActiveX and ODBC.

The present invention provides for the propagation of system events, through the defined objects, up through each layer of the OSI (Open System Interconnection) model or standard for communications. OSI, an industry recognized model, defines a networking framework for implementing protocols in seven layers. These layers include: physical (e.g., a wire); data link (e.g., serial port); network (e.g., packets); transport (e.g., TCP/IP); session (e.g., an FTP session); presentation (e.g., Windows OS); and application (e.g., e-mail program). With the objects, system events are passed from one layer to the next, starting at the physical layer and proceeding to the top layer in the hierarchy. Events can not only be passed among the modules to applications running on the same local computer, but events can also bubble up through the objects to applications running on remote computers.

An example of the propagation of a system event is now described. The event, here the "event" of an out-of-coverage situation of a wireless modem, starts at the hardware device 66 (FIG. 3D) whereby a wireless modem, which contains firmware, causes signal to be sent indicative of its out-of-coverage condition when the modem has traveled to a remote location, and a pin is set to high on the modem's serial port. The RS-232 port of the computer to which the modem is connected receives data serially from the modem. The Windows system driver 65 then fires an event to the communications link base class object 62 whereby serial data is collected in a buffer (queue 63*a*) by IO thread 63, and then sent via queue 63*b* to virtual thread 64 which passes the data to frame base class object 60. Frame base class object 60 in turn collects the data until a frame of data is created. To collect the frame of data, the data is read in bytes into the buffer until a trigger byte is sensed indicating that a frame of data is being sent. Once the trigger byte is sensed, all of the bytes of the frame are collected until an end of frame trigger byte is sensed.

The frame, containing data which represents the system event, is then sent from datalink level object 59 which acts as a passthrough to cable base class object 54*a*, which represents the communication link with the modem (e.g., X.25 Direct) and the carrier (e.g., Mobitex MPAK), through to the cable pool object 54 via cable anchor 67.

Next, the frame from cable pool object 54 is sent to socket pool object 70 (FIG. 3E) which associates the hardware event with the particular opened socket object. The socket and routing object 72 then passes the information onto the appropriate process object (FIG. 3B). From the process object, the information is then sent to the msocket.DLL pipe thread 90 of the programming module 33. At the programming module, the event is then associated with an application socket object and routed to the application (process) via the C++ class API.

An example of a communication from an application sending data to a remote location using the present invention is now described for illustration purposes. First, the application (such as an e-mail application) communicates with exchange place object components. Next, a process object is created which represents the process or execution of the e-mail application. A socket object is then created which specifies the destination address of the remote computer to where the data will be sent. Next, the proper cable object is selected which specifies which wireless modem (perhaps out of a pool of several modems) to use to communicate with the socket. Finally, the data is sent across the socket to the modem and through the wire to the remote computer.

The objects described above follow well-accepted object paradigms such as "inheritance" (properties inherited or derived from an underlying object such that if the underlying object is changed, the derived objects will change as well) and "polymorphism" (a program's ability to process objects differently depending on their data type or class). Thus, the wireless control program subsystem is designed to be highly extensible and anticipate future wireless networks and devices.

The device driver object takes into consideration all devices and/or wireless network specific features. Each device is treated and handled specially in an object to insure the optimal usage of the device and network infrastructure. In this manner, the present invention allows each modem to utilize the most reliable and least expensive method of transmitting the network's raw packets. Thus, through high object interaction, the present invention can handle any combination of transports, devices, and network protocols.

Using hardware interrupts which are signals informing a program that an event has occurred, the wireless control program subsystem of the present invention therefore uses an event-driven paradigm. Namely, the system module of the wireless control program subsystem can "bubble up" or relay information about an event from object to object, across modules (and even across computers) and eventually to the application(s) for virtually any change in condition, including out-of-coverage situations, device wire disconnects, over-heating, etc. With this feature, applications running on a computer along with the wireless control program subsystem do not have to poll the wireless device as they did with middleware. This creates many advantages, such as saving CPU cycles, giving an exact representation of the wireless happenings, saving battery life on the device and the CPU, and allows applications to be written more intelligently. As applications have the choice as to which events are important to it, applications can be programmed to filter all wireless events down to a sub-set which is important to the particular application. Therefore, with the present invention, applications do not have to process every possible event if it is not important to the application.

The present invention is thus uniquely attuned to the occurrence of wireless events. For instance, applications request messages to be sent, and, if the present invention knows that an out-of-coverage situation exists, it will not attempt to send data but can instead place the messages in a pending queue. As soon as the system module determines that the device is once again in coverage, it will then send the message. This has clear advantages over middleware which uses a "try-and-wait" paradigm and will continue to attempt to use the modem even when it is out of coverage.

Thus, with the system module of the present invention, a programmer can create, for example, an application which "sleeps" until it is notified via the system module that communications to the desired remote host is possible. Using most middleware, by contrast, applications would have to poll for this situation and could never sleep. A programmer could also write an application which immediately responds to the instant a device is detached from the computer. Again, most middleware would have to poll for this situation and would not be able to tell why the computer could no longer communicate with the device; only that it could no longer communicate.

The wireless control program subsystem of the present invention further allows a programmer to write an application which sits idle until it is placed in a docking station where, for instance, a truck-mounted modem exists. Middleware would again have to poll for this situation, attempting to connect to the modem continuously. In situations where the device was docked but for some reason could not communicate with the modem, middleware could not differentiate between these situations. An application could likewise be written that determines that a device is not in coverage in one network infrastructure and automatically checks coverage on another available network infrastructure. By doing this, an application can incorporate its own least-cost routing.

The wireless control program subsystem of the present invention can be viewed as a wireless product itself as it can run without any applications. Namely, once installed, the system module already has the ability to connect any configured devices in the system and register them with the networks. By simply adding a wireless device and opening the subsystem's interface with a right mouse click, users can immediately tell whether the wireless device is activated for the particular network as well as other items such as wireless network coverage checks, battery level indication, diagnostics, etc.

The system module also supports a full range of system diagnostics. Without requiring the development of an application, the user can obtain diagnostic information about the wireless device and the network such as registration status, signal strength, device address, etc. After inserting a configured wireless device, the user can instantly tell if the device is valid on the network and if the device is in coverage before any user applications are even started.

The system module also facilitates trouble-shooting. A responsive customer service representative requires that when problems do occur with an application, there is an effective mechanism to obtain the diagnostic information while an application is failing. To this end, a diagnostic panel is preferably available from the Windows Task Tray at all times and is accessible while an application is failing for real-time diagnostic analysis. Without shutting down the user application, a diagnostic panel in a window can report all of the information about problems with the connectivity whether or not the application was developed to report this information. This eliminates the old ways of diagnostics, such as making the user drop down to the DOS prompt, examine and potentially change an INI file, grab a log file, print it and fax it, or upload the file to a customer service representative to determine the nature of the problem. This of course also assumes that the log could be successfully created by the application and saved to disk. The diagnostics of the system module are "live" and any problems may possibly be fixed without the user even exiting his or her application. This eliminates many variables and after-the-fact debugging scenarios. If a user has a problem, he or she can simply click over to the diagnostic panel, get a clear vision of what is going on, and fix what is wrong even while the application is still running.

Additionally, all of the diagnostic information is available through the programming tools. Therefore, if an application developer decides to provide diagnostics to the user or wants to record the diagnostic information into a private information store, this is also possible. Further, depending on what kind of problem is found, the application can attempt to fix the problem since it can be provided with more detailed knowledge as to the error or a even automatically call for help.

With the system module, wireless devices can be provided with user-defined names for better diagnostic reporting. Error messages thus could read, for example, "Modem with the scratch is having trouble connecting because the RS-232 connection is absent" rather than a hard to decipher message such as "Cannot connect to COM1" as many middleware logs will report. In fact, certain middleware will report the same error message for many different errors. The diagnostic reporting of the present invention advantageously uses an object-oriented approach to give an exact picture of what is happening at all times.

Because the present invention is really an infrastructure or operating system extension, it can utilize "application routing" (explained below) to simultaneously deploy a third party application while developing a custom-built application. In addition, secondary applets (programs that can be executed within another application but not directly executable from the operating system) can be built later to run on the mobile device which will run smoothly with any currently running applications. This is because all of these applications are written using "sockets" (software objects that act as middlemen to connect an application to a network protocol) instead of locking up a communications port as in middleware solutions.

Through the system module, the present invention can be reconfigured without the need to modify applications. When enhancements are made, applications will benefit from these enhancements without any need to change to software. Automatic upgradability can also be utilized such that the present invention can automatically upgrade itself. Thus, the wireless control program subsystem of the present invention is built ready for new wireless networks and devices. Using a driver metaphor, the present invention can accept new devices as they become available and users can utilize the full features of the present invention in porting from one network to another without needing to change the application.

As stated above, the system module provides the present invention with a "socket" paradigm. Using sockets, there is a guarantee that data is transmitted to the destination application only once. This is true because a socket is a conversation between two applications and not two wireless devices or two middleware APIs.

The sockets used by the present invention are optimized for wireless transmissions, and, preferably, the high-overhead expensive TCP/IP protocol is not used over the air. Instead, each packet is disassembled, optimized for a wireless transmission, and recreated on the other side. In particular, different types of information are preferably provided in a single packet. Specifically, the packet preferably includes both user data and transport confirmation data. The preferred packet contains at least six separate categories of information, including (1) destination address, (2) source address, (3) user data, (4) transport confirmation, (5) delivery notification, and (6) performance and load information. All or some of these segment types could be combined within a single packet.

The transmission of a packet could be triggered by one of the following conditions: the presence of data; a request for socket connection; the need to generate a confirmation; or the notification of delivery sent when an application retrieves the data from the wireless control program subsystem.

The protocol optimizes the number of packets sent. Namely, after the last segment, which makes up a message is received by the program subsystem, there is the need to generate a transport level confirmation. The system module will fire events to the application notifying it of the message that is pending retrieval by the application. The system module expects the application to retrieve this data, and the act of retrieving this data will cause the system module to generate a delivery notification. Before sending this delivery notification, the system module will preferably wait a small amount of time for outgoing data. This delay accounts for the presumption that the application uses a higher level protocol and will respond to the newly-retrieved message. By following these rules, the system module attempts to fully utilize the outgoing packet by including the transport confirmation, message delivery notification and the outgoing data within the same outgoing packet.

Destination address information provides the destination of the packet. Source address information represents the sender or source and can be used for return communications once a connection is established. User data represents the actual data to be sent (e.g., an e-mail message). Transport confirmation data is used to indicate that data was sent to the computer. Delivery notification information is used by system module to notify the application that data was successfully sent to the destination application.

Performance information is used to monitor performance show fast the modem can send/receive and load information is used to monitor the strain or load on the modem, such as the amount of data currently being received by the modem from other sources. Thus, if too much data is being sent to a modem, the modem can overflow. However, with the transmission of packets in accordance with the present invention, modem performance data can be sent along with the data in the same packet such that the system can slow down or speed up data receipt based on the performance data in the packets being sent. Not only can speed or performance be monitored and controlled by the packet transmissions, but load can be monitored and controlled as well. For example, if a modem is receiving information from three sources, one of which is sending too much data, the receiving modem can send back information to the modem sending too much data and request that it reduce the amount of data being sent in the transmissions.

In another aspect of the wireless transmission protocols of the present invention, a "sleep" or wait feature is provided to allow for combining or appending small packets which are generally close in time which would have normally been sent as separate packets. This saves wireless transmission costs since it normally costs more to send two small separate packet transmissions, one at a time, rather than one combined packet which would take the same amount of time to send as the first small, separate packet.

Thus, the overhead of keeping the socket alive, key to every TCP/IP stack, is maintained in a wirelessly optimized fashion and traffic over the air is kept to a minimum thus keeping costs and transmission times down.

Figure 7:
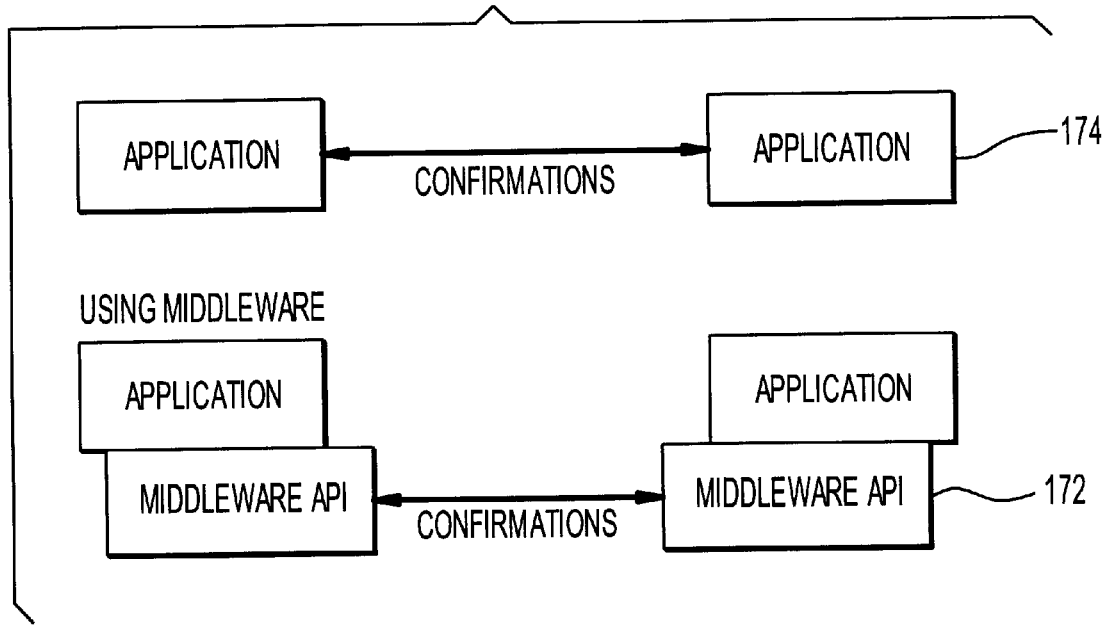
FIG. 7 is a block diagram showing the difference in data transport confirmations between the present invention and with middleware.

In order for a message to be considered complete, it must be accepted by the destination application. Referring to FIG. 7, middleware considers a message complete when the destination middleware API 172 receives the transmission regardless of whether the application ever receives it. Middleware can often retransmit entire messages and user applications must therefore handle this situation. The present invention can confirm that data has been transmitted by making application-to-application confirmations, notifying that data was delivered to the end application 174, and guaranteeing that the user received only one copy of data. Middleware cannot guarantee that data was received by an application once, twice or even at all, as middleware uses middleware-to-middleware confirmations, not application-to-application confirmations.

By utilizing objects to establish a connection rather than individual transmissions, re-transmissions of data, in those rare situations when they must be, are minimized. For instance, if a file is 95% transmitted and the user goes out of coverage for 2 hours, the present invention is able to respond gracefully and the open connection can be utilized to re-transmit portions of messages. When the user comes back into coverage, the socket is still alive and the unfinished message will finish by only transmitting the remaining unsent data. The socket on the other end will hold the portion of the unfinished message until the socket is consciously destroyed. In a middleware environment, the transmission will time-out and the portion of the message which was sent is discarded thus wasting money. In order to gain this same type of result using middleware, messages must be kept very small (packet-sized) and every application would have to manage the breaking up and reassembling of the messages.

The system module of the present invention preferably includes built-in data compression for messages, which can help keep transmission costs down. Standard TCP/IP implementations do not use compression which is optimized for wireless transmissions if they use compression at all. Therefore, even standard applications that run with the present invention, such as web browsers and FTP software using the Winsock 2 driver from DMD, will benefit from compression.

Varying types of data compression can be used depending on the nature of data being sent. The system module can utilize a variety of compression schemes such a PKZip and other proprietary compression algorithms. The system module takes the structure of the data into consideration and uses the most optimal compression algorithm. Most conventional compression algorithms are comprised of two components, the compressed data and a table which hold information necessary to de-compress the data. The system module's proprietary compression algorithms do not need to send the table portion over the air because this table is part of system module. This scheme saves precious wireless bandwidth and allow for efficient compression of even very small blocks of data.

The system module of the present invention preferably uses the Crypto API built into the Microsoft operating systems to provide built-in encryption to applications. By using this infrastructure, end-users can choose to use the Microsoft-provided encryption method, any number of third party encryption methods, or even expand the present invention to use a custom defined encryption scheme.

The system module further takes into consideration the local characteristics of the wireless device, such as battery strength, RSSI etc., as well as the load on remote devices such as number of sockets, RSSI etc. Network conditions such as out of coverage and registration status are also taken into account.

The system module of the present invention also avoids some of the other pitfalls of using a standard wireless network approach such as broadcasting. Namely, with broadcasting using a standard network driver, the networking protocol used assumes there is a high bandwidth available and will broadcast information between the computers, attempt to re-connect drive mappings, attempt to connect to printers, etc. There is no way to turn many of these features off. With the system module of present invention, broadcasting to each of the attached devices is eliminated as broadcasting is costly in a wireless network in which over-the-air transmission time is charged for.

The system module preferably is programmed with the ability to wirelessly update itself. Namely, as new versions of the wireless control program subsystem are made available with features that are important to an enterprise, such features can be added by generating an update request to a server which can wirelessly transmit software and remotely install applications. The system module also supports the ability to wirelessly transmit flash updates and remotely re-flash the BIOS on the wireless device for those wireless devices and platform environments which support this feature.

B. The Shell Extension Module

The shell extension module 31 of the wireless control program subsystem extends the Windows OS by extending the Windows Shell provided with the Windows operating system. Thus, with the shell extension module, the present invention is truly integrated into Windows 32-bit operating systems (Windows NT 4.0+, 95, 98 CE 2.0+, etc.).

The Windows Shell is the user interface of Windows which provides the desktop, windows, icons and other GUI elements to the user. In the present invention, the shell extension module provides programming or COM objects usable by Windows to provide additions to the Windows Desktop, Windows Explorer and Control Panel. The COM objects are objects known by the system and are used to create menus, windows, columns in windows, etc. The COM objects provided by the shell extension module include: IEnumIDList, IExtractIcon, IPersistFolder, IContextMenu, IShellExtInit, IShellFolder, IShellView and IShellPropSheetExt. Development of such shell extensions is within the skill of the ordinary Windows programmer and information relating to the development of such COM objects can be found, for example, in Microsoft Systems Journal, Vol. 13, No. 8, August 1998 issue, which is incorporated herein by reference.

Figure 8:
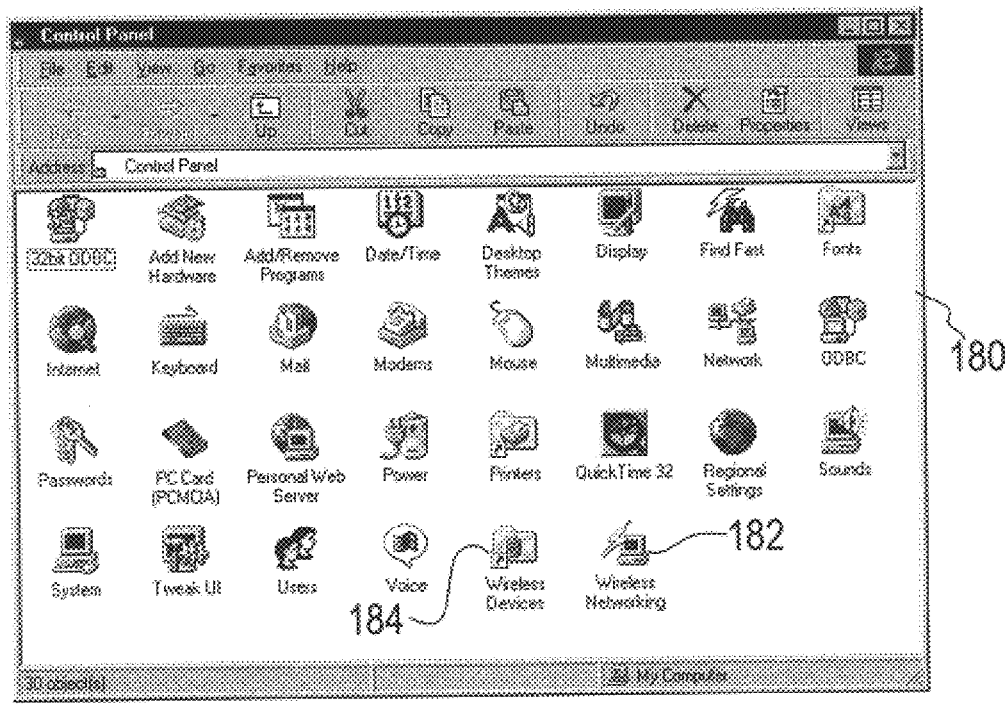
FIG. 8 shows a Windows control panel window including the wireless devices and wireless networking program icons added by the present invention.
Figure 9:
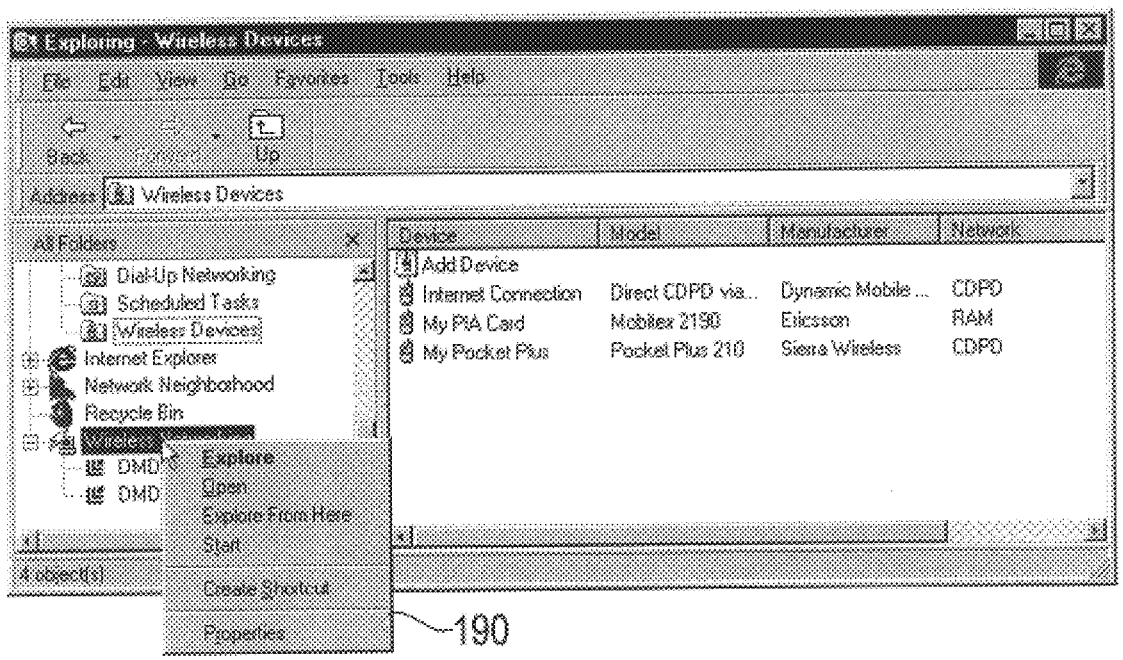
FIG. 9 shows a Windows Exploring window exploring the wireless devices folder.

As shown in FIG. 8, with the programming objects provided by the shell extension module, the Windows Shell is extended by adding to Control Panel window 180 a Wireless Networking folder 182 and a Wireless Devices folder 184. These folders are accessible via the Control Panel, Windows Task Tray, and Windows Explorer (see FIG. 9). Context or pop-up menus such as menu 190 as typically provided in Windows are also available on all objects via right-clicking the mouse.

Figure 10:
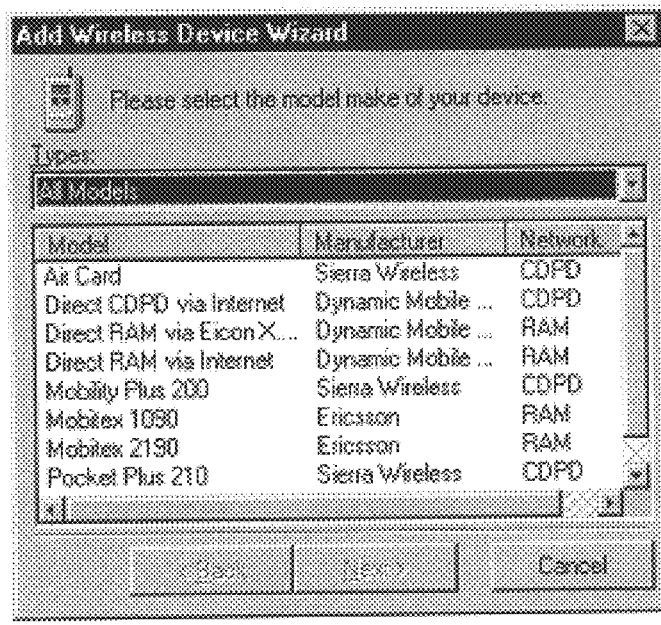
FIG. 10 shows a screen used in the Add Wireless Devices Wizard of the present invention.
Figure 11:
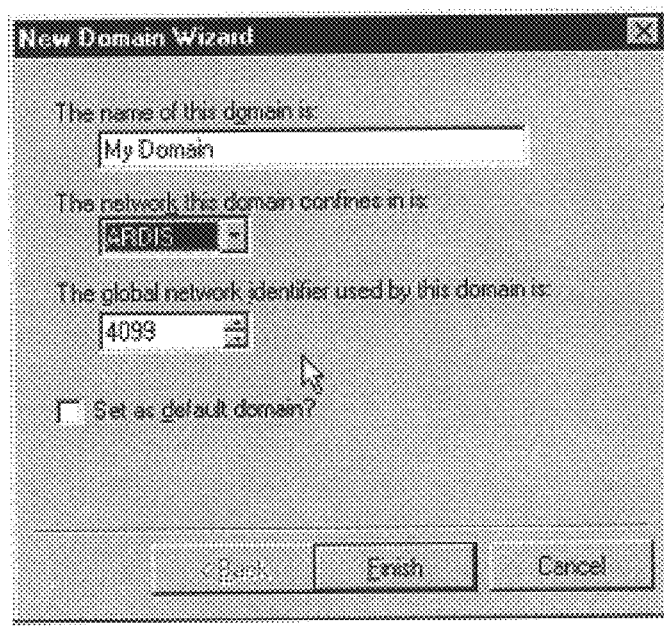
FIG. 11 shows a screen used in the New Domain Wizard of the present invention.
Figure 12:
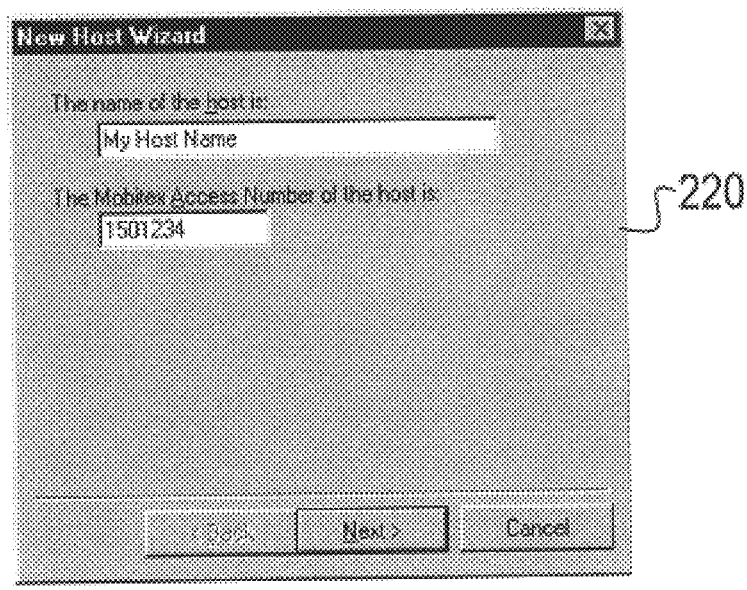
FIG. 12 shows a screen used in the New Host Wizard of the present invention.

Automated, user-friendly "wizard" programs are preferably used by the present invention to provide easy ways to configure and re-configure wireless devices and networks. For instance, as shown in FIG. 10, wireless devices can be easily added via Add Wireless Device Wizard (see window 200), new domains can be added via New Domain Wizard (see window 21 of FIG. 11) and new hosts can be added by New Host Wizard (see Window 220 of FIG. 12). Because of these wizards, there are no INI (configuration) files to edit and configuration is done completely through the Windows GUI via well-defined programming interfaces.

Figure 13:
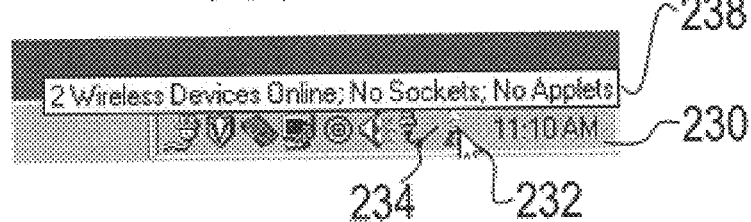
FIG. 13 shows the Windows task tray with icons showing the running of current applications.

The wireless control program subsystem of the present invention preferably starts automatically when a wireless connection is attempted. Once running, as shown in FIG. 13, status information is accessible from the Windows Task Tray 230 by positioning the pointer arrow 232 over icon 234 to display an informational window 238. Furthermore, the configuration panel is also available from the Windows Task Tray by right-clicking on the icon 234.

Figure 14:
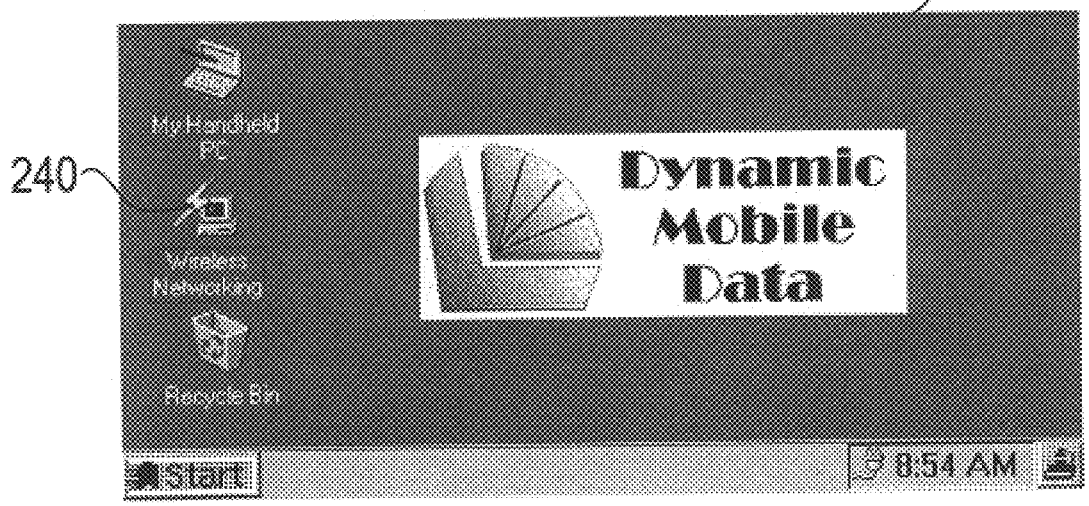
FIG. 14 shows the placement of the icon Wireless Networking on the user desktop of a Windows CE operating system.
Figure 15:
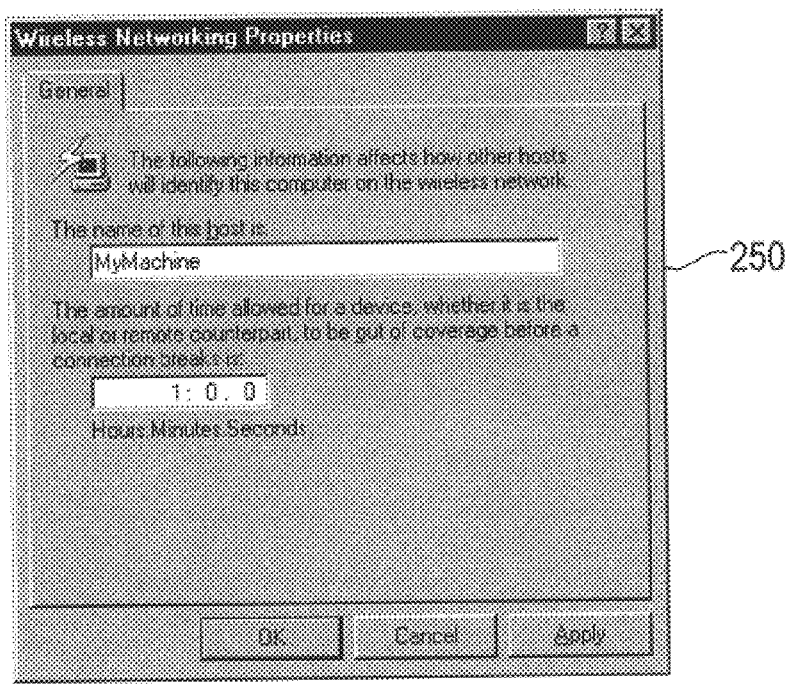
FIG. 15 shows a Wireless Networking properties sheet.

Once the wireless control program subsystem is installed, a start-up icon preferably appears on the desktop of the computer. For example, as shown in FIG. 14, icon 240 entitled Wireless Networking is provided on desktop 242 in a Windows CE operating system. Property Sheets, such as Wireless Networking Properties window 250 shown in FIG. 15, are also preferably available for all objects as well.

As stated above, there are no INI files used to configure with the wireless control program subsystem. Instead, the accepted standard by Microsoft and many third party applications is to use the information in the Windows Registry (a database used to store configuration information) to make intelligent decisions. An example of the use of this Registry information is back-up software, and server management software such as SMS (Microsoft's System Management Server which provides tools to assist in managing PC's connected to a LAN). By storing all information in the Registry, the wireless control program subsystem's configuration can be managed and backed up by these utilities, a feature which is much more difficult using an INI file, if possible at all.

The present invention also provides status windows to show names which mean something to the user (and not what the system decides it should be named) much in the same way that a user may name a printer whatever he or she chooses. Likewise, friendly names for wireless hosts are available such that the end-user can assign names to remote servers and peers which make sense to the end-user of the system, instead of having the application developer and/or administrator define some name that must be appropriate for the end-user.

Figure 16:
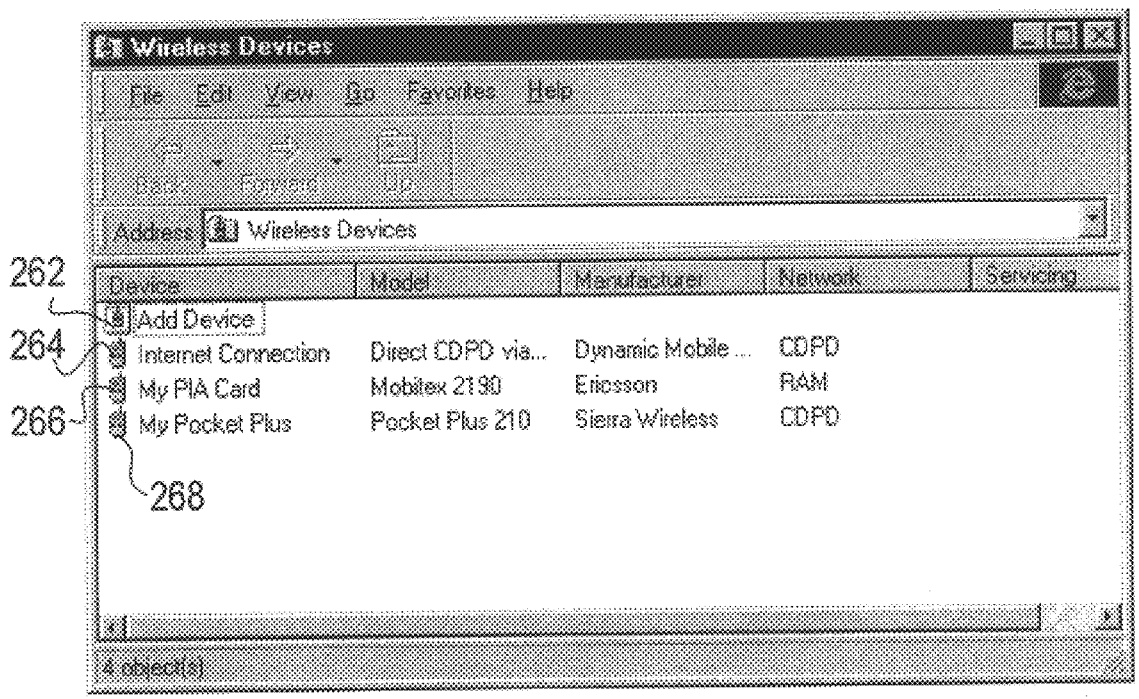
FIG. 16 shows a number of wireless devices objects.

As stated above, the system module of the present invention utilizes an architecture which abstracts the wireless devices into objects which can be represented on the screen as screen objects such as Add Device object 262, Internet Connection object 264, My PIA Card object 266 and My Pocket Plus object 268 (FIG. 16). These objects have properties in a similar metaphor as printer objects in Windows. Namely, in the same way that printers installed on the computer have properties, wireless devices also have properties. Windows supports an architecture which will allow it to support all future as well as legacy printers. In the same way, the present invention's architecture provides extensibility for all wireless devices in the market today and tomorrow. Just as any application written today is protected against new printers, applications will be ready for new wireless devices and networks and protocols in the future.

With the present invention, wireless devices are preferably provided with two types of properties: static properties and dynamic properties. Static properties are those in which the value is determined without device activation (i.e., communication port, device name, etc.) while dynamic properties are those in which the value can only be obtained from device when it is activated (i.e., IP address of a modem, the base-station to which the user is communicating, etc.) Static and dynamic properties of the wireless devices can be viewed and/or edited by means of standard property pages directly by system means (i.e., Windows Explorer). Both the dynamic and static properties can be read-only or read-write, depending on property and the device. For instance, in the case of the Mobitex network, the dynamic property MAN (Mobitex Access Number) for a radio modem (a/k/a "Mobidem") is read-only, but in the case of CDPD (Cellular Digital Packet Data), the dynamic property IP Address for a Sierra Wireless modem is read-write, while its EID (Equipment Identifier) is read-only.

Figure 17:
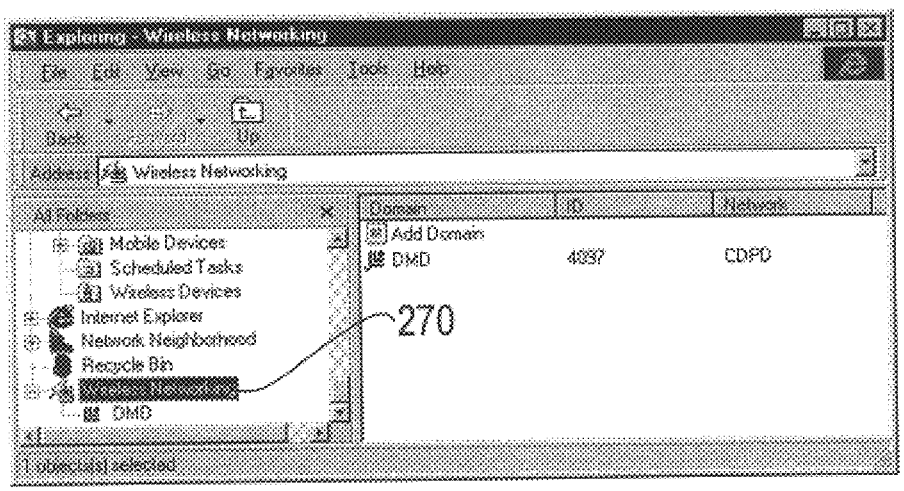
FIG. 17 shows a Windows Exploring window exploring the wireless networking object.
Figure 18:
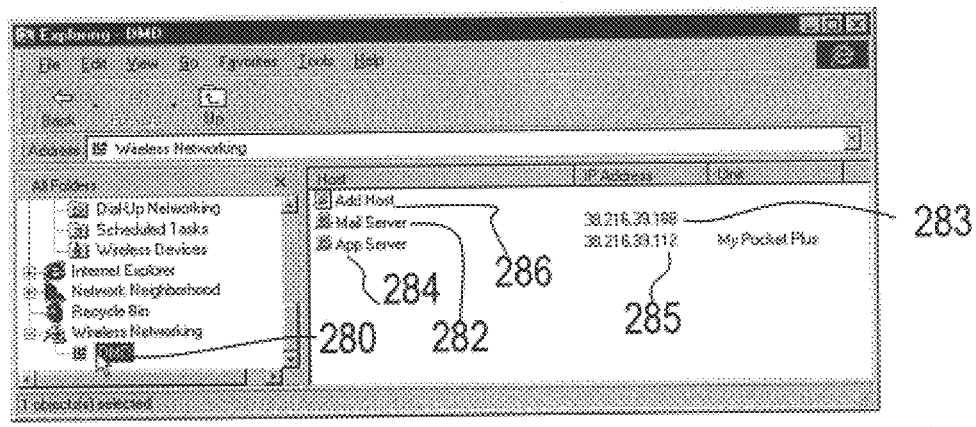
FIG. 18 shows a Windows Exploring window exploring the host object DMD.

The present invention uses a new way to define new name spaces (i.e., addressing schemes) for additional socket layers. For instance, the name "Wireless Networking" 270 shown in FIG. 17 is actually the Dynamic Name Space (DNS) of the wireless control program subsystem itself. As shown in FIG. 18, the name DMD 280 is shown as the current host that includes two servers, Mail Server 282 and App Server 284. The servers' respective IP addresses 283 and 285 are also shown. Additional hosts can be added via launching the Add Host icon 286.

The present invention also provides a built-in address book in which the user can send information to predefined names such as "Andrew" instead of the numeric IP addresses, MAN numbers, or whatever the native addressing is for the particular network in use. Further, well-known hosts in the address book can be designated to use a particular wireless device. This can also be changed at any point without the application having to change. The end-user can therefore switch networks without even touching the source code of the application.

Addressing can also allow multiple wireless devices from a particular network to be connected to a single machine and the present invention can choose the most appropriate device for given types of communications, such as "hot backup" (i.e., if a link goes down the system automatically switched to a different device) or communications via least-cost routing by selecting devices which will result in the lowest communications costs.

Addressing in accordance with the present invention further allows inter-networking and sub-networking. For instance, using the filtering features preferably included in the present invention, administrators can limit the hosts to which a particular client can send. This can keep costs down and prevent transmissions sent in error.

The present invention's wireless networking features provide numerous routing capabilities allowing disparate networks to communicate, devices to be shared across a LAN, multiple devices on the same machine, etc., all without changing programming but simply using the GUI to modify the properties of the wireless control program subsystem.

With the present invention, mobile users can always create sockets to one another regardless of what wireless device is being used on any particular day since the address book is maintained on the router. In middleware solutions, each machine had to maintain a list of remote addresses and friendly names for each of them. If a change was made because a particular device was broken or a user was assigned to a different truck, this information has to be propagated wirelessly to each machine, a very costly requirement. This unnecessary requirement of middleware has been eliminated by the present invention by preferably routing all traffic through a central server.

Figure 19:
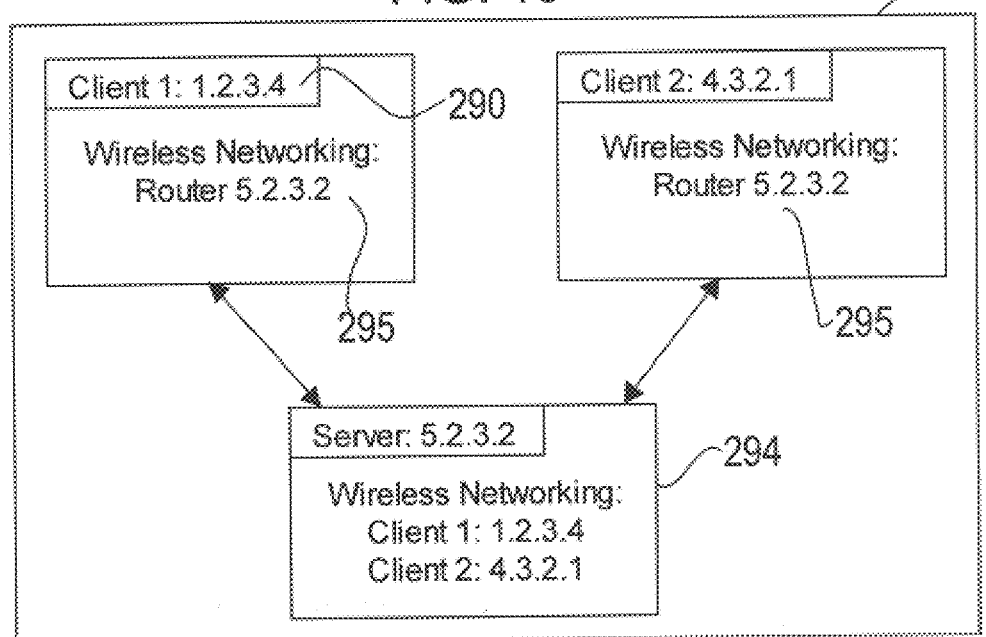
FIG. 19 shows a block diagram of the routing capability of the present invention.

Referring to FIG. 19 an example is shown of the present invention's routing capabilities. Here, Client 1 at box 290 wants to create a connection with Client 2 at box 292. Client 1 and Client 2 both only have in their Wireless Networking properties set up an address for a router 295. Client 1 can create a connection to Client 2 by allowing the wireless control program subsystem to forward packets to the server 294 acting as a router machine (in this example, IP address 5.2.3.2) where the address is resolved and forwarded again to Client 2.

The system and shell extension modules of the present invention provide a naming scheme hereinafter called "Dynamic Name Space" or DNS. DNS is analogous to the way the Internet URL names works today. Namely, if a user goes to a browser and enters the address http://38.216.39.2, the browser will connect to the Dynamic Mobile Data web site. However, it is much easier to remember the address "www.dynamicmobiledata.com", especially considering that Dynamic Mobile Data may change ISP's in the future and the numeric IP address may change. The Internet may have lost attractiveness and would never have gotten as popular if users had to enter a port number and an IP address into a browser. Instead, you simply enter a protocol (or use the default http:) and enter a name (such as www.dynamicmobiledata.com).

Likewise, with the present invention, a user can send wireless information to users using domains, names, and services. Therefore, if a user changes wireless devices and/or networks, the socket can still be created as the destination will still be found. Implementing common services will mean that an application can connect to a well-defined service on any of a number of hosts in the same way a browser connects to a WWW (World Wide Web) service on one of many well known hosts.

The present invention allows many machines to share a common Dynamic Name Space. This is done using the advanced routing capabilities provided to the user and/or application. Namely, the system and shell modules can be configured to forward all packets through a default device regardless of the destination host name. The address is resolved when the packet reaches the default router so defined. In turn, the remote router will forward the packet on to the destination system and a socket will be established for these remote machines through this router.

C. The Programming Module

As explained above, the programming module of the present invention extends the Windows OS by extending Winsock by providing objects through the C++ class library to programmers. With such objects, programmers can readily use this module to build applications and create virtual connections to other applications across one or more wireless networks and/or wired networks.

With the programming module, application can be written such that messages are guaranteed to be delivered in order. According to the Winsock specification, unless you specify an "out of band" message, messages must be delivered in order. This makes user coding much easier. Thus, with the present invention, messages will always appear on the opposite side in the order in which they were sent. Rather than creating a large message with all of the information and then writing complex parsing code on the opposite end, a programmer can send each piece of information in a separate message. The receiving application does not have to parse or break apart the incoming messages, as the application will get a distinct "Message Received" event for each message and can handle each individually. Alternatively, an application developer can send a large message and allow the an application to send it all as once large message and have a single Message Received event for the message. It is the choice of the application developer.

With the present invention, programmers have the freedom to use whatever programming paradigm they choose and can mix and match these paradigms within applications if different portions of the application have different requirements. Examples of how each paradigm is implemented are peer-to-peer, client-server, server-to-client (force dispatched), three-tiered and browser.

In peer-to-peer programming, one application can create a socket with another application on another machine. Bother peer machines would be listening for connections and can create and accept sockets. Once sockets are created, both sides can send messages across the socket. This paradigm is ideal for clients who are on-line all of the time, for installations which have no server, or installations which have a great deal of peer-to-peer messaging requirements.

For client-server programming, once a connection to a remote application has been made, both sides can send at will. This is key to a client and server model. No longer will applications need to employ a "try and wait" paradigm, as servers can simply listen for client connections and send only when those client connections exist. This paradigm is similar to a mail client paradigm where mail servers only forward mail to a user when the client has logged in. If mail servers used the middleware paradigm, they would attempt to send mail to a client every time a new message was received and would keep sending the message until the client eventually came on line and could receive it. Mail servers would become very quickly bogged down in this paradigm. The same is true for a wireless application. There is no need to send a message to a user who is not there. Using a connection-based paradigm, the chance of sending a message to a client who is not ready to receive a message can be significantly reduced.

With server to client (forced dispatch) programming, a server can create a socket to a client just as a client can create a socket to a server. In this instance, the server would be using the peer-to-peer model alongside the client-server model.

For three-tiered programming, this approach would be an extension of the client-server approach. A server application which receives a socket from a client can pass data off to an "agent" which can perform a task such as a host transaction or a web-based query. Then, the information can be passed back to the application across the socket.

Finally, for browser programming, the present invention's Winsock 2 driver can be used to deploy HTML and Java-based applications wirelessly.

The programming module of the present invention enables programmers to also guarantee that transmissions have been accepted by the receiving application; not just the receiving modem. In middleware solutions, modem-to-modem confirmations are made. Therefore, if a remote modem is on and connected, but a user application is not ready, and/or the computer is not connected to the modem, the sending side will assume a successful send when in fact, this is not the case. The application may never see this message. With the present invention, the application must perform an acceptance of the packet. Once this acceptance has been made, the socket is used to send a confirmation back. The sending application can now, with confidence, flag the message as sent successfully.

With the present invention, applications be written to use one or more wireless devices, and wireless devices can be used by more than one application through device routing. This feature allows a user to have an application serving connections from different wireless networks and/or wireless devices. Applications can be connected through sockets to more than one application at the same time and those applications can exist on one or more remote machines. Applications can also be communicating over one or many wireless networks simultaneously. Sockets can be created across different wireless networks via the present invention is configured as a network router.

The present invention supports multiple wireless networks at the same time (like CDPD and Mobitex) providing bridging capability. Any socket can cross as many network boundaries as necessary. For instance, a socket could be created in CDPD, go into RAM, and from there go into a regular LAN or WAN. Thus, one machine can simultaneously send data over many wireless networks providing an even better chance at getting close to 100% coverage.

Further, an application can be defined to use the best network and least expensive network on the fly by having more than one network and more than one device on the machine. For example, an application can be written to use a wireless LAN connection or infra-red communications when in local coverage, and when the mobile unit leaves the local coverage, to automatically switch to a public network using a wide area radio.

Through application routing provided by the present invention, unlimited applications can be connected simultaneously. The system module of the present invention thus acts as a marshal between the processes and allow all applications to use the full capabilities of the system. This includes all wireless devices, all diagnostic reporting, etc. User applications can also be deployed alongside system services delivered by third parties, The present invention allows programmers to have the ability to re-route inbound packets from one wireless device to another wireless device. Utilizing this feature, a socket, for example, can be created from a Mobitex device to a CDPD device via a single server which is configured with devices for both protocols.

Socket routing, through the system module, is also provided by the present invention, which is actually network routing split out to yield significant advantages. Socket routing allows sockets to be sent from one wireless network to another disparate wireless network. For instance, through socket routing, a socket can be connected to a disjoint network through a central server. In other words, all users of one network can be given access to all users of another network via a central server and all of these users can treat the remote device as their own.

The present invention can also be extended to a LAN-based device. Thus, an application can be built which has only one wireless (really wired) device attached to it such as a direct LAN connection. A single box on the LAN can then have a wireless modem attached to it and, using the present invention's wireless network routing features, all LAN users can create sockets using the same wireless device.

Any and all of the components built by software developers can be used simultaneously in the same application. This means that you can have one application talking Winsock, ODBC and ActiveX, all together without any problems. By contrast, in stacked middleware approaches, once a developer picks a target API, he is restricted to that level and cannot ask questions to stacks below or above it. The present invention gives the user the freedom to ask questions on any level at any time, and to use multiple levels at once. For example, one application can user higher level ODBC commands which have no concept of signal strength and at the same time have another socket using ActiveX reacting to changes in signal strength. Using middleware, the developer who chose to use ODBC would be restricted to use only the functions which ODBC provides.

Prior to the decision of which wireless infrastructure is to be deployed, all application development can nevertheless proceed using the with the application configured to use a LAN (Local Area Network). This is because using the present invention, there is no practical difference between wireless and wired networks. Applications can be designed, developed, and tested in LAN environment and then deployed in a wireless network environment.

Likewise, an application written for a mobile device using a wireless network can be brought back to a docking station and operate over a wired network (and even over the Internet) without requiring code changes, or underlying API and DLL replacement/renaming, etc., by simply adding a wired Host to the Wireless Networking Folder and the application will have all of the knowledge to communicate over the wired network.

D. The Industry Standard Interface Module

The industry standard interface module exposes to the programmer standard interfaces in which to program, and allows development of industry-standard programs using ActiveX controls, Winsock and ODBC. Thus, this module of the present invention was designed to accommodate ActiveX, Microsoft's components and technologies for creating controls that can be downloaded and executed by a web browser and have full access to the Windows operating system. Thus, the present invention uses COM (Component Object Model) objects on which ActiveX is based and provides Microsoft Windows shell extensions to configure its options, a feature only available through the COM specification. Likewise, the present invention also accommodates programming using Winsock and ODBC.

The present invention is also capable of exposing many interfaces through COM in the future. By using advanced features of Microsoft's Active Template Library (ATL), the present invention is ready for DCOM (Distributed COM), giving programmers the ability to deploy ActiveX controls remotely.

The present invention preferably uses MobileX™, an ActiveX-based interface offered by DMD, as its first interface. MobileX™ is a connection-based message control which models very closely the core functionality of the present invention exposed as an ActiveX interface. ActiveX is implemented using Microsoft's ATL and DCOM is built to be used remotely. As MobileX™ is built in this manner, it provides an ability to have one server directly connected to Mobitex and/or CDPD and offers multiple application instances in the same LAN and/or WAN.

MobileX™ thus provides a core, "down and dirty" wireless-aware Winsock programming tool for the user and provides an easy way for programmers to use a programming language which supports ActiveX controls (e.g., Visual Basic, C++, Delphi, Internet Explorer, PowerBuilder). Thus, no knowledge of a C-based API is even needed. All properties are exposed through a type library and a dual-interface is exposed, making it very efficient in environments like Visual C++. Full MFC Wizard support is also provided (a wizard API provided by Microsoft)

The present invention does not use straight TCP/IP protocol over networks like CDPD for various reasons. TCP/IP is inherently a heavy protocol and is not suited very well for wireless applications. Most IP stacks today use a dial-up networking approach, and standard IP stacks and standard TCP/IP applications cannot react properly to the challenges in wireless computing.

Because developers have invested large amounts of effort in developing applications on LANs which employ certain standard higher TCP/IP architectures such as POP, SMTP, etc., the present invention also includes a more wireless-aware TCP/IP transport protocol in order to help users leverage this code where it makes sense. Therefore, some less critical messages can be sent via standard means, and those messages over which more control is needed, specialized wireless routines may be built.

The present invention exposes a standard Winsock 2 driver and thus any programs previously written to Winsock 2 can be used by the present invention. Also, the present invention makes the address book as a name space extension to Winsock 2. Thus, standard Internet and/or TCP-IP applications can be run with the software of the present invention and the adds the benefit of simultaneously working with applications which are more wireless-aware.

In the same respect as the Winsock 2 Driver, the present invention preferably includes a wireless database access infrastructure, and preferably MobileQuery™ offered by DMD. MobileQuery™ allows existing applications to run against remote databases by exposing a Level 3 Compliant ODBC Driver for Windows 95 and Windows NT. MobileQuery™ intercepts calls made to the driver, transmits them wirelessly, and executes them on the server against any Level 1, Level 2, or Level 3 ODBC driver. Results, error messages, etc. are then passed back to the client. By employing this architecture, the wireless control program subsystem can wirelessly enable any ODBC-compliant database.

The present invention may also include SNMP (Simple Network Management Protocol) hooks so that users will be able to monitor remote wireless devices. Using the addressing scheme of the present invention, a wireless network administrator is capable of defining a subset of the devices to be monitored by any available criteria. Also, data which is received can be populated up into a standard SNMP viewer such as OpenView.

E. Applications

With the present invention, end users can run applications written for communicating with and managing wireless devices. The present invention gives mobile users an ability to run standard software such as FTP (file transfer protocol) software and browsers using the industry standard interface methods described above.

Third-party applets can be run and provide a great deal of functionality to the mobile system so that these functions do not have to be re-written each time. The applets can be automatically started by the present invention when an incoming socket requests it.

The present invention has the ability to allow the user to configure the software to provide notifications of wireless events in a number of ways including pop-up boxes, e-mail, log-files, etc. This allows a user to have better customizability. For example, if an application is not defined to notify the user when he is in a fringe area, the user does not need to ask the developer for a change to the application, he can tell the Notification Manager to display a pop-up box and play a WAV file when he goes below a certain level.

The present invention also has the ability to launch known applications when pending sockets arrive for the application. This means that remote applications which are used rarely can be automatically started when requested by a remote server or remote mobile device and instantly become available. Also, applications by third-party vendors which are wirelessly aware can run along side any other wireless application based on the present invention. Finally, user applications which have been custom deigned and built for a particular mobile user will gain all of the benefits discussed above.

III. Software Installation

The preferred requirements to run the wireless control program subsystem of the present invention include a computer running Windows 95 (service pack 1 or higher is preferred) or Windows NT 4.0 (service pack 3 or higher is preferred). Hardware requirements include a PC or PC-compatible computer (and preferably at least an Intel Pentium processor), 16 MB of RAM, at least 1 MB of free hard disk space, one or more wireless communications devices and an active subscription to a wireless network provider. Winsock 2 is also necessary for Windows 95 installations.

Figure 20:
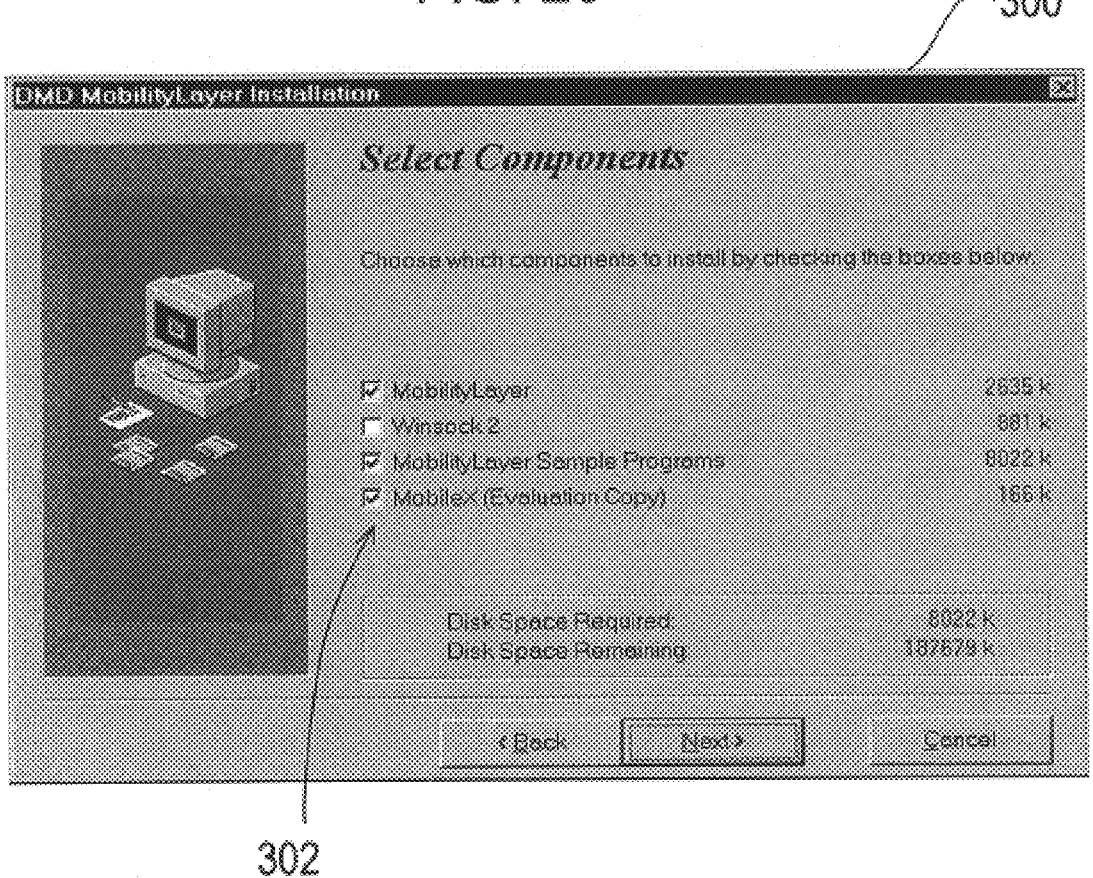
FIG. 20 shows an initial screen of the installation process of the wireless control program subsystem of the present invention.

The wireless control program subsystem can be loaded via software on the PC through standard installation techniques such as by floppy disks 21 or CD-ROM 22 (FIG. 2) which will guide the user to follow installation prompts on the screen. During installation, as shown for instance in FIG. 20 which shown an initial installation screen 300, certain options such as components 302 can be selected by clicking the mouse once on checkbox of the desired option.

Figure 21:
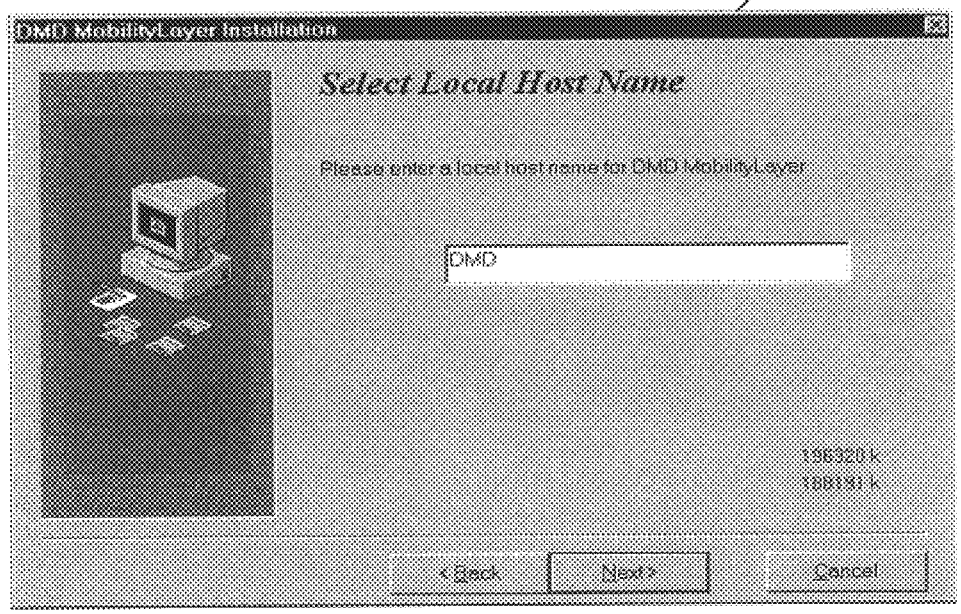
FIG. 21 shows an further screen of the installation process of the wireless control program subsystem of the present invention.

During the installation procedure, a "Local Host Name" must be entered as shown on screen 310 of FIG. 21 which will be used to identify the user's local host. If the Host Name field is left blank, the user's PC name will be used as the default for the local host name.

Figure 22:
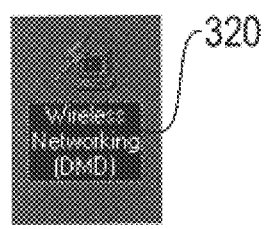
FIG. 22 shows the provision of new desktop icon on the desktop of a Windows operations system.
Figure 23:
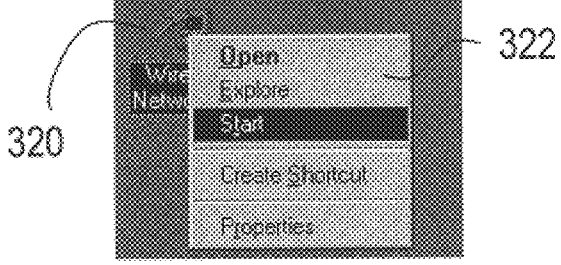
FIG. 23 shows a pop-up menu appearing from the desktop icon of FIG. 22 when selected.
Figure 24:
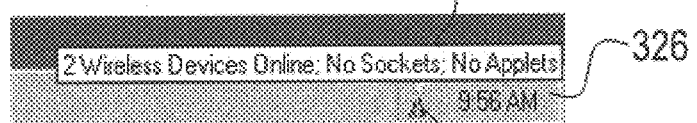
FIG. 24 shows an icon in the Windows task tray showing the running of the wireless control program subsystem of the present invention.

After installation, the user is provided access to a new desktop icon 320 labeled Wireless Networking (FIG. 22). To start the program, the user can simply right-click the Wireless Networking icon 320 and select Start from the pop-up menu 322 (FIG. 23). After starting, the user will see icon 324 in the system task tray 326 (FIG. 24), indicating that the wireless control program subsystem has been started. Also, placing the mouse over this icon will display in box 328 the current status of some of program's connection statistics (FIG. 24).

Figure 25:
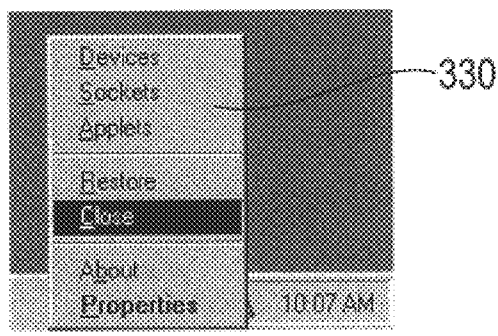
FIG. 25 shows a pop-up menu appearing from selection of the program icon in the task tray of FIG. 24.

To exit or quit, the user can right-click the icon within the system task status bar and then select Close from pop-up menu 330 (FIG. 25). The wireless control program subsystem is designed to terminate all currently active socket connections before stopping, and the user will be given the opportunity to abort the exit process in the event that Close was selected accidentally.

Figure 26:
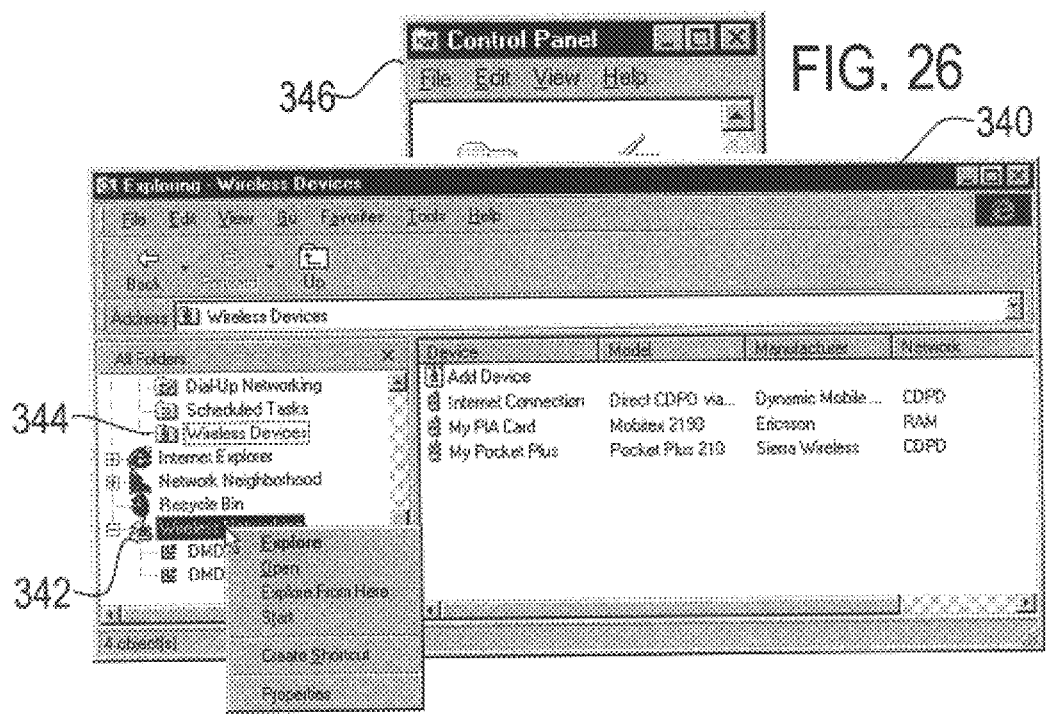
FIG. 26 shows a Windows Exploring window exploring the wireless networking object.

Preferably, installation macros or "wizards" are provided as means through which the user can configure the operating environment, which consists of wireless Networking Properties, Devices, Hosts and Domains. To this end, as shown in FIG. 26, the Windows Explorer Shell 340 is extended with a Wireless Networking folder 342 and a Wireless Devices folder 344, which are accessible via the Control Panel 346 or the Windows Shell. Context Menus are also available on all objects.

Figure 27:
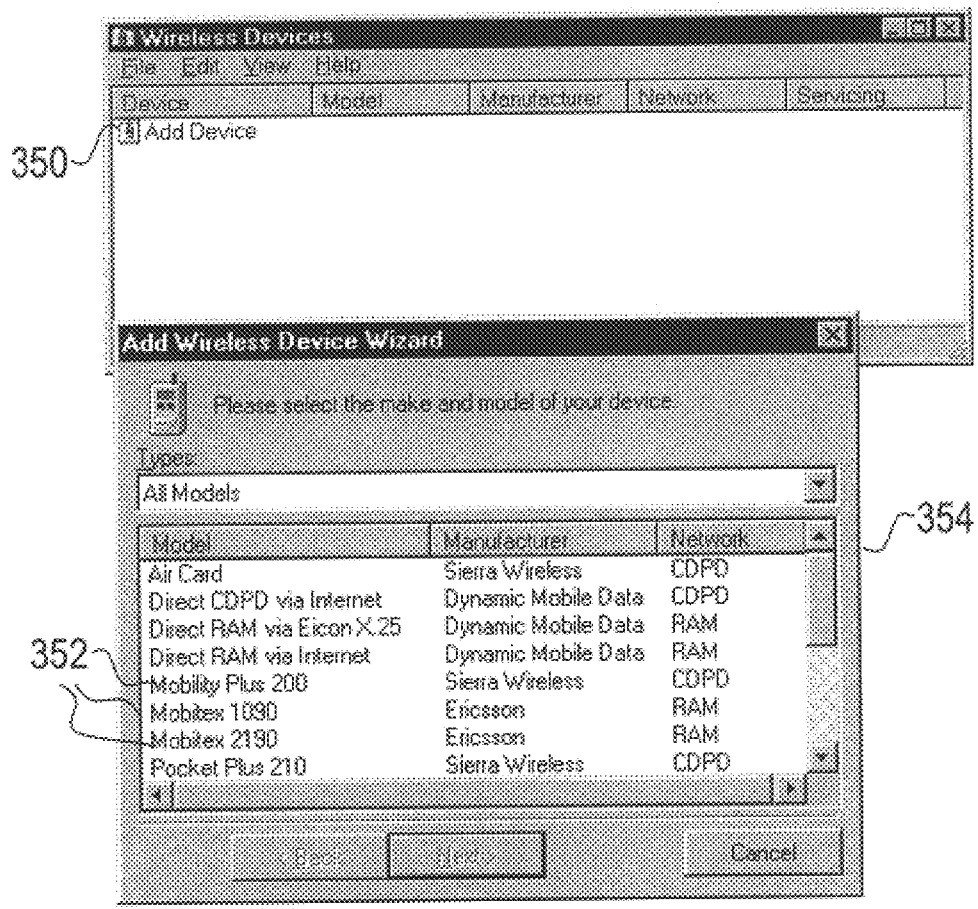
FIG. 27 shows the Add Wireless Device Wizard window launched from selection of the Add Device icon.

The Device Wizard (FIG. 27) allows the user to easily configure a device for use with the program. The Device Wizard is comprised of three set-up screens-the Identity, Communications, and General Properties screens. To add a Device, the user can select Add Device from either the Control Panel or the Add Device label 350 from the Windows Explorer by selecting Wireless Devices. The user can then choose the desired device from the list 352 of available wireless device drivers in the Identity screen 354.

Figure 28:
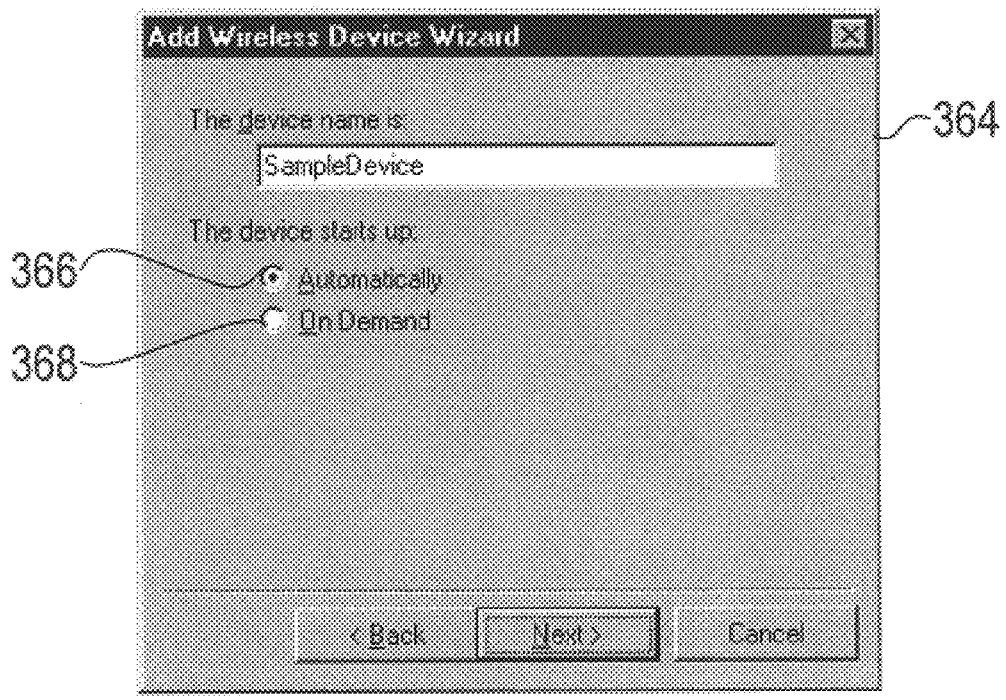
FIGS. 28–34 show screens displayed in connection with the Add Wireless Device Wizard.

As shown in FIG. 28, the first screen within the device wizard is the Device Identity screen 364. Here, the user provides a name for the new device configuration and then sets the Device Startup Mode (FIG. 27), by selecting either the "automatic" radio button 366 or the "on demand" radio button 368. "Automatic" indicates that the wireless control program subsystem will attempt to initialize the device when the wireless control program subsystem is started while "on demand" means that the wireless control program subsystem will not initialize the device until an application attempts to use it.

The second screen shown holds communication-related parameters and will differ depending on the device type. The different configurations include CDPD and Mobitex Mobile Configurations, Mobitex X.25 Direct Configurations, Mobitex Internet Direct Configurations and CDPD or LAN/WAN Direct Configurations.

Figure 29:
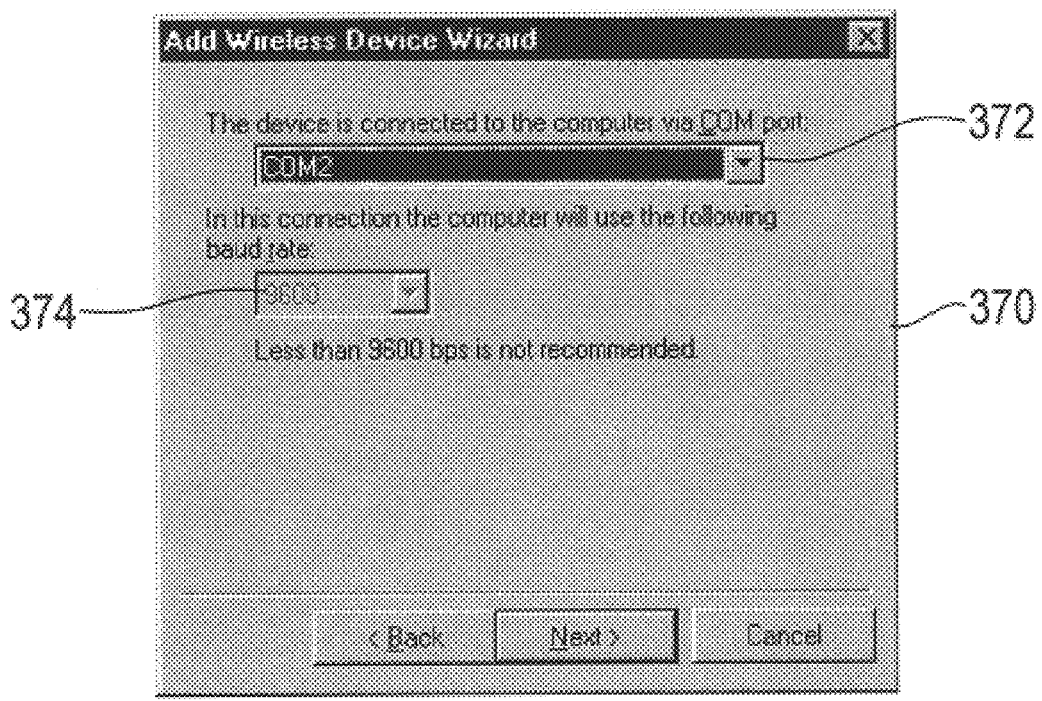

Referring to FIG. 29, to configure a PCMCIA, integrated, or external Mobitex or CDPD device, the following steps are followed. First, the user selects the communication port from drop-down list 372 in window 370 to associate with this configuration. Next, if applicable, the user selects the line speed from drop-down window 374 at which the wireless control program subsystem should connect to the device.

Figure 30:
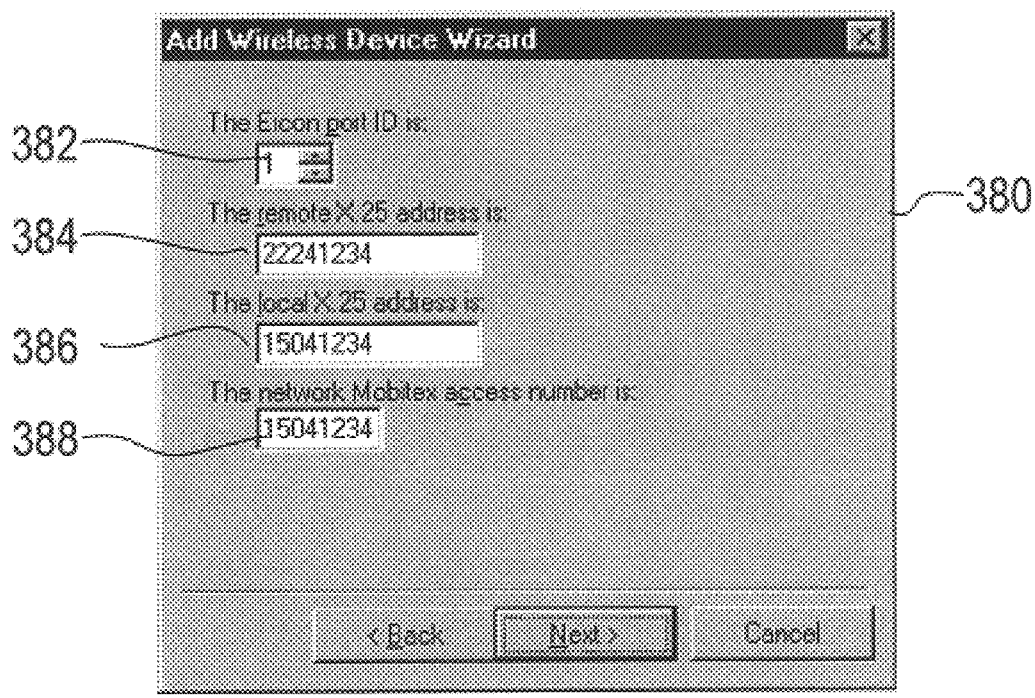

Referring to FIG. 30, for configuring a Mobitex X.25 Direct configuration, the user enters the X.25 Eicon card Port ID at location 382 in window 380 that was previously entered as part of the Eicon card installation. Next, the user enters the remote X.25 address at location 384, the Local X.25 Address at location 386 and the Mobitex access number associated with this configuration at location 388.

Figure 31:
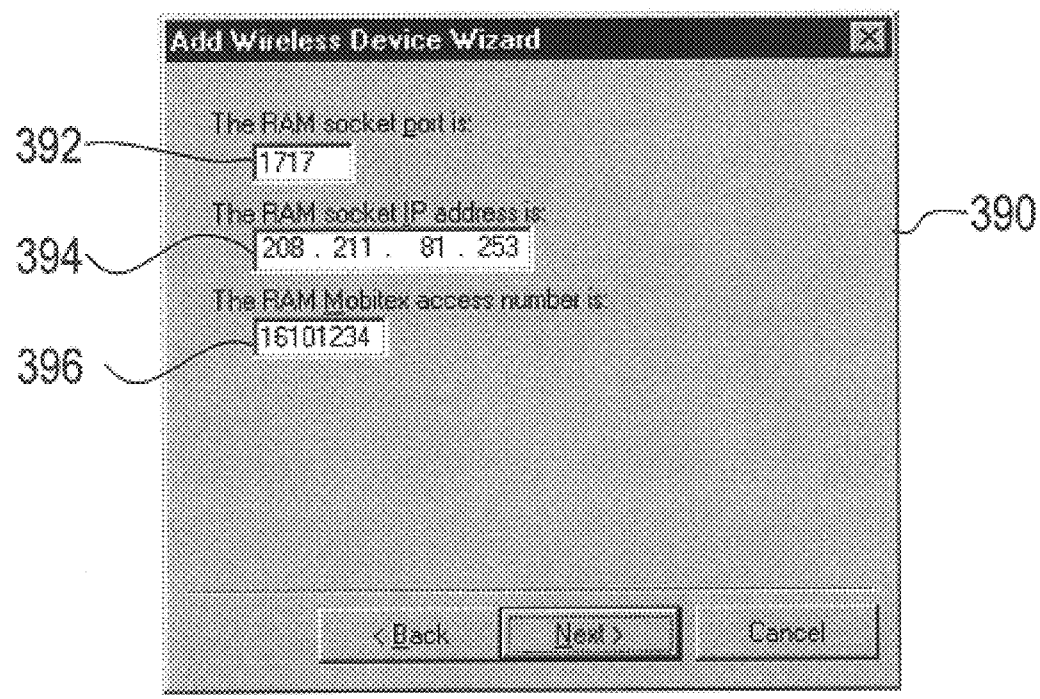

Referring to FIG. 31, for configuring a Mobitex Internet Direct configuration, the user enters the TCP/IP Port ID at location 392 at window 390, the IP Address at location 394, and the Mobitex access number associated with this configuration at location 396.

Figure 32:
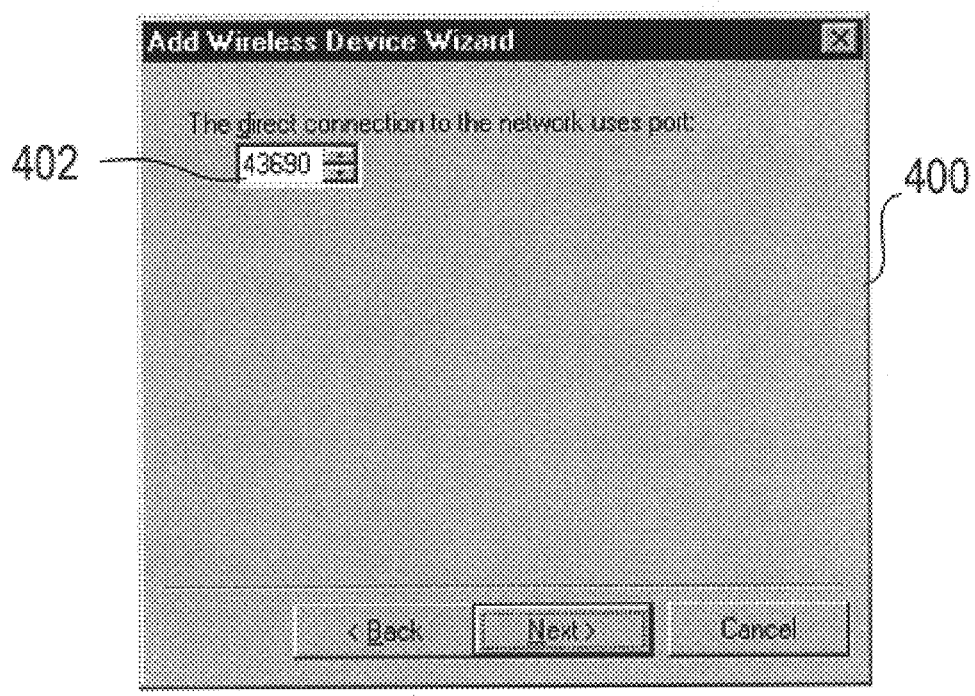

Finally, referring to FIG. 32, for configuring a CDPD or LAN/WAN Direct configuration, a screen 400 is presented to the user to enter the port ID at location 402 to associate with such connection. In most cases the default value of 43690 is sufficient.

Figure 33:
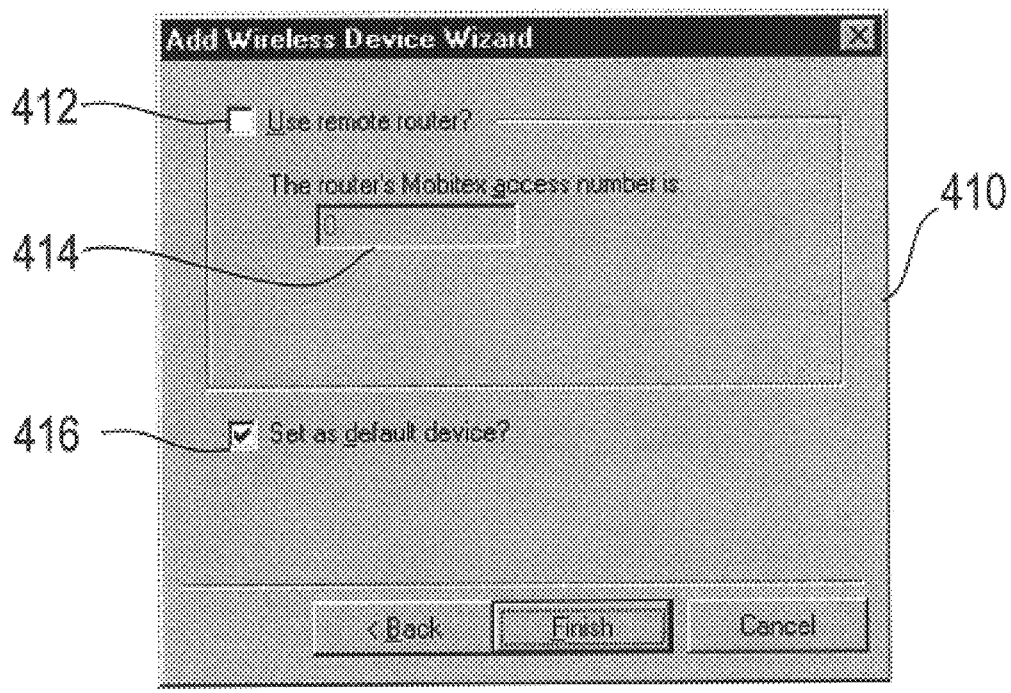

The third and final screen holds General properties related to the device and will differ depending on the device type. For Mobitex, as shown in FIG. 33, the user can indicate at screen 410 whether the device will use a remote router at check box 412. If this option is selected, the user must also provide the network address of the remote router at location 414. The user must also indicate if the device is to be used as the default device at check box 416. The default assignment indicates that this device will be used for all socket connections that do not specify a domain as part of their destination address.

Figure 34:
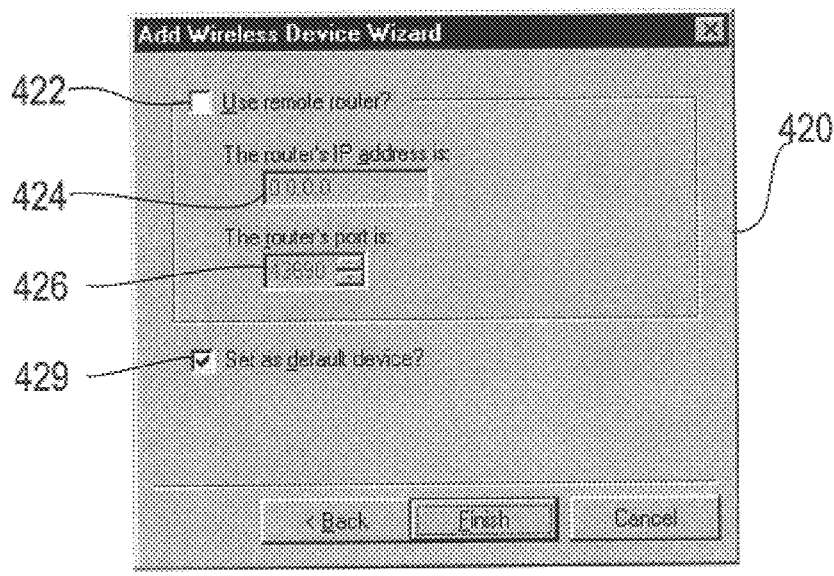

For CDPD, as shown in FIG. 34, the user can indicate at window 420 whether the device will use a remote router at check box 422. If this option is selected, the user must also provide the network address at location 424 and port ID of the remote router at location 426. The user must also indicate if the device is to be used as the default device at check box 428. The default assignment indicates that this device will be used for all socket connections that do not specify a domain as part of their destination address.

Figure 35:
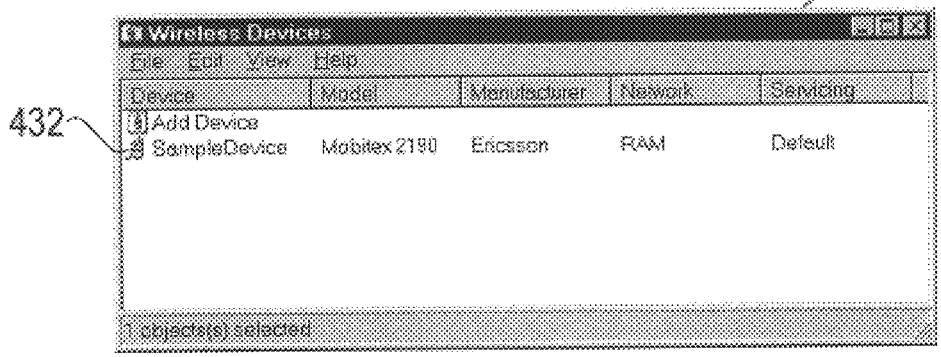
FIG. 35 shows a Wireless Devices window displaying the new object SampleDevice created via the Add Wireless Device Wizard.

As shown in FIG. 35, once the user has added a new device, e.g., "SampleDevice" label 432 shown in the Wireless Devices window 430, the device is immediately usable by program.

Figure 36:
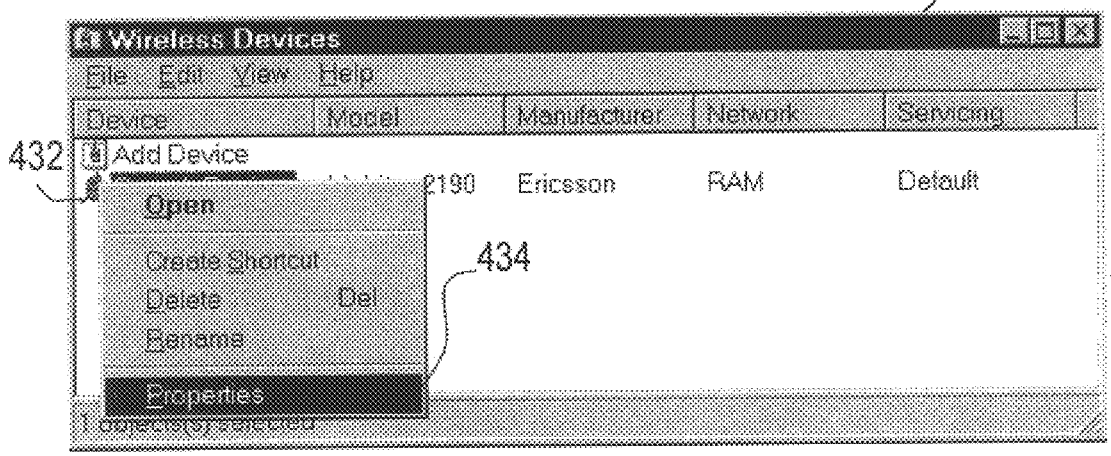
FIG. 36 shows a pop-up menu appearing from selection of the object SampleDevice with the Properties command selected.
Figure 37:
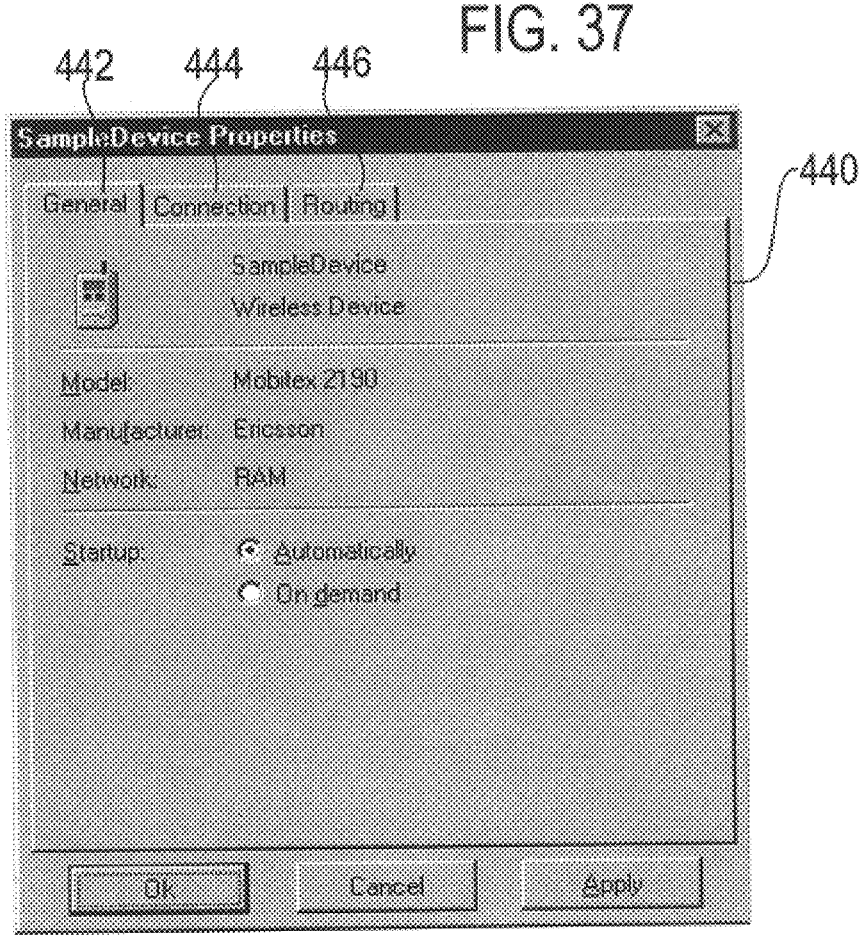
FIG. 37 shows a property sheet for the object SampleDevice.

The present invention also allow the user to easily modify an existing device. Namely, to modify an existing device, the user first selects its properties by right-clicking on the device, such as SampleDevice 432 specified in the Wireless Devices window 350 shown in FIG. 36. The user then selects "Properties" 434 to then display a Properties window 440 as shown in FIG. 37 and is then free to modify any of the device's configurable properties under each tab such as tab 442 for General properties, tab 444 for Connection properties and tab 446 for Routing properties.

Figure 38:
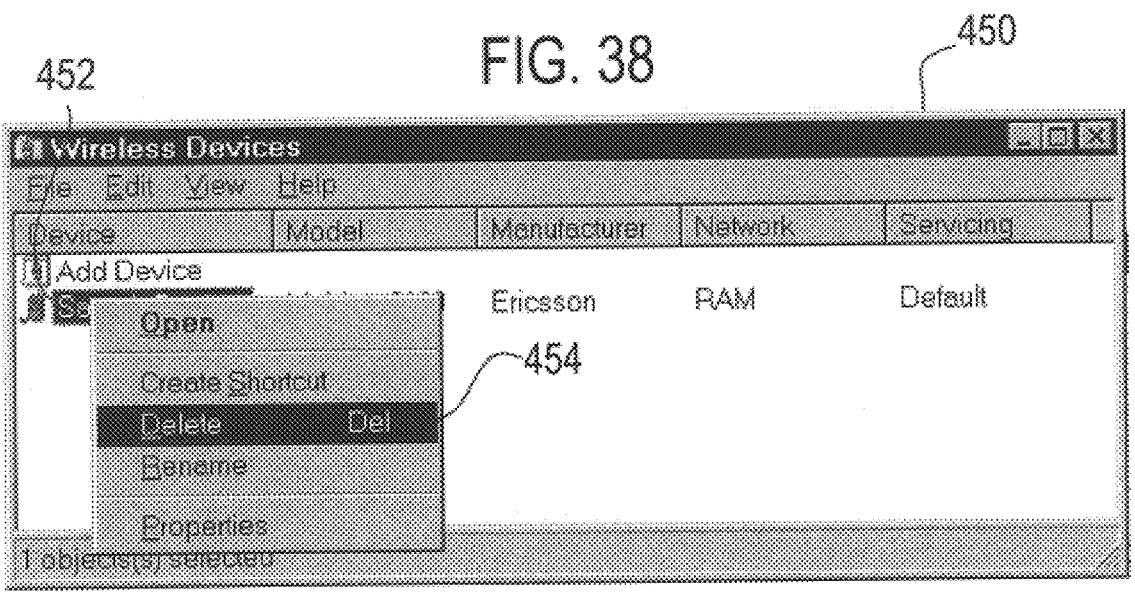
FIG. 38 shows a pop-up menu appearing from selection of the object SampleDevice with the Delete command selected.

To remove an existing device, as shown in FIG. 38, the user can simply select the device from window 450, such as selecting SampleDevice 452 by right-clicking with the mouse, and selecting Delete command 454 to perform a delete operation just as with deleting a file.

Figure 39:
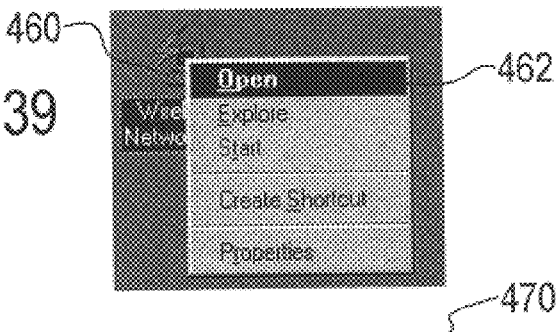
FIG. 39 shows a pop-up menu from the selection of the Wireless Networking icon with the open command selected.

A Domain Wizard is also provided to the user. A Domain is defined as a group of Hosts within a particular wireless network, and a Domain name is the name that is given to this group of Hosts. As shown in FIG. 39, to add a Domain, from either the Desktop or Explorer, the user can double-click the wireless networking Icon 460 or right-click the wireless networking icon and select the Open command 462.

Figure 40:
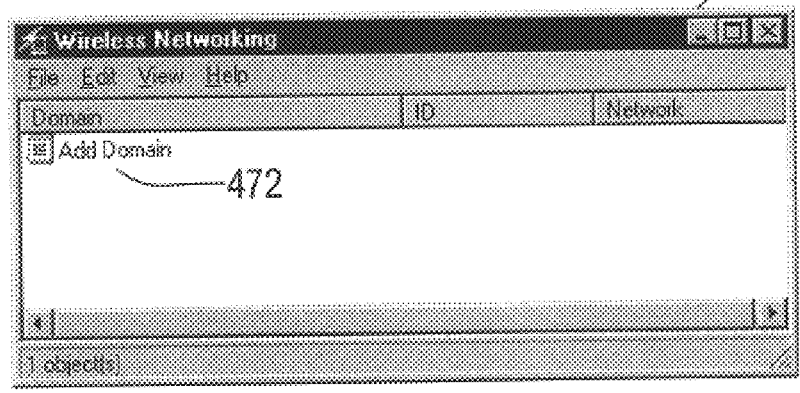
FIG. 40 shows the Wireless Networking window displaying an Add Domain object which is seen after opening the Wireless Networking icon of FIG. 39.
Figure 41:
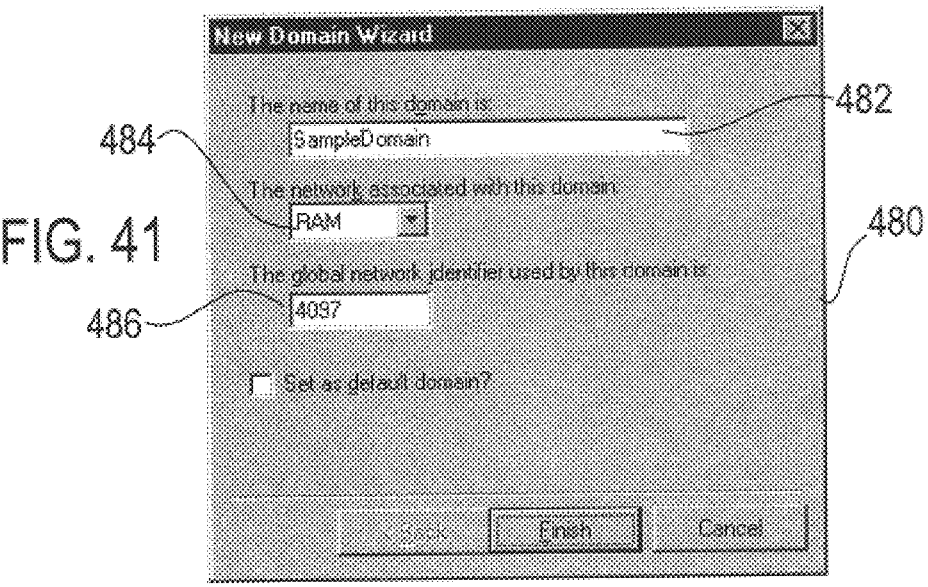
FIG. 41 shows a screen used in the New Domain Wizard.
Figure 42:
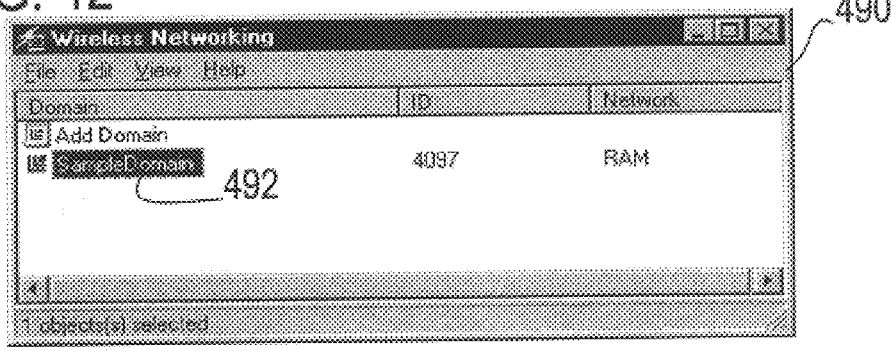
FIG. 42 shows the display of the new object SampleDomain added via the New Domain Wizard.

Referring to FIG. 40, the user then presented with the Wireless Networking screen 470 and double-clicks on the "Add Domain" item 472 to start the Domain Wizard. The New Domain Wizard screen 480 (FIG. 41) is then presented. This screen allows the user to specify attributes for the new domain. First, the user enters a domain name at location 482 to identify the domain. Then, the user selects a network type from the drop-down list 484 to associate with this domain (each domain is bound to a single particular network type). Finally, the user assigns a global network identifier to the domain at location 486 (in most cases the default value will be sufficient) and clicks Finish. As shown in window 490 (FIG. 42), the new domain (here "SampleDomain" 492) will then be displayed in the Wireless Networking view.

To modify an existing Domain, the user selects its properties as was done in the device wizard, and then changes its parameters appropriately. To remove an existing Domain, the user simply selects the Domain, and then performs a delete operation just as with deleting a file.

Figure 43:
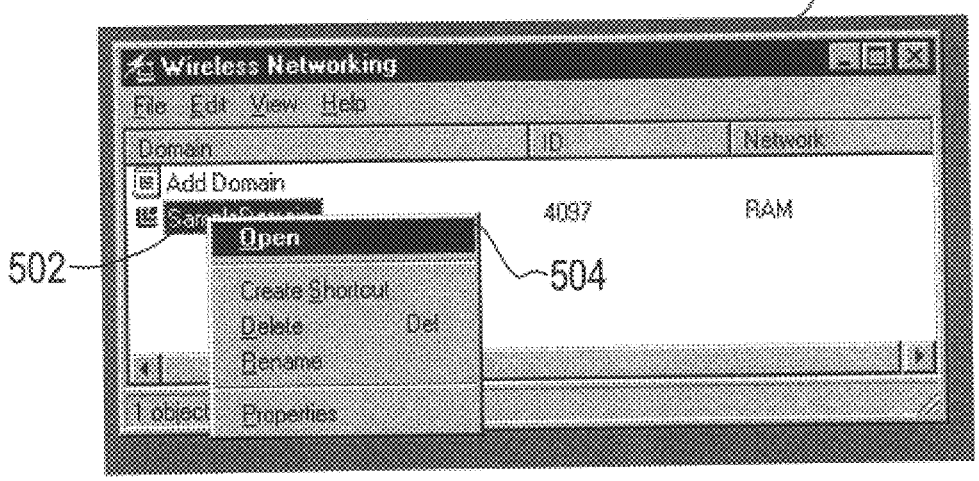
FIG. 43 shows a pop-up menu from the selection of the SampleDomain icon with the open command selected.
Figure 44:
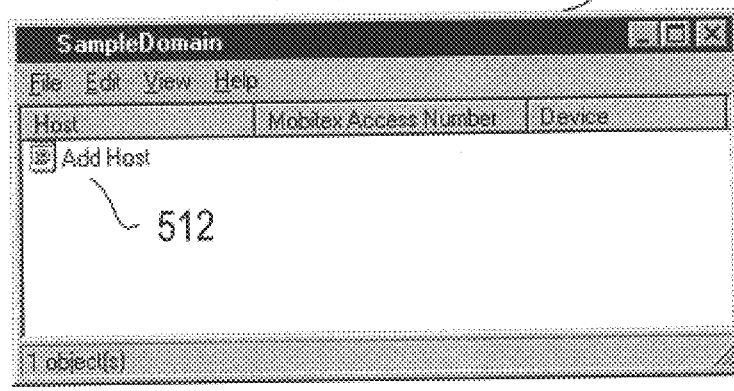
FIG. 44 shows the SampleDomain window displaying an Add Host object which is seen after opening the SampleDomain icon of FIG. 43.

A Host Wizard is provided to add a Host. A Host is a name that is used to associate a user or machine within a particular Domain. Referring now to FIG. 43, to associate a host with a previously-specified domain, the user double-clicks on the Domain in the Wireless Networking window that the user wants to add to (in this case SampleDomain label 502) or simply right-clicks the Domain and selects the Open function 504. This action will then display the list of hosts associated with the selected Domain, if any. The Host Wizard will then appear (see FIG. 44) with window 510 and the user double-clicks the "Add Host" icon 512 to start the Host Wizard.

The first host wizard screen will differ depending on the network type that is specified when creating the domain. As Domains are associated with specific networks, any Hosts assigned to these Domains will posses network specific attributes such as network address formats.

Figure 45:
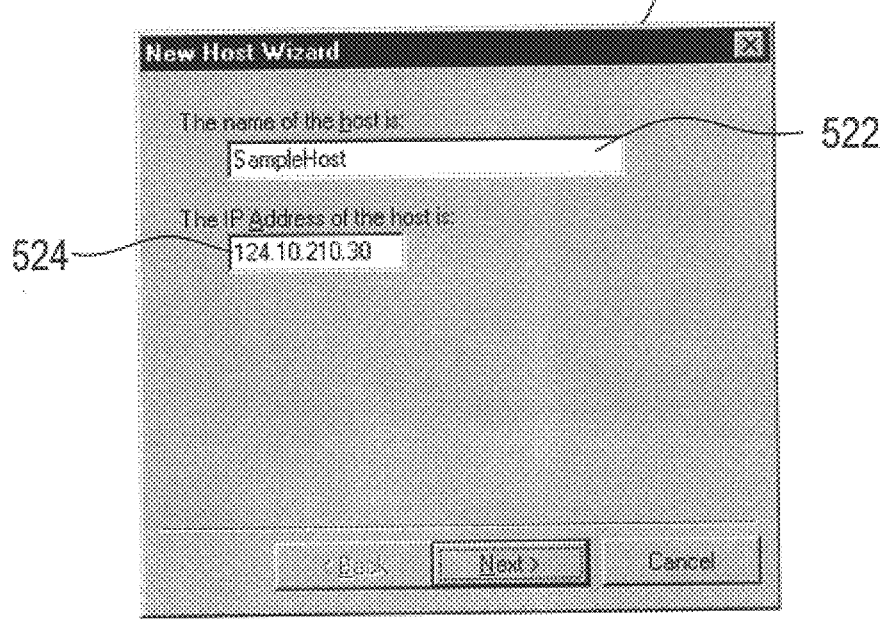
FIGS. 45–47 show screens used in the New Host Wizard.
Figure 46:
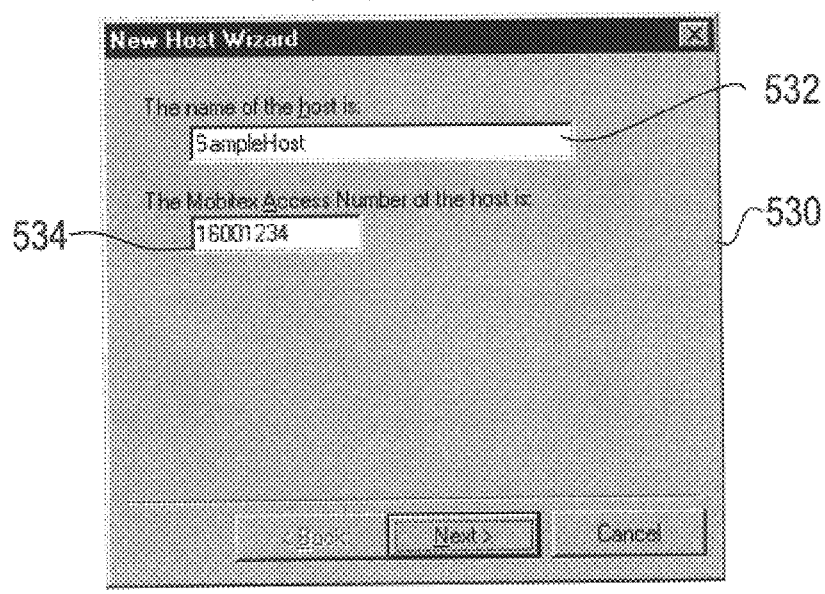

For CDPD (FIG. 45), the user first specifies a name such as "SampleHost" in location 522 in window 520 to associate with this Host. Next, the user enters the IP access number of the host in location 524. For Mobitex, (FIG. 46), the user first specifies a name as before such as "SampleHost" in location 532 in window 530 to associate with this host. Next, the user enters the Mobitex access number of the host in location 534.

Figure 47:
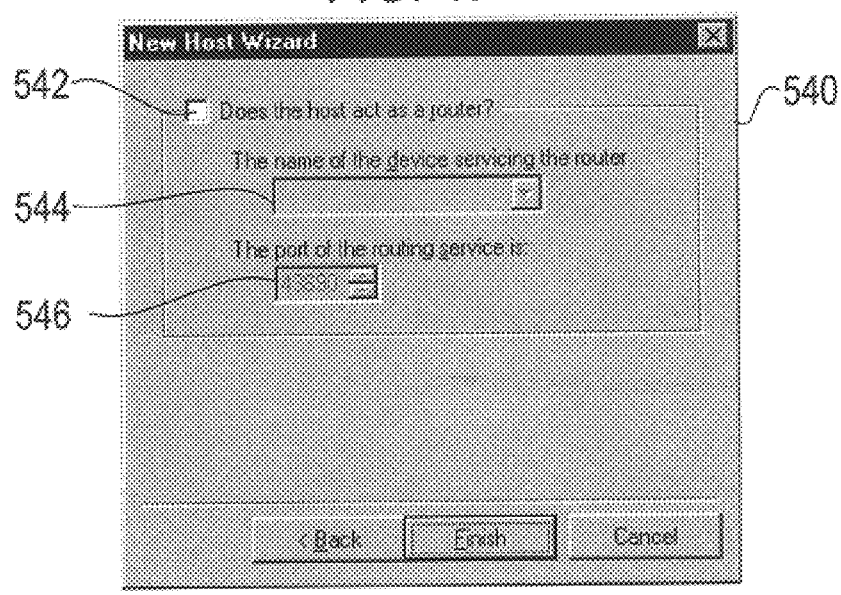
Figure 48:
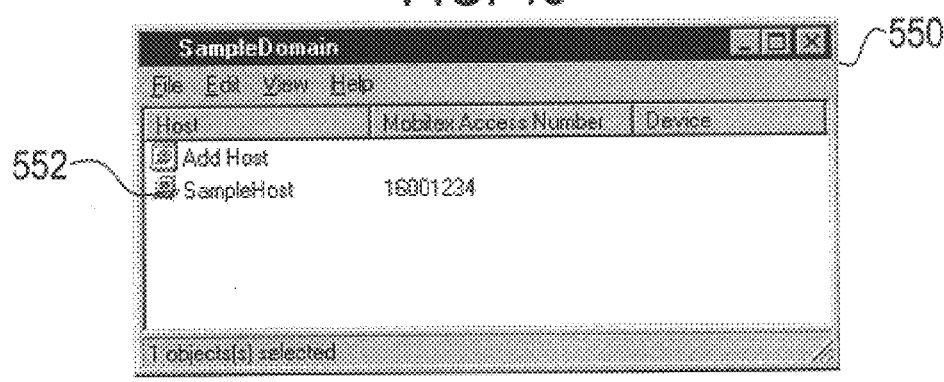
FIG. 48 shows the display of the new object SampleHost added via the New Host Wizard.

The next and final screen (FIG. 47) presents a generic window 540 and indicates whether or not this host will act as a router at checkbox 542. If the host is specified as a router, the user must also select a device at location 544 and associate port id at location 546. The icon SampleHost 552 in window 550 is then shown with the Mobitex Access Number in Window 550.

To modify an existing Host, the user can select its properties (as was done in the Device wizard example above) and then change its parameters appropriately. To remove an existing Domain, the user can simply select it, and then perform a delete operation just as with deleting a file.

Figure 49:
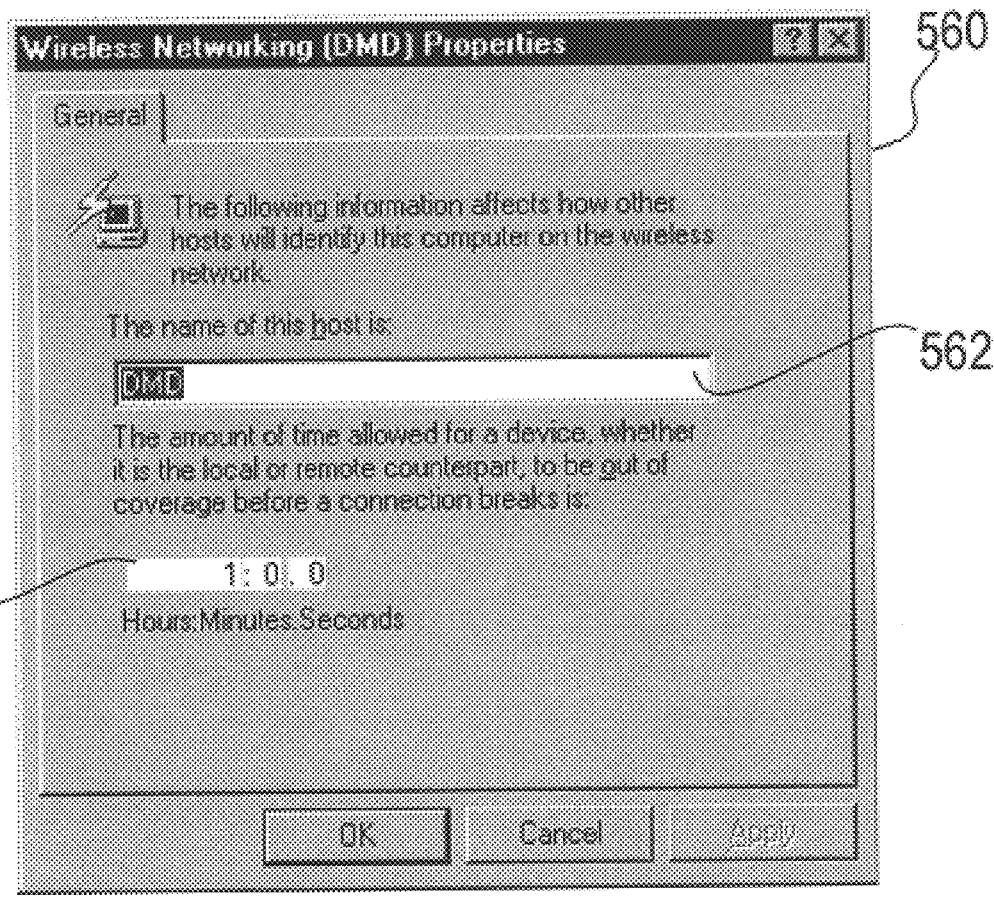
FIG. 49 shows a properties sheet for the host DMD.

To modify the Local Host, the user can right-click the Wireless Networking icon from the desktop and select the Properties command from the pop-up menu. The user can then re-configure the existing properties from the Wireless Networking Properties screen 560 (FIG. 49). The Host Name in the name field 562 is a name that identifies the user's machine. The time field 564 indicates the duration which the Wireless control program subsystem will wait before closing the connection in the event that network coverage is lost. The default time set is preferably one hour.

Figure 50:
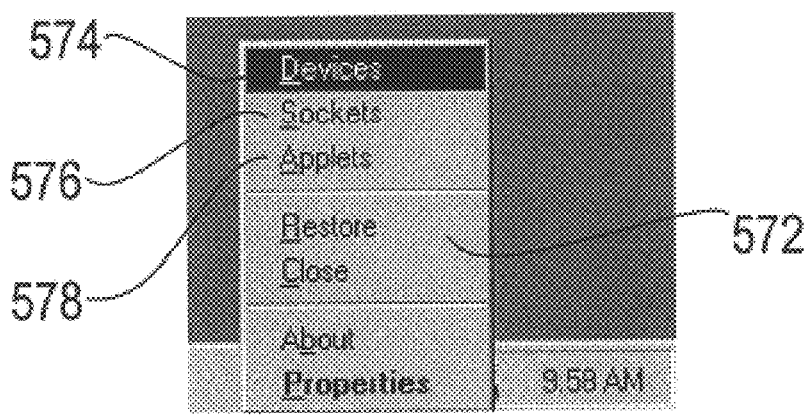
FIG. 50 shows a pop-up menu from selection of the program icon in the task tray with the Devices command selected.

The wireless control program subsystem also provides users with configuration screens (administered primarily by the Device, Host and Domain Wizards) and on-line status screens accessible through the Control Center interface. As shown in FIG. 50, to view or open the Control Center, the user can right-click the icon in the system task status bar, then select the desired view from the list of configurable items presented in menu 572, including Devices 574, Sockets 576 and Applets 578.

Figure 51:
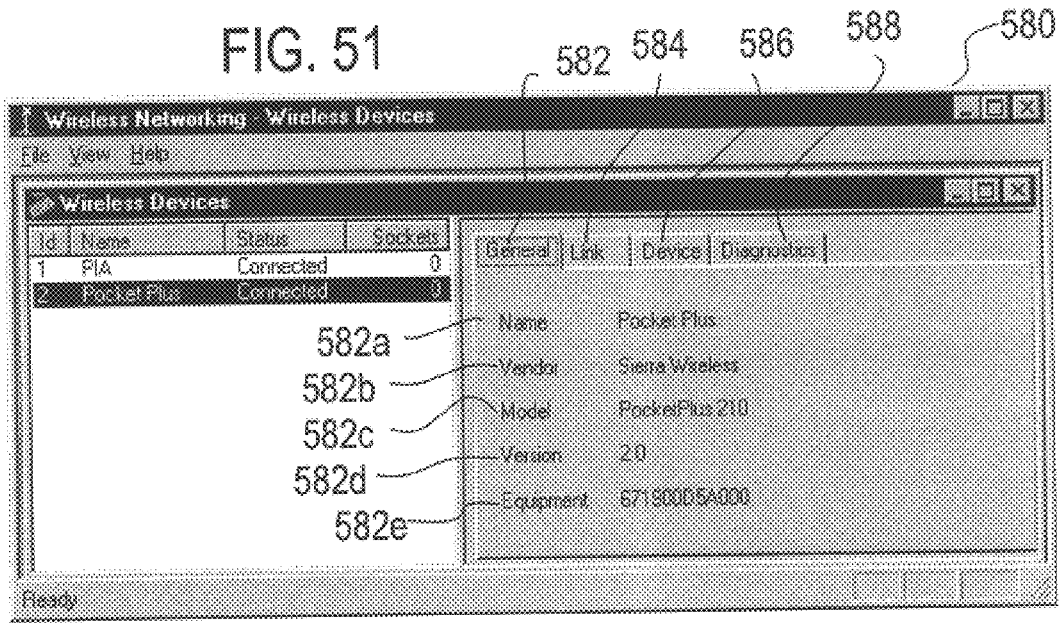
FIGS. 51–54 show the Wireless Devices windows views resulting from the selection of the Devices command from FIG. 50.

The Devices Views (FIGS. 51–54) displays the current status of all the Devices currently accessible. For instance, in window 580 (FIG. 51), this view contains the General tab 582, Link tab 584, Device tab 586 and Diagnostics tab 588. As the name implies, the General tab 582 provides general information related to the connected device. The name field 582a holds the user name given to the device during its configuration. The Vendor field 582b holds the name of the device's vendor. The Model field 582c holds the model name of the device. The Version field 582d holds the firmware version number taken from the device. Finally, the Equipment Identifier field 582e holds the manufacturer's equipment number taken from the device.

Figure 52:
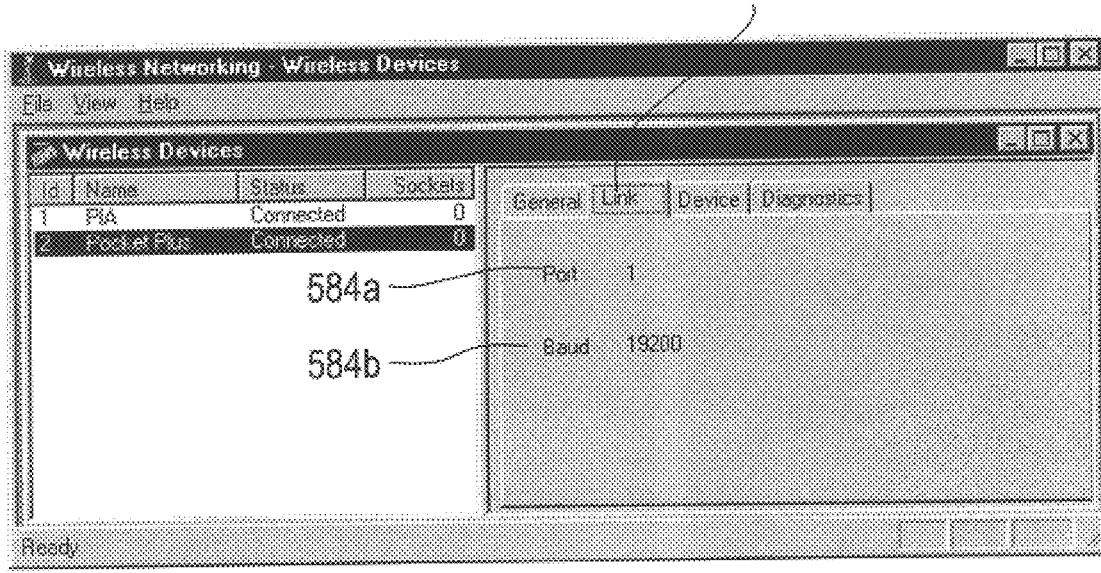

The Link Tab 584 displays communication port related parameters and the content of this tab will be different depending on the device type being viewed. As shown in FIG. 52, the Port field 584a displays the communications port with which the device is associated, such as COM1, COM2 and so forth. The Baud field 584b indicates the current baud rate at which the wireless control program subsystem will communicate with this device.

Figure 53:
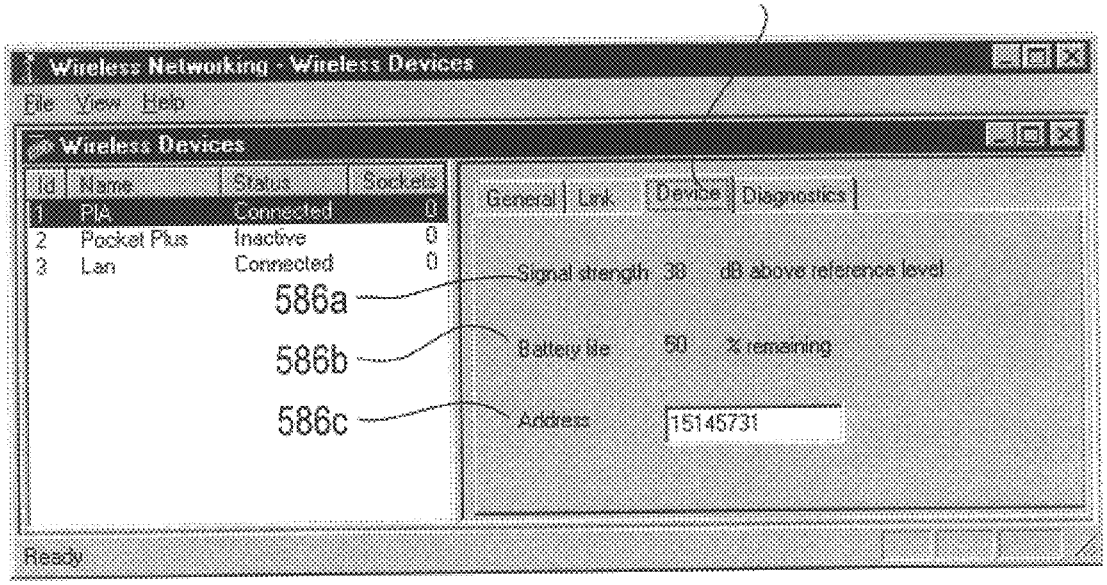
Figure 54:
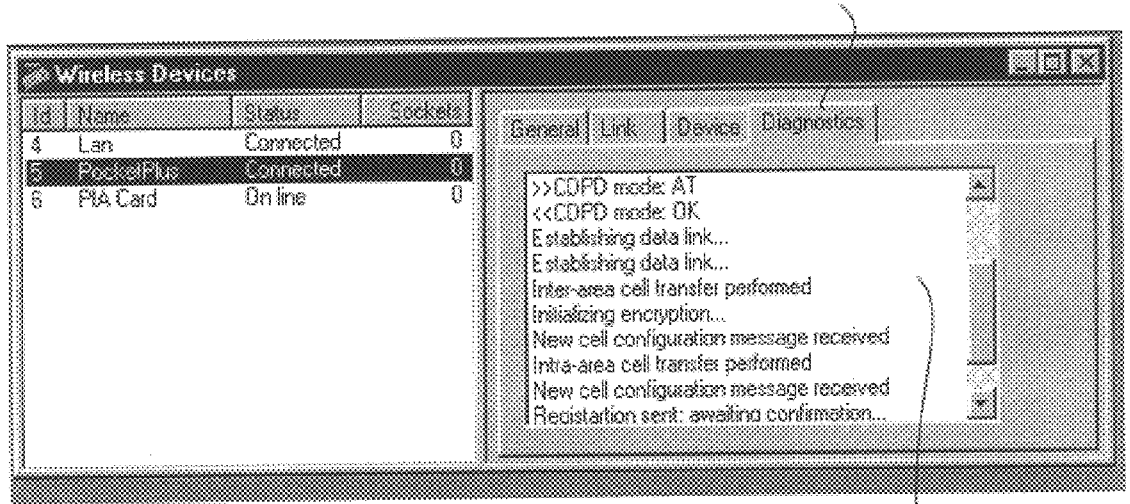

As shown in FIG. 53, the Device Tab 586 contains the device signal strength field 586a, battery life field 586b, and network address field 586c. Finally, the Diagnostics tab 588

(FIG. 54) displays descriptive messages, such as messages contained in field 588a, that relate to the devices' current internal and network status.

As described above, the present invention differs significantly in many ways from traditional methods of programming for and configuring wireless devices. Just as languages like "Visual" type programming languages like Visual Basic and Visual C++ made it easier and faster to deploy Windows applications, the present invention makes wireless programming easier and faster and more intuitive than previous approaches such as direct device access and middleware. Numerous benefits from the present invention are achieved such as: support for 32-bit multithreaded operating systems; an "industry-standard" interface module; an event-driven (non-polled) model; an integrated GUI-based control center; and integrated GUI-based configuration "wizards." As to 32-bit multithreaded support, the present invention supports overlapped I/O, UNICODE, and follows a purely asynchronous event-driven paradigm.

The industry standard interface module of the present invention exposes to the programmer interfaces for which to program. This can include, for instance, proprietary ActiveX controls such as MobileX™ offered by DMD as well as interfaces such as a true Winsock 2 driver or ODBC driver.

In terms of providing an event-driven paradigm, the present invention can deliver an event message to the application for virtually any status change within any connected devices or networks. This approach not only saves CPU cycles, but gives an exact representation of the wireless happenings, saving battery life on the device and the CPU, and allowing applications to be written more intuitively.

Advantageously, the present invention can run without any other applications. Once installed, it already has the ability to connect any configured devices in the system and register them with the wireless network. A "control center" view can be provided to such that a user can tell whether the wireless device is activated for the particular wireless network as well as other items such as wireless network coverage check, battery level, diagnostics, etc. The control center also supports a full range of system diagnostics and status, all without requiring the development of a separate application. With the present invention, a user can obtain diagnostic and status information about the wireless device and the network such as registration status, signal strength, and the device's address. As shown in FIG. 53, for example, the wireless devices "Lan" and "PocketPlus" are shown to be connected and the wireless device "PIA Card" is on-line. Diagnostics are shown in Diagnostics window 508a for the selected or highlighted device. Configuration "wizards" are desirably provided to aid the user in managing wireless devices, as well as known domain and host configurations.

The present invention, in addition to providing a programming interface, is an operating system extension that exists close to the operating system and allows it to be configured via the Windows Control Panel and Windows shell. Once running, the extension is visible as an icon in the Windows Task Tray and can be easily activated for diagnostic reporting and viewing of the running devices and connections. The wireless control program subsystem implementing the present invention reacts appropriately to system events such as shutting down Windows and power management functions.

The present invention provides overlapped input/output by aligning the present invention closely with the operating system. For instance, the present invention allows for the running of programs simultaneously with the sending and receiving of data. This provides optimum use of the available wireless devices and wire-line connections.

Again, the present invention uses system events and can respond to such events given out by the system. For example, the present invention knows when a device is about to go to "sleep" by virtue of receiving a system event sent to all processes by the Power Management features in Windows. Middleware, by contrast, ignores this valuable piece of information. The present invention uses this information advantageously to prepare for the shut down and to recover gracefully upon a system restart.

As these and other variations and combinations of the features discussed above can be utilized without departing from the present invention as defined by the claims, the foregoing description of the preferred embodiments should be taken by way of illustration rather than by way of limitation of the present invention.

APPENDIX A:

Header files MAddress.h, MEvent.h, MName.h, MProviderEvent.h, MSocket.h, MSocketCodes.h, MSocketErrors.h.

MAddress.h                                                                Page 1

```
// Copyright © 1997 Dynamic Mobile Data, Inc. All rights reserved.
// MAddress.h
//
// Mobile Address specification
// if !defined ( __MAddress__ )
define __MAddress__ if !defined( MSOCKENTRY )
if defined ( MSocketDLL )
#define MSOCKENTRY __declspec(dllexport)
#elif defined ( AirdromeEXE )
#define MSOCKENTRY
#elif defined ( UNDER_CE )
#define MSOCKENTRY
#else
#define MSOCKENTRY __declspec(dllimport)
//#else
//#error EXPORT/IMPORT not specified
#endif
endif include "MName.h"

//
// Address family extension with Mobile Socket address family
//
// at the moment 04.16.97 AF_MAX is equal 22 (in Winsock.h)
#define AF_MOBILE 22

// NULL address for CDPD and RAM and ??? - should it be defined somewhat differently
#define MADDR_NULL 0

//
// IP port specification.
// Only NULL value - all values really used by Mobile software
// has to be specified dynamically at configuration time.
// If there is no any value specified at configuration time
// airdrome going to update configuration with DefaultConfigurationValue
// which is hardcoded below:
//
#define MPORT_NULL 0
#define MPORT_MOBILE_SHIFT 0x00aa /* shift value to be added to minimum allowed user port */
#define MPORT_DEFAULT_MSOCKSERVICE ( IPPORT_RESERVED + MPORT_MOBILE_SHIFT )
// IPPORT_RESERVED defined in Winsock.h //
// Domain specification
//
#define MDOMAIN_NULL    0x0000 /*not specified*/
#define MDOMAIN_DEFAULT 0x0001 /*default domain value should be used*/
```

MAddress.h           Page 2

```
#define MDOMAIN_ANY     0x0002 /*any domain could satisfy*/
// 0x0003 - 0x0100 reserved for future Mobile internal use
#define MDOMAIN_CDPD    0x0101 /*native CDPD*/
#define MDOMAIN_RAM     0x0102 /*native RAM*/
#define MDOMAIN_ARDIS   0x0103 /*native ARDIS*/
// 0x0104 - 0x1000 reserved for future native networks providers
// any domain id from the interval 0x1001 - 0x7fff could be used as customer domain id
// 0x8000 - 0xffff just reserved
#define MDOMAIN_CUSTOMSTART 0x1001
define MDOMAIN_CUSTOMEND   0x7fff // Below are some definitions as a substitution (or introducing)
// for the name space portion of the implementation.
#define MAX_AIR_NAME     15
#define MAX_SERVICE_NAME MAX_AIR_NAME
#define MAX_HOST_NAME    MAX_AIR_NAME
define MAX_DOMAIN_NAME  MAX_AIR_NAME // maximum sizes of the exproted address
define MAX_BINARY_PART (sizeof(unsigned short)+sizeof(unsigned char)+sizeof(unsigned
short)+sizeof(unsigned long)+sizeof(unsigned short))
#define MAX_EXPORT_SIZE
(MAX_BINARY_PART+MAX_SERVICE_NAME+MAX_HOST_NAME+MAX_DOMAIN_NAME+3)

// address format specification bit definition
#define MAddrPort       0x01
#define MAddrService    0x02
#define MAddrDomainId   0x04
#define MAddrDomainName 0x08
#define MAddrAddress    0x10
define MAddrHost       0x20 typedef enum _ExportRules {
  ExRule_All = 1, // exports all binary fields and all valid names:
            // address, domainId, port,
            // host (if valid),
            // domainName (if valid),
            // service (if valid)
  ExRule_Binary, // exports all binary and no any names
            // address, domainId, port
  ExRule_ValidBinary, // exports only valid binary and no any names
            // address (if valid), domainId (if valid),
            // port (if valid)
  ExRule_ClientConnect, // typical client connection request (if any
            // of the required values are not available
            // Export function will return false):
            // address or host (if address not valid),
            //          (if none of them return false)
            // domainId or domainName (if Id not valid)
            //     or none of them (if both not valid),
            // service or port (if service is not specified
            //          but port is)
```

56

MAddress.h Page 3

```
            //            (if none of them return false)
    ExRule_ClientSelf, // client self address in connection request:
            // address,
            // port,
            // domainId (if valid),
            // host (if valid),
            // service (if valid)
            // domainName (if valid),
    ExRule_ServerAccept, // server self address in connection reply:
            // address,
            // port,
            // domainId (if valid),
            // host (if valid),
            // service (if valid)
            // domainName (if valid),
// and so on TBD ?????????????
} ExportRules;

typedef enum _AddressFormats {
  AddrFormat_Auto = 1, // MobilityLayer will attempt to determine the address format.

AddrFormat_IP, // Network address range validations test will be performed
           // based on IP address range rules.
  AddrFormat_Mobitex // Network address range validations test will be performed
           // based on Mobitex address range rules.

} AddressFormats;

class MAddress { // WinSock uses address definition as in sockaddr
public:
  MSOCKENTRY MAddress( void );
  MSOCKENTRY MAddress( unsigned short port );
  MSOCKENTRY MAddress( unsigned long address );
  MSOCKENTRY MAddress( unsigned short port, unsigned long address );
  MSOCKENTRY MAddress( LPTSTR service, // up to MAX_SERVICE_NAME,if longer - truncated
           unsigned long address // as binary number
           );
  MSOCKENTRY MAddress( LPTSTR service, // up to MAX_SERVICE_NAME,if longer - truncated
           LPTSTR address // in dotted notation
           );
  MSOCKENTRY MAddress( LPTSTR address ); /*in dotted notation*/
  MSOCKENTRY MAddress( unsigned short port, LPTSTR address );
      MSOCKENTRY MAddress( MAddress& maddrSrc );

MSOCKENTRY virtual ~MAddress( void );

MAddress& operator=(MAddress& maddrSrc);

MSOCKENTRY void Erase( void );

MSOCKENTRY void     DomainId( unsigned short id ) { _domain = id; }
  MSOCKENTRY unsigned short DomainId( void ) { return _domain; }
  MSOCKENTRY void     DomainName( LPTSTR name );
```

57

| MAddress.h | Page 4 |

```
MSOCKENTRY LPTSTR      DomainName( void );
MSOCKENTRY void        Port( unsigned short port ) { _port = port; }
MSOCKENTRY unsigned short Port( void ) { return _port; }
MSOCKENTRY void        Service( LPTSTR name );
MSOCKENTRY LPTSTR      Service( void );
MSOCKENTRY void        AddressFormat( AddressFormats format ) {_addrFormat = format;}
MSOCKENTRY bool        Address( unsigned long address );
MSOCKENTRY unsigned long Address( void ) { return _addr; }
MSOCKENTRY bool        Address( LPTSTR address );
MSOCKENTRY bool        AddressInDots( LPTSTR to , unsigned short toLen );
MSOCKENTRY void        Host( LPTSTR name );
MSOCKENTRY LPTSTR      Host( void );

// following methods responcible for MAddress translation from/to
// in-air format to/from MAddress object. In-air address presentation
// described below:
// unsigned short family; // Should be AF_MOBILE for Mobile Socket address family (see above)
//               // required by WinSock2 here and should be two bytes length
//               // Should be in host byte order (not network byte order).
//               // AF_INET value used by TCP/IP
// unsigned char flags; // address format specification:
//           // .... ...P - binary port value present (MAddrPort)
//           // .... ..S. - service name present (MAddrService)
//           // .... .I.. - domain id present (MAddrDomainId)
//           // .... D... - domain name present (MAddrDomainName)
//           // ...A .... - binary address value present (MAddrAddress)
//           // ..H. .... - host name present (MAddrHost)
//           // RR.. .... - reserved
//         the rest of the fields has to be in network byte order
// unsigned short port    - present only if MAddrPort is up
// unsigned long  addr    - present only if MAddrAddress is up
// unsigned short domain  - present only if MAddrDomainId is up
// NameSpec service       - present only if MAddrService is up
// NameSpec host          - present only if MAddrHost is up
// NameSpec domainName    - present only if MAddrDomainName is up
//   where NameSpec defined as following:
//   unsigned char length - length of the name not including this byte itself
//   char name[length]    - array of length bytes with the name in it // converts this object to in-air format.
// Exporting fields set determined by rules.
// Returns number of bytes in exported format or zero
MSOCKENTRY unsigned short Export(void* to, unsigned short toMax, ExportRules rules);
// converts from in-air address to this object. Returns 0 if UNSUCCESSFULL,
// otherwise number of bytes used in from
MSOCKENTRY unsigned short Import(void* from, unsigned short fromLimit);

static unsigned long  RetrieveAddress(void * row,unsigned short limit);
static unsigned short RetrievePort   (void * row,unsigned short limit);
// print out row address in text format
static bool PrintOut( void * row,unsigned short limit, LPTSTR txt, unsigned short size);
    bool PrintOut( LPTSTR txt, unsigned short size);
// by given memory where address is written
```

58

MAddress.h

```cpp
    // returns length of this memory
    static unsigned short RowLength(void* row, unsigned short limit);
//  static unsigned long  ConvertLongOrder( unsigned long value);
//  static unsigned short ConvertShortOrder( unsigned short value);
private:
//  unsigned short NetOrderPort( void );
//  void           PortFromNetOrder( unsigned short port);
//  unsigned long  NetOrderAddr( void );
//  void           AddrFromNetOrder( unsigned long address);
//  unsigned short NetOrderDomain( void );
//  void           DomainFromNetOrder( unsigned short domain);

// following fields in this object are in host byte order, but
    // in in-air fromat they have to be in network byte order
    unsigned short _port;
    unsigned long  _addr;
    unsigned short _domain;
    MName *        _service;
    MName *        _host;
    MName *        _domainName;
    AddressFormats _addrFormat;
};

#endif
```

MEvent.h

```
// Copyright © 1997 Dynamic Mobile Data, Inc. All rights reserved.
// MEvent.h
//
// Mobile Event specification
// if !defined ( __MEvent__ )
define __MEvent__

// Socket events................................
// Standard events FD_READ, FD_WRITE, FD_OOB, FD_ACCEPT,
// FD_CONNECT, FD_CLOSE, FD_QOS, FD_GROUP_QOS.

// Additional events............................

#if defined ( UNDER_CE )
// Winsock 1.0 does not have it
#define FD_MAX_EVENTS 8
endif // new confirmation information arrived
define MFD_DELIVER_BIT  FD_MAX_EVENTS /*8*/
#define MFD_DELIVER      (1 << MFD_DELIVER_BIT)
// property changed
#define MFD_PROPERTY_BIT (FD_MAX_EVENTS + 1)
#define MFD_PROPERTY     (1 << MFD_PROPERTY_BIT)
// error condition for a socket
#define MFD_ERROR_BIT    (FD_MAX_EVENTS + 2)
#define MFD_ERROR        (1 << MFD_ERROR_BIT)

class MEvent {
protected:
        MEvent( void );
public:
  virtual ~MEvent( void );
public:
  virtual unsigned short Type( void ) = 0;
  virtual LPCTSTR     TypeName( void ) = 0;
  virtual unsigned long Code( void) { return 0; };
  virtual LPCTSTR     Description( void );
};

class MEventError: public MEvent {
public:
        MEventError( unsigned long code );
  virtual ~MEventError( void );
  virtual unsigned short Type( void ) { return MFD_ERROR; }
  virtual LPCTSTR     TypeName( void );
  virtual unsigned long Code( void) { return _code; }
  virtual LPCTSTR     Description( void );
private:
```

MEvent.h                                                                                          Page 2

```cpp
    unsigned long _code;
};
class MEventAccept: public MEvent {
public:
        MEventAccept(void);
 virtual ~MEventAccept(void);
 virtual unsigned short Type( void ) { return FD_ACCEPT; }
 virtual LPCTSTR    TypeName( void );
 virtual LPCTSTR    Description( void );
};
class MEventClose: public MEvent {
public:
        MEventClose(unsigned long code);
 virtual ~MEventClose(void);
 virtual unsigned short Type( void ) { return FD_CLOSE; }
 virtual LPCTSTR    TypeName( void );
 virtual unsigned long Code( void) { return _code; }
 virtual LPCTSTR    Description( void );
private:
 unsigned long _code;
};
class MEventRead: public MEvent {
public:
        MEventRead(unsigned long number,unsigned long length,unsigned long count);
 virtual ~MEventRead(void);
 virtual unsigned short Type( void ) { return FD_READ; }
 virtual LPCTSTR    TypeName( void );
 virtual LPCTSTR    Description( void );
 unsigned long Sequence( void ) { return _number; }
 unsigned long Length( void ) { return _length; }
 unsigned long Count( void ) { return _count; }
private:
 unsigned long _number;
 unsigned long _length;
 unsigned long _count;
};
class MEventWrite: public MEvent {
public:
        MEventWrite(unsigned long number,unsigned long length,unsigned long total);
 virtual ~MEventWrite(void);
 virtual unsigned short Type( void ) { return FD_WRITE; }
 virtual LPCTSTR    TypeName( void );
 virtual LPCTSTR    Description( void );
 unsigned long Sequence( void ) { return _number; }
 unsigned long Length( void ) { return _length; }
 unsigned long Total( void ) { return _total; }
private:
 unsigned long _number;
 unsigned long _length;
 unsigned long _total; // total number of bytes for all of the messages
};
class MEventDeliver: public MEvent {
public:
```

61

MEvent.h                                                                                      Page 3

```cpp
        MEventDeliver(unsigned long number,unsigned long bytes);
    virtual ~MEventDeliver(void);
    virtual unsigned short Type( void ) { return MFD_DELIVER; }
    virtual LPCTSTR    TypeName( void );
    virtual LPCTSTR    Description( void );
    unsigned long      Sequence( void ) { return _number; }
    unsigned long      Bytes( void ) { return _bytes; }
private:
    unsigned long _number;
    unsigned long _bytes;
};
class MEventProperty: public MEvent {
public:
        MEventProperty(unsigned long property,unsigned long value);
    virtual ~MEventProperty(void);
    virtual unsigned short Type( void ) { return MFD_PROPERTY; }
    virtual LPCTSTR    TypeName( void );
    virtual LPCTSTR    Description( void );
    unsigned long  Property( void ) { return _property; }
    unsigned long  Value( void ) { return _value; }
private:
    unsigned long _property;
    unsigned long _value;
};
class MEventOOB: public MEvent {
public:
        MEventOOB(unsigned long number,unsigned long length,unsigned long count);
    virtual ~MEventOOB(void);
    virtual unsigned short Type( void ) { return FD_OOB; }
    virtual LPCTSTR    TypeName( void );
    virtual LPCTSTR    Description( void );
    unsigned long Sequence( void ) { return _number; }
    unsigned long Length  ( void ) { return _length; }
    unsigned long Count   ( void ) { return _count; }
private:
    unsigned long _number;
    unsigned long _length;
    unsigned long _count;
};
class MEventConnect: public MEvent {
public:
        MEventConnect(void);
    virtual ~MEventConnect(void);
    virtual unsigned short Type( void ) { return FD_CONNECT; }
    virtual LPCTSTR    TypeName( void );
    virtual LPCTSTR    Description( void );
};
#endif
```

62

MName.h | Page

```
// Copyright © 1997 Dynamic Mobile Data, Inc. All rights reserved.
// MName.h
//
// Mobile Name specification
// if !defined ( __MName__ )
define __MName__ class MName {
public:
  MName( void );
  MName( LPTSTR name );
  ~MName( void );

LPTSTR Name( void );
  bool Valid( void );
  // space requirement for Export. Since it always exported as ASCII
  // it returns size for the ASCII presentation of the name
  unsigned short Space(void);
  bool Export( void * to,   unsigned short toLen);
  bool Import( void * from, unsigned short fromLimit);
  // return length of the name itself without leading len char
static unsigned short RowLength(void* row);
static bool PrintOut( void* row, LPTSTR txt, unsigned short size);
    bool PrintOut( LPTSTR txt, unsigned short size);
private:
  LPTSTR _name;
};

#endif
```

MProviderEvent.h

```c
// Copyright © 1997 Dynamic Mobile Data, Inc. All rights reserved.
// MProviderEvent.h
//
// Mobile Provider Event specification
// if !defined ( __MProviderEvent__ )
define __MProviderEvent__

// Provider status change
#define MPE_STATUS_BIT      0
#define MPE_STATUS          (1 << MPE_STATUS_BIT)
// On property change
#define MPE_PROPERTY_BIT    1
#define MPE_PROPERTY        (1 << MPE_PROPERTY_BIT)
// Provider network event
#define MPE_NETWORK_BIT     2
#define MPE_NETWORK         (1 << MPE_NETWORK_BIT)

// Status codes:
#define MPE_STATUS_CLOSED   1
#define MPE_STATUS_NOACCESS 2
#define MPE_STATUS_ABSENT   3
#define MPE_STATUS_OFF      4
#define MPE_STATUS_ON       5
#define MPE_STATUS_ONLINE   6
#define MPE_STATUS_CONNECTED 7

// Property codes:
#define MPE_PROPERTY_ID         1 /*local id of the radio unit*/
#define MPE_PROPERTY_NAME       2 /*local name of the radio unit*/
#define MPE_PROPERTY_VENDOR     3 /*device manufacturer*/
#define MPE_PROPERTY_MODEL      4 /*device model*/
#define MPE_PROPERTY_VERSION    5 /*device firmware/hardware version*/
#define MPE_PROPERTY_EQUIPMENT  6 /*device unique id*/
#define MPE_PROPERTY_ADDRESS    7 /*device address in the network*/
#define MPE_PROPERTY_BATTERY    8 /*remaining battery life in %*/
#define MPE_PROPERTY_CHANNEL    9 /*radio channel in use*/
#define MPE_PROPERTY_SERVICEID 10 /*radio service provider id*/
#define MPE_PROPERTY_TOWER     11 /*radio cell/tower id*/
#define MPE_PROPERTY_SIGNAL    12 /*current signal strength*/
#define MPE_PROPERTY_SOCKETS   13 /*number of served sockets*/

// Network codes:

class MProviderEvent { // abstract base class for all the events
public:
  MProviderEvent(void);
  ~MProviderEvent(void);

virtual unsigned short Type( void ) = 0;
  virtual LPCTSTR        TypeName( void ) = 0;
  virtual unsigned long  Code( void ) = 0;
```

| MProviderEvent.h | Page 2 |

```cpp
    virtual LPCTSTR     Description( void );
    virtual unsigned long Number( void ) { return 0; }
    virtual LPCTSTR     String( void ) { return NULL; }
};

class MProviderStatus: public MProviderEvent {
public:
  MProviderStatus(unsigned long code);
  ~MProviderStatus(void);

virtual unsigned short Type( void ) { return MPE_STATUS; }
  virtual LPCTSTR     TypeName( void );
  virtual unsigned long Code( void ) { return _code; }
  virtual LPCTSTR     Description( void );
private:
  unsigned long _code;
};

class MProviderProperty: public MProviderEvent {
public:
  MProviderProperty(unsigned long code,unsigned long value);
  ~MProviderProperty(void);

virtual unsigned short Type( void ) { return MPE_PROPERTY; }
  virtual LPCTSTR     TypeName( void );
  virtual unsigned long Code( void ) { return _code; }
  virtual LPCTSTR     Description( void );
  virtual unsigned long Number( void );
  virtual LPCTSTR     String( void );
private:
  unsigned long _code;
  unsigned long _value;
  TCHAR *     _str;
};
class MProviderNetwork: public MProviderEvent {
public:
  MProviderNetwork(unsigned long code,unsigned long value);
  ~MProviderNetwork(void);

virtual unsigned short Type( void ) { return MPE_NETWORK; }
  virtual LPCTSTR     TypeName( void );
  virtual unsigned long Code( void ) { return _code; }
  virtual LPCTSTR     Description( void );
  virtual unsigned long Number( void );
  virtual LPCTSTR     String( void );
private:
  unsigned long _code;
  unsigned long _value;
};

#endif
```

MSocket.h

```
// Copyright © 1997 Dynamic Mobile Data, Inc. All rights reserved.
// MSocket.h
//
// Mobile Socket specification...........................
//
// Class MSocket intended to provide "Winsock like" features to its user.
// All possible effort was made to make Mobile interface
// as simple as possible. At the same time all basic Winsock
// functionality preserved with the exeption of name
// resolution service. Currently it is nit implemented at all.
// As a base for future standard Winsock2 SPI interface
// implementation MSocket introduces a new address family.
// For detail description of this family see MAddress.h file
// and airdrome description.

// How to use this class.................................
// - the best way to use this class is to derive yout own class from it
//   and overwrite virtuals which will make possible for you to get event
//   notifications;
// - another way of this class usage is just instanciate an object (or more)
//   of this class.

#if !defined ( __MSocket__ )
define __MSocket__ include "MSocketErrors.h"
include "MAddress.h"
#include "MEvent.h"
#include "MProviderEvent.h"

#if !defined( MSOCKENTRY )
if defined ( MSocketDLL )
#define MSOCKENTRY __declspec(dllexport)
#else
#define MSOCKENTRY __declspec(dllimport)
//#else
//#error EXPORT/IMPORT not specified
#endif
endif define MRETCODE unsigned long
define M_UndefinedValue 0xffffffff

// redefinitions of the standard Winsock2 error codes
define MRC_VERSION_NOT_SUPPORTED WSAVERNOTSUPPORTED define MSG_READ   0x0000
define MSG_SKIP   0x0008
#define MSG_REMOVE (MSG_PARTIAL | MSG_SKIP)

// Socket options as defined in Winsock2 specification
```

MSocket.h                                                                 Page 2

```
// ....................
// SO_ACCEPTCONN BOOL is Listen()ing
// SO_BROADCAST  BOOL is configured for the transmission of
//               broadcast messages
//
// SO_OOBINLINE  BOOL OOB data is being received as part
//               of normal data stream
// and so on ......
//
// Socket options specific to MSocket specification presented
// in the following table:
//    NAME              NAMECODE   TYPE DEFAULT
      // open real radio connection immediately versus awaiting
      // for outbound data
      // OR reply to incoming connection immediately on Acceptance
      // versus awaiting for backward data flow
#define MSO_ForcedConnection    0x00010000 /* bool false */
      // transmit data without awaiting for successfull handshaking
#define MSO_ForcedData          0x00020000 /* bool false */
      // data compressed on a per message basic
#define MSO_Compression         0x00040000 /* bool false */
      // data encrypted on a per message basic
#define MSO_MessageEncryption   0x00080000 /* bool false */
      // data encrypted for the whole connection
#define MSO_ConnectionEncryption 0x00100000 /* bool false */
      // C2 security level for connection establishing
#define MSO_C2Security          0x00200000 /* bool false */

// OOB data is being recieved as data stream
#define MSO_OOBDataBytes        0x00400000 /* bool false */
      // OOB data is being recieved as message stream
#define MSO_OOBDataMessages     0x00800000 /* bool true */

// socket priority as number in interval 0-0xffff.
      // were 0 is the higest and 0xffff "no priority specified"
#define MSO_Priority            0x0a008 /* long 0 */
      // socket allowed out of coverage time is a time interval
      // within the range 0-0xfffff seconds. If it is bigger then 0xfffff
      // it is treated as INFINITY
#define MSO_OutOfCoverage       0x0a010 /* long 3600 - 1 hour */

// all kind of different DMD socket implementation specific
// options could be brought on this level.
// The question is weather we want it to be exposed to user
// or not. Parameters like following:
// different kinds and levels of data confirmation mechanizms,
// SNMP enabling/disabling and specification,
// routing support,
// domain support,
// all kind of name resolution support (applications,hosts,
// users,services,domains, wires, and cables)

// data confirmation based on time is ON
```

67

MSocket.h Page 3

```c
#define MSO_ConfByTimeout    0x01000000 /* bool true */
//    data confirmation with every packet is ON
#define MSO_ConfPiggyback    0x02000000 /* bool true */
//    data confirmation for data retrieval by user
#define MSO_ConfUser         0x04000000 /* bool true */
//    data confirmation on Airdrome level
#define MSO_ConfAirdrome     0x08000000 /* bool true */

// Socket properties................................
//
// (Don't forget that following info is provided for each socket.
//  Same info for the radio link (modem or direct connection)
//  is available on a system level by means of Airdrome.)
//
//     socket state could have one of the following values
#define MSP_StateCreated       0
#define MSP_StateClosed        1
#define MSP_StateConnected     2
#define MSP_StateDisconnected  3
#define MSP_StateConnecting    4
#define MSP_StateDisconnecting 5
#define MSP_StateListening     6
#define MSP_StateError         7
#define MSP_SocketState        0xb401 /*long*/
//     number of messages pending in incoming queue (unread by user)
#define MSP_MessagesPending    0xb402 /*long*/
//     number of bytes pending in incoming queue
#define MSP_BytesPending       0xb403 /*long*/
//     number of bytes pending in the first message in incoming queue
#define MSP_BytesInMessagePending 0xb404 /*long*/
//     number of messages pending in incoming OOB queue (unread by user)
#define MSP_OOBMessagesPending 0xb405 /*long*/
//     number of bytes pending in incoming OOB queue
#define MSP_OOBBytesPending    0xb406 /*long*/
//     number of bytes pending in the first message in incoming OOB queue
#define MSP_OOBBytesInMessagePending 0xb407 /*long*/

//     number of data bytes given by user to send out
#define MSP_BytesSent          0xb001 /* long */
//     number of data bytes actually sent out (without retransmissions)
#define MSP_BytesSentActual    0xb002 /* long */
//     number of data bytes retransmitted (sent more then once)
#define MSP_BytesRetransmitted 0xb003 /* long */
//     number of data bytes confirmed by other side of the socket
#define MSP_BytesConfirmed     0xb004 /* long */
//     number of data bytes received (not nesseccarily retrieved by app)
#define MSP_BytesReceived      0xb005 /* long */
//     number of data bytes received more then once
#define MSP_BytesDuplicated    0xb006 /* long */
//     number of messages given by user to send out
```

68

MSocket.h                                                                                             Page 4

```c
#define MSP_MessagesSent    0xb007 /* long */
//   number of messages actually sent out
#define MSP_MessagesSentActual 0xb008 /* long */
//   number of messages confirmed by other side of the socket
// (WE HAVE DELIVERY NOTIFICATION, WHICH IS NOT THE SAME AS LOW LEVEL
CONFIRMATION
// AND I NOT SURE THAT THIS THING HAS TO BE ACCESSIBLE BY USER ????????? )
//#define MSP_MessagesConfirmed  0x /* long */
//   number of messages received (not nesseccarily retrieved by app)
#define MSP_MessagesReceived   0xb009 /* long */
// bytes received over the air (including all possible headers and data)
#define MSP_AirInTraffic     0xb00a /* long */
// bytes sent over the air (including all possible headers and data)
#define MSP_AirOutTraffic    0xb00b /* long */
// packets sent
#define MSP_PacketsSent      0xb00c /* long */
// packets received
#define MSP_PacketsReceived  0xb00d /* long */

// For all time related properties value M_UndefinedValue
// means that the event under question never happened.......
//   time of the MSocket creation as a number of seconds
//   elapsed since midnight (00:00:00), January 1, 1970,
//   coordinated universal time (see time() function description)
#define MSP_TimeStarted      0xb101 /*long*/
//   time of the Connect() or Listen() call.
//   Presented as a number of seconds since Started.
#define MSP_TimeConnected    0xb102 /*long*/
//   time of the first real wireless packet was sent out.
//   Presented as a number of seconds since Started.
#define MSP_TimeFirstOut     0xb103 /*long*/
//   time of the first real wireless packet arrival
//   from the other side of the socket. Presented as a number
//   of seconds since Started.
#define MSP_TimeFirstIn      0xb104 /*long*/
//   time of the air connection usage as a number of
//   seconds since FirstIn or FirstOut (whoever is earlier)
#define MSP_TimeUpInAir      0xb105 /*long*/
//   time of the last real wireless packet was sent out.
//   Presented as a number of seconds since Started.
#define MSP_TimeLastOut      0xb106 /*long*/
//   time of the last real wireless packet arrival
//   from the other side of the socket. Presented as a number
//   of seconds since Started.
#define MSP_TimeLastIn       0xb107 /*long*/
//   speed of the actual outbound data transmission in baud
#define MSP_BaudOutActual    0xb201 /*long*/
//   speed of the actual inbound data flow in baud
#define MSP_BaudInActual     0xb202 /*long*/
//   speed of the maximum possible outbound data
//   transmission in baud (for given equipment on
//   the both sides of the socket, without any concurrent
//   live transmissions and under good coverage conditions
```

69

| MSocket.h | Page 5 |

```
//    based on real live data)
#define MSP_BaudOutMax     0xb203 /*long*/
//    speed of the maximum inbound data flow in baud
//    See comment above. The value could be different due
//    to the different data flow direction.
#define MSP_BaudInMax      0xb204 /*long*/
// .......
// other properties could be appended to this enumeration // ************************************
// Here we have radio provider section
//
// It looks like the only thing what MSocket user may
// have to be aware is RadioProvider Events.
// Such things as properties (something to know about
// radio provider which is not dynamic, but static)
// and options (some parameters which could be changed
// by user) should be outside of the MSocket scope.
// They definetely going to be available via Airdrome GUI
// and via Mobile software integrated into operating system
// like Control Panel extension and Property Pages Shell
// extension.
// They also could be available to the user by means of some
// other object and/or API, and/or interface to COM object???
//
//
// All radio provider specific parameters including Options,
// Properties, and Events are very much dependent upon particular
// radio provider. I think at this stage of the product development
// it is reasonable not to define all possible parameters, but rather
// make all possible efforts to implement all of them. After
// implementation completion we will have to decide which parameters
// we are going to expose for end user, which parameters we are
// going to make available at the configuration time (some of them
// could be available for user and some of them not), and whch parameters
// are going to be hardcoded in our implementation and not available for
// any alterations/adjustments (like number of retries and modem
// error recovery actions).

// Radio provider option................
        // for Sierra Wireless could be any number from 0 to 8
//#define MRPO_BAUDRATE 0xd001 /*long*/
// and so on .........
// Radio provider property...............
//#define MRPP_COMPORT 0xd101 /*long*/ /*modem only*/
//#define MRPP_IPPORT  0xd102 /*long*/ /*CDPD internet connection only*/
//#define MRPP_IPADDRESS 0xd103 /*long*/ /*CDPD only*/
// and so on .........

//****************************************** if defined ( UNDER_CE )
```

MSocket.h                                                                                    Page 6

```c
/* WinSock 2 extension -- WSABUF struct */
typedef struct _WSABUF {
   u_long    len;    /* the length of the buffer */
   char FAR * buf;   /* the pointer to the buffer */
} WSABUF, FAR * LPWSABUF;
/* WinSock 2 extension -- manifest constants for shutdown() */
#define SD_RECEIVE   0x00
#define SD_SEND      0x01
#define SD_BOTH      0x02
endif class ApplicationSideImp;
class MSocket {
public:
  MSOCKENTRY MSocket(void);
  MSOCKENTRY MSocket(int type); // type could be SOCK_STREAM or SOCK_DGRAM
  // closes actual connection (options for the connection
  // closing process specified by socket options) if it was not
  // closed by Shutdown().
  // Releases all the resources allocated for the socket.
  MSOCKENTRY virtual ~MSocket(void);

// type could be SOCK_STREAM or SOCK_DGRAM
  MSOCKENTRY MRETCODE Type(int type);

// see list of possible and supported options above
  MSOCKENTRY MRETCODE SetOption(int option, void * value, int length);
  MSOCKENTRY MRETCODE GetOption(int option, void * value, int length);

// retrieves state property value (see list of properties above)
  // (This function is analogous to the select() function in BSD)
  MSOCKENTRY MRETCODE State(int property, void * value, int length);

// assosiates a socket with local address
  MSOCKENTRY MRETCODE Bind( MAddress & local );
  // connect to other side of the socket
  MSOCKENTRY MRETCODE Connect( MAddress & to,
              WSABUF * caller = NULL,
              WSABUF * callee = NULL
              // QOS is not supported by now.
              // Due to intention not to overcomplicate
              // implementation and QOS could be easily
              // supported later (does not require any
              // additional data to be transferred
              // over the air)
            );
  // makes socket listening for incoming connections for
  // specified local address (as was prodided by bind())
  MSOCKENTRY MRETCODE Listen(void);
  // user of this class has to provide a new object of
  // the users class derived from MSocket.
  // This object will be used by this method to assign first
  // connection from an incoming connections queue
```

MSocket.h

```cpp
MSOCKENTRY MRETCODE Accept( MSocket & connection /*inout*/);

// terminates actual in and/or out connection (options for
// the connection closing process specified by socket options).
// how could have SD_RECEIVE, SD_SEND, SD_BOTH
MSOCKENTRY MRETCODE Shutdown( int how );

// retrieves an address of a connected peer (if any)
MSOCKENTRY MRETCODE Peer( MAddress* & remote );
// provides it's own local address
MSOCKENTRY MRETCODE Self( MAddress* & local );

// retrieve data from inbound queue.
// length is IN-OUT parameter and has a buffer size on a way IN
// and message size on a way OUT
// actual returns number of bytes retrieved
// flags id IN-OUT parameter and could have ORed MSG_PEEK,
// MSG_OOB, and MSG_PARTIAL
// And DMD addition - MSG_REMOVE (meaning to remove a message
// from the queue without any regard to the buffer size or presence)
// MSG_READ is a definition which is zero. Could be used to specify normal reading.
MSOCKENTRY MRETCODE Receive( void * buffer,
        int & length,
        int & actual,
        int & flags
        );
// retrieve data and Sender MAddress from inbound queue.
// It is strongly recommended to use this function only for
// datagramm sockets. (Which in reality means that we may don't
// implement it in the first cut at all.)
// actual returns number of bytes retrieved;
MSOCKENTRY MRETCODE Receive( MAddress*& from,
        void *   buffer,
        int &    length,
        int &    actual,
        int &    flags
        );
// disconnect other side of the socket and return disconenction
// data. Since MSocket supports asyncronous IO disconnection data
// available only on receiving FD_CLOSE event
MSOCKENTRY MRETCODE ReceiveDisconnect( WSABUF & disdata );

// flags could have ORed MSG_DONTROUTE, MSG_OOB, and MSG_PARTIAL
MSOCKENTRY MRETCODE Send(void* buffer, int length, int & actual, int flags = 0);
MSOCKENTRY MRETCODE Send(MAddress& to,void* buffer, int length, int & actual, int flags);
MSOCKENTRY MRETCODE SendDisconnect( WSABUF & disdata );

// Event() function is a replacement for select(),
// WSAAsyncSelect(), and WSAEventSelect() functions
// in Winsock specification.
// mask could have any combination of the standard events.
// Additional events introduced by means
```

M.Socket.h

```cpp
// of MFD_MSOCKET_EVENT. (See "MEvent.h")
MSOCKENTRY MRETCODE Event( long mask );
// if user wants to receive events notifications
// function should be overitten in derived class
MSOCKENTRY virtual MRETCODE OnEvent( MEvent & event );

// Underlying phisical connection provider section
// ...........................................
// see list of possible and supported provider options above
// MSOCKENTRY MRETCODE ProviderSetOption(int option, void * value, int length);
// MSOCKENTRY MRETCODE ProviderGetOption(int option, void * value, int length);
// retrieves provider state property value (see list of provider properties above)
MSOCKENTRY MRETCODE ProviderState(int property, void * value, int length);
// see MProviderEvent.h
MSOCKENTRY MRETCODE ProviderEvent(long mask);
MSOCKENTRY virtual MRETCODE OnProviderEvent( MProviderEvent & event );

MSOCKENTRY static MRETCODE Startup(unsigned short version, WSAData & description);
MSOCKENTRY static MRETCODE Cleanup(void);
// returns string to be used as Mobile return code description
MSOCKENTRY static LPCTSTR TextFromCode(MRETCODE code);
private:
  static void * _a;
  friend ApplicationSideImp;
};

#endif
```

| MSocketCodes.h |

```c
// Copyright © 1997 Dynamic Mobile Data, Inc. All rights reserved.
// MSocketCodes.h
//
// Mobile Socket Codes specification...................
// if !defined ( __MSocketCodes__ )
define __MSocketCodes__ define MRC_BASEERR           0x00020000 define MRC_SUCCESS           0x00000000
define MRC_NULL              0xffffffff
#define MRC_DO_FENI           0x00000001
#define MRC_PROCESSED         0x00000002
#define MRC_IN_PROGRESS       0x00000003
#define MRC_DEVICE_NOTCONNECTED    0x00000004
#define MRC_ADDRESS_UNRESOLVABLE   0x00000005
#define MRC_DEVICE_NOT_OPERABLE    0x00000006
#define MRC_DEVICE_POWERED_OFF     0x00000007
#define MRC_UNIMPLEMENTED         (MRC_BASEERR+0x01)
#define MRC_NOT_ENOUGH_MEMORY     (MRC_BASEERR+0x02)
#define MRC_AIRDROME_NOT_REGISTERED  (MRC_BASEERR+0x03)
#define MRC_AIRDROME_UNABLE_TO_START (MRC_BASEERR+0x04)
#define MRC_AIRDROME_NOT_RUNNING    (MRC_BASEERR+0x05)
#define MRC_AIRDROME_NO_EVENT       (MRC_BASEERR+0x06)
#define MRC_AIRDROME_REQUEST_FAILURE (MRC_BASEERR+0x07)
#define MRC_AIRDROME_EXWAIT_FAILURE  (MRC_BASEERR+0x08)
#define MRC_AIRDROME_REQUEST_TIMEOUT (MRC_BASEERR+0x09)
#define MRC_PIPE_OPEN_ERROR         (MRC_BASEERR+0x0a)
#define MRC_SYSEVENT_CREATION       (MRC_BASEERR+0x0b)
#define MRC_SYSTHREAD_CREATION      (MRC_BASEERR+0x0c)
#define MRC_WRONG_CALL_SEQUENCE     (MRC_BASEERR+0x0d)
#define MRC_EVENT_SET_FAILURE       (MRC_BASEERR+0x0e)
#define MRC_EVENT_WAIT_FAILURE      (MRC_BASEERR+0x0f)
#define MRC_EVENT_RESET_FAILURE     (MRC_BASEERR+0x10)
#define MRC_MUTEX_LOCK_FAILURE      (MRC_BASEERR+0x11)
#define MRC_MUTEX_RELEASE_FAILURE   (MRC_BASEERR+0x12)
#define MRC_BUFFER_TOO_SHORT        (MRC_BASEERR+0x13)
#define MRC_AIRDROME_NO_PROCESS_POOL (MRC_BASEERR+0x14)
#define MRC_PROCESS_ALREADY_ATTACHED (MRC_BASEERR+0x15)
#define MRC_PROCESS_PIPE_CREATION   (MRC_BASEERR+0x16)
#define MRC_PROCESS_WAS_NOT_ATTACHED (MRC_BASEERR+0x17)
#define MRC_UNKNOWN_REQUEST_CODE    (MRC_BASEERR+0x18)
#define MRC_AIRDROME_NOT_CONNECTED  (MRC_BASEERR+0x19)
#define MRC_AIRDROME_PIPE_ERROR     (MRC_BASEERR+0x1a)
#define MRC_ALREADY_EXIST           (MRC_BASEERR+0x1b)
#define MRC_NO_INTERNAL_QUEUE       (MRC_BASEERR+0x1c)
#define MRC_INTERNAL_QUEUE_ERROR    (MRC_BASEERR+0x1d)
#define MRC_WRONG_ADDRESS           (MRC_BASEERR+0x1e)
#define MRC_WRONG_SOCKET            (MRC_BASEERR+0x1f)
```

MSocketCodes.h                                                                 Page 2

```c
#define MRC_NOT_OVERLAPPING_INTERVAL (MRC_BASEERR+0x20)
#define MRC_EVENT_SUPPRESSED       (MRC_BASEERR+0x21)
#define MRC_NO_EVENT_PROPAGATION   (MRC_BASEERR+0x22)
#define MRC_NO_LINK_DESCRIPTION    (MRC_BASEERR+0x23)
#define MRC_COMMLINK_OPEN_ERROR    (MRC_BASEERR+0x24)
#define MRC_COMMLINK_ERROR         (MRC_BASEERR+0x25)
#define MRC_THREAD_STOP_FAILURE    (MRC_BASEERR+0x27)
#define MRC_THREAD_STOP_TIMEOUT    (MRC_BASEERR+0x28)
#define MRC_UNKNOWN_CABLE_TYPE     (MRC_BASEERR+0x29)
#define MRC_UNKNOWN_FRAME_TYPE     (MRC_BASEERR+0x2a)
#define MRC_UNKNOWN_LINK_TYPE      (MRC_BASEERR+0x2b)
#define MRC_NO_TARGET_CABLE        (MRC_BASEERR+0x2c)
#define MRC_NO_PARENT              (MRC_BASEERR+0x2d)
#define MRC_WRONG_SEQUENCE         (MRC_BASEERR+0x2e)
#define MRC_NO_FRAME               (MRC_BASEERR+0x2f)
#define MRC_UNKNOWN_SERVICE        (MRC_BASEERR+0x30)
#define MRC_NO_LINK                (MRC_BASEERR+0x31)
#define MRC_WRONG_FRAME_FORMAT     (MRC_BASEERR+0x32)
#define MRC_NOT_SUPPORTED          (MRC_BASEERR+0x33)
#define MRC_NOTHING_TO_SEND        (MRC_BASEERR+0x34)
#define MRC_UNKNOWN                (MRC_BASEERR+0x35)
#define MRC_WRONG_MOB_FORMAT       (MRC_BASEERR+0x36)
#define MRC_INCOMPLETE_DATA        (MRC_BASEERR+0x37)
#define MRC_ALLPORTSINUSE          (MRC_BASEERR+0x38)
#define MRC_LOCAL_MADDR_UNKNOWN    (MRC_BASEERR+0x39)
#define MRC_WRONG_PORT             (MRC_BASEERR+0x3a)
#define MRC_NO_RADIO_UNITS         (MRC_BASEERR+0x3b)
#define MRC_NO_ROUTERS             (MRC_BASEERR+0x3c)
#define MRC_DEVICE_NOT_READY       (MRC_BASEERR+0x3d)
#define MRC_NO_OBJECT              (MRC_BASEERR+0x3e)
#define MRC_RADIO_UNIT_NOT_ASSIGNED (MRC_BASEERR+0x3f)
#define MRC_ALREADY_ASSIGNED       (MRC_BASEERR+0x40)
#define MRC_ADDRESS_UNDEFINED      (MRC_BASEERR+0x41)
#define MRC_NO_DATA                (MRC_BASEERR+0x42)
#define MRC_MADDRESS_FORMAT        (MRC_BASEERR+0x43)
#define MRC_PACKET_FORMAT          (MRC_BASEERR+0x44)
#define MRC_SELF_ADDRESSING        (MRC_BASEERR+0x45)
#define MRC_INACTIVE_SERVICE       (MRC_BASEERR+0x46)
#define MRC_CYCLIC_ROUTING         (MRC_BASEERR+0x47)
#define MRC_ROUTER_UNKNOWN         (MRC_BASEERR+0x48)
#define MRC_DISCONNECTED           (MRC_BASEERR+0x49)
#define MRC_NETWORKUNREACHABLE     (MRC_BASEERR+0x4a)
#define MRC_NORESPONCE             (MRC_BASEERR+0x4b)
#define MRC_SERVICE_ALREADY_REQUESTED (MRC_BASEERR+0x4c)
#define MRC_PROTOCOL_NA            (MRC_BASEERR+0x4d)
#define MRC_SS_BELOW_LIMIT         (MRC_BASEERR+0x4e)
#define MRC_SHUTDOWNED             (MRC_BASEERR+0x4f)
#define MRC_OUTOFCOVERAGE          (MRC_BASEERR+0x50)
#define MRC_NO_DEVICE_ADDRESS      (MRC_BASEERR+0x51)
#define MRC_DLL_LOAD_ERROR         (MRC_BASEERR+0x52)
#define MRC_SELF_ADDRESS_UNKNOWN   (MRC_BASEERR+0x53)
#if !defined ( UNDER_CE )
#define MRC_INFONOSUPPORT          (MRC_BASEERR+0x54)
```

75

MSocketCodes.h

```
#define MRC_INFOMASKEDOUT        (MRC_BASEERR+0x55)
#define MRC_NEWINFOITEM          (MRC_BASEERR+0x56)
#define MRC_UPDATEDINFOITEM      (MRC_BASEERR+0x57)
#define MRC_NONEWINFO            (MRC_BASEERR+0x58)
#define MRC_NOHOSTNAME           (MRC_BASEERR+0x59)
#endif
#define MRC_SHUTDOWNEDBYUSER      (MRC_BASEERR+0x5a)
#define MRC_UNSUFFICIENT_ADDRESSING (MRC_BASEERR+0x5b)
#define MRC_AMBIGUOUS_HOST_ADDRESS  (MRC_BASEERR+0x5c)
#define MRC_WRONG_PARAMETER       (MRC_BASEERR+0x5d)

// Begin
#define MRC_SOCKETS_LIMIT_EXHAUSTED (MRC_BASEERR+0x5e)
// End

// following are return codes from the internal threads
// they could be used on a system level but not on an methods return
// code level
define MRC_BASECODE     0x00021000 define MRCTHR_SUCCESSFULL           0x00
define MRCTHR_WAIT_FAILURE   (MRC_BASECODE+0x01)
#define MRCTHR_WAIT_TIMEOUT   (MRC_BASECODE+0x02)
#define MRCTHR_WAIT_ABANDONED (MRC_BASECODE+0x03)
#define MRCTHR_WAIT_UNKNOWN   (MRC_BASECODE+0x04)
#define MRCTHR_NO_EVENT       (MRC_BASECODE+0x05)

#endif
```

MSocketErrors.h            Page 1

```
// Copyright © 1997 Dynamic Mobile Data, Inc. All rights reserved.
// MSocketErrors.h
//
// Mobile Socket Error codes specification....................
// if !defined ( __MSocketErrors__ )
define __MSocketErrors__ include "MSocketCodes.h"

LPCTSTR MSocketErrText(unsigned long code);

#endif
```

What is claimed is:

1. A method of operating a computer system for managing and controlling wireless devices comprising:
   (a) providing at least one wireless device connected to a first computer of the computer system;
   (b) providing a multi-tasking operating system having a base shell and base communications API to the first computer, said base shell of said operating system providing a base graphical-user interface (GUI) displaying GUI elements on a user desktop, said GUI elements including a control panel folder containing icons representing configuration controls of said operating system;
   (c) providing a wireless control subsystem to the first computer including a shell extension module extending said base shell of said operating system through providing a first set of COM objects configured to provide a folder icon in said control panel folder containing device icons therein representing said wireless devices and a program icon in said control panel folder for accessing controls of said wireless control program subsystem by selection of said program icon; and
   (d) actuating the first computer by said wireless control subsystem such that said COM objects are used by said wireless control program subsystem to display graphical indicia to said base shell of said operating system indicating activation of said wireless control program subsystem.

2. The method of claim 1 wherein said first set of COM objects are configured to place an additional program icon on said user desktop.

3. The method of claim 1 wherein said first set of COM objects are configured to display representations of said wireless devices folder and program icon in an exploring window.

4. The method of claim 1 wherein said user desktop includes a task tray region for displaying icons representing programs that extend said operating system and wherein said first set of COM objects are configured to locate a program icon in said task tray region upon activation of said wireless control subsystem.

5. A method of operating a computer system for managing and controlling wireless devices comprising:
   (a) providing at least one wireless device connected to a first computer of the computer system and at least one wireless-related application running on the same computer;
   (b) providing a multi-tasking operating system having a base shell and base communications API to the first computer; and
   (c) providing a wireless control subsystem to the first computer including:
      (i) a shell extension module extending said base shell of said operating system through providing a first set of COM objects used by said wireless control program subsystem to display graphical indicia to said base shell of said operating system indicating activation of said wireless control program subsystem,
      (ii) a programming module extending said base communications API through a set of programming objects callable by wireless-related applications for enabling wireless communications among said wireless device and said wireless-related applications, and
      (iii) a system module comprising a plurality of linked programming objects operative to propagate information indicative of an occurrence of system level events related to at least one of the operation and status of said wireless device through said linked programming objects of said system module to said programming objects of said programming module and then to said at least one application running on the first computer.

6. The method of claim 5 wherein said wireless control subsystem further comprises an industry standard module which exposes one or more industry-standard programming interfaces to a programmer to enable development of custom wireless applications which can communicate with said programming module and said system module.

7. The method of claim 6 wherein said one or more industry-standard programming interfaces comprises ActiveX.

8. The method of claim 6 wherein said one or more industry-standard programming interfaces comprises Winsock.

9. The method of claim 6 wherein said one or more industry-standard programming interfaces comprises OBDC.

10. The method of claim 5 wherein said programming objects of said programming module includes application socket objects which represent single socket connections with each application, and said plurality of said linked programming objects include a first layer of cable objects representing a communication link with a wireless device, a second layer of socket objects representing a user created socket connection, and a third layer of process objects representing the link between the system module and the programming module, and said wireless control subsystem actuates the first computer to:
   (i) sense at said cable objects the occurrence of a system level event related to the operation and/or status of said wireless device,
   (ii) send first signals from said cable objects indicative of said system level event to said socket objects,
   (iii) send second signals from said socket objects indicative of said system level event to said process objects,
   (iv) send third signals indicative of said system level event from said process objects to said application socket objects of said programming module, and from said application socket objects to the application.

11. The method of claim 10 wherein said system module is operative to propagate through said objects a system level event indicative of when said at least one wireless device is in an out-of-coverage area.

12. The method of claim 11 wherein said wireless control subsystem is configured to hold in abeyance communications with a said wireless device determined to be in an out-of-coverage area until said system module determines when said at least one wireless device returns to a coverage area by sensing the occurrence of an in-coverage system event.

13. The method of claim 10 wherein said system module is operative to propagate through said objects real-time system level events to provide diagnostic information about the status of said at least one wireless device.

14. The method of claim 13 wherein said real-time diagnostic information is displayed on a display device of the first computer in an on-screen diagnostic panel.

15. The method of claim 14 wherein said diagnostic information includes registration status, signal strength and device address.

16. The method of claim 5 wherein said system module further comprises at least one wizard program for automatic and simplified configuration and registration of said at least one wireless device to said wireless control subsystem.

17. The method of claim 5 wherein said wireless control subsystem is operative to allow said at least one said wireless device to communicate simultaneously with two or more of said applications.

18. The method of claim 17, wherein the computer system further includes a second remote computer and at least one wireless-related application running on the second remote computer, said second remote computer having a programming module and being connected to the first computer via a communications link, and said wireless control subsystem is operative to allow said at least one said wireless device to communicate simultaneously with said at least one application running on said first computer and said at least one application running on said second remote computer.

19. The method of claim 5 wherein said wireless control subsystem is operative to allow said at least one application running on said first computer to communicate with two or more of said wireless devices simultaneously.

20. The method of claim 19, wherein the computer system further includes a second remote computer and at least one wireless-related application running on the second remote computer, said second remote computer having a system module and being connected to the first computer via a communications link, and said wireless control subsystem is operative to allow said at least one application running on said second remote computer to communicate with two or more of said wireless devices simultaneously.

21. The method of claim 5 wherein said at least one wireless device comprises at least one wireless device operable with a first wireless network protocol and at least one wireless device operable with a second, different wireless network protocol.

22. The method of claim 5 wherein said system module utilizes sockets for data transport.

23. The method of claim 5 wherein said wireless devices are assigned a unique numeric address, and wherein said system and shell extension modules are operative to match said numeric addresses to user-friendly monikers.

* * * * *